US012528610B2

(12) United States Patent
Straight et al.

(10) Patent No.: US 12,528,610 B2
(45) Date of Patent: Jan. 20, 2026

(54) FILLING STATION FOR HEAT-NOT-BURN (HNB) AEROSOL-GENERATING CAPSULES AND AUTOMATED PRODUCTION LINE INCLUDING THE SAME

(71) Applicant: Altria Client Services LLC, Richmond, VA (US)

(72) Inventors: Jeremy Straight, Midlothian, VA (US); Charles Dendy, Ruther Glen, VA (US); David Choe, Henrico, VA (US); Christopher R. Newcomb, Powhatan, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/613,505

(22) Filed: Mar. 22, 2024

(65) Prior Publication Data

US 2024/0317433 A1    Sep. 26, 2024

Related U.S. Application Data

(60) Provisional application No. 63/454,034, filed on Mar. 22, 2023.

(51) Int. Cl.
*B65B 1/16* (2006.01)
*B65B 9/20* (2012.01)
*B65B 37/14* (2006.01)

(52) U.S. Cl.
CPC .............. *B65B 1/16* (2013.01); *B65B 9/20* (2013.01); *B65B 37/14* (2013.01)

(58) Field of Classification Search
CPC ........... B65B 1/26; B65B 1/363; B65B 37/14; B65B 9/20; B65B 1/16
See application file for complete search history.

(56) References Cited

U.S. PATENT DOCUMENTS 6,170,226 B1    1/2001   Chang
6,837,281 B2    1/2005   Spiers et al.
(Continued)

FOREIGN PATENT DOCUMENTS

JP    2011-182710 A    9/2011
JP    7-159298 B2     10/2022
(Continued)

OTHER PUBLICATIONS

Translation of jp 2011182710 (Year: 2011).*
(Continued)

*Primary Examiner* — Jason K Niesz
(74) *Attorney, Agent, or Firm* — Harness, Dickey & Pierce, P.L.C.

(57) ABSTRACT

A filling station for heat-not-burn (HNB) aerosol-generating capsules may include a filling receptacle, a plurality of carriages, and at least one vacuum source. The filling receptacle defines a first series of vacuum ports. The filling receptacle is configured to receive an aerosol-forming substrate. The plurality of carriages are arranged underneath the filling receptacle. Each of the plurality of carriages define a second series of vacuum ports and, optionally, a third series of vacuum ports. Each of the plurality of carriages are configured to receive and hold capsule casings for filling with the aerosol-forming substrate. The at least one vacuum source is configured to draw a vacuum through the capsule casings such that the aerosol-forming substrate is drawn through the first series of vacuum ports in the filling receptacle and into the capsule casings underneath.

21 Claims, 45 Drawing Sheets

(56) References Cited

U.S. PATENT DOCUMENTS

| | | | |
|---|---|---|---|
| 7,849,889 B2 | 12/2010 | Smith et al. | |
| 9,346,570 B2 | 5/2016 | Williams | |
| 2012/0060446 A1* | 3/2012 | Merz | B65B 37/20 |
| | | | 53/167 |
| 2018/0289057 A1 | 10/2018 | Ghiotti et al. | |
| 2019/0152627 A1* | 5/2019 | Ghiotti | A24C 5/01 |

FOREIGN PATENT DOCUMENTS

| | | |
|---|---|---|
| WO | 80/00686 A1 | 4/1980 |
| WO | 2006/111690 A1 | 10/2006 |
| WO | 2020/157460 A1 | 8/2020 |

OTHER PUBLICATIONS

International Search Report and Written Opinion dated Sep. 18, 2024 issued in international patent application No. PCT/US2024/021030.

International Preliminary Report on Patentability dated Sep. 20, 2025 issued in international patent application No. PCT/US2024/021030.

\* cited by examiner

```
┌─────────────────────────────────────────────┐
│                    2100                     │
│ Supplying aerosol-forming substrate to      │
│ filling receptacle                          │
└─────────────────────────────────────────────┘
                      │
                      ▼
┌─────────────────────────────────────────────┐
│                    2200                     │
│ Engaging capsule casings with filling       │
│ receptacle                                  │
└─────────────────────────────────────────────┘
                      │
                      ▼
┌─────────────────────────────────────────────┐
│                    2300                     │
│ Vibrating to increase particulate motion    │
│ of aerosol-forming substrate in filling     │
│ receptacle                                  │
└─────────────────────────────────────────────┘
                      │
                      ▼
┌─────────────────────────────────────────────┐
│                    2400                     │
│ Applying a vacuum to draw aerosol-forming   │
│ substrate through filling receptacle and    │
│ into capsule casings                        │
└─────────────────────────────────────────────┘
```

FILLING STATION FOR HEAT-NOT-BURN (HNB) AEROSOL-GENERATING CAPSULES AND AUTOMATED PRODUCTION LINE INCLUDING THE SAME

CROSS-REFERENCE TO RELATED APPLICATION

The present application claims priority under 35 U.S.C. § 119 to U.S. Provisional Application No. 63/454,034, filed Mar. 22, 2023, the entire contents of which are hereby incorporated herein by reference.

BACKGROUND

Field

The present disclosure relates to the filling of capsules for heat-not-burn (HNB) aerosol-generating devices that are configured to generate an aerosol without involving a substantial pyrolysis of an aerosol-forming substrate.

Description of Related Art

Some electronic devices are configured to heat a plant material to a temperature that is sufficient to release constituents of the plant material while keeping the temperature below an ignition point of the plant material so as to avoid any substantial pyrolysis of the plant material. Such devices may be referred to as aerosol-generating devices (e.g., heat-not-burn (HNB) aerosol-generating devices or heated tobacco products (HTP)), and the plant material heated may be tobacco and/or cannabis. In some instances, the plant material may be introduced directly into a heating chamber of an aerosol-generating device. In other instances, the plant material may be pre-packaged in individual containers to facilitate insertion and removal from an aerosol-generating device. The introduction of the plant material into the containers may be performed via a manual or mechanical process.

SUMMARY

At least one embodiment relates to a filling station for heat-not-burn (HNB) aerosol-generating capsules. In an example embodiment, the filling station includes a filling receptacle, a plurality of carriages, and at least one vacuum source. The filling receptacle defines a first series of vacuum ports. The filling receptacle is configured to receive an aerosol-forming substrate. The plurality of carriages are arranged underneath the filling receptacle. Each of the plurality of carriages define a second series of vacuum ports and, optionally, a third series of vacuum ports. Each of the plurality of carriages are configured to receive and hold capsule casings for filling with the aerosol-forming substrate. The at least one vacuum source is configured to draw a vacuum through the capsule casings such that the aerosol-forming substrate is drawn through the first series of vacuum ports in the filling receptacle and into the capsule casings underneath.

In an example embodiment, the filling receptacle and the plurality of carriages are configured to rotate and have a common axis of rotation, and the plurality of carriages are configured to move axially relative to the axis of rotation.

In an example embodiment, the plurality of carriages are configured to raise the capsule casings to engage with the filling receptacle to facilitate a filling with the aerosol-forming substrate and to lower the capsule casings after the filling.

In an example embodiment, the first series of vacuum ports in the filling receptacle have a shape that corresponds to a cross-section of the capsule casings.

In an example embodiment, the first series of vacuum ports are arranged in a circle in the filling receptacle.

In an example embodiment, the plurality of carriages are configured to raise the capsule casings such that the capsule casings extend into the first series of vacuum ports in the filling receptacle.

In an example embodiment, each of the first series of vacuum ports in the filling receptacle has a lower edge that is chamfered such that a bottom opening of each of the first series of vacuum ports is larger than a corresponding top opening.

In an example embodiment, the second series of vacuum ports are configured to align with air-permeable bottom ends of the capsule casings.

In an example embodiment, the optional third series of vacuum ports are configured to hold the capsule casings against the plurality of carriages when the vacuum is being drawn by the at least one vacuum source.

In an example embodiment, the at least one vacuum source is configured to draw the vacuum such that a packing density of the aerosol-forming substrate drawn into the capsule casings is greater than via gravity loading.

In an example embodiment, the filling station further includes at least one motor configured to generate vibrations for enhancing particulate movements of the aerosol-forming substrate in the filling receptacle.

In an example embodiment, the filling station further includes at least one baffle configured to modify a distribution of the aerosol-forming substrate in the filling receptacle.

In an example embodiment, the at least one baffle is configured to vibrate in response to the at least one motor.

In an example embodiment, the filling receptacle and the plurality of carriages are configured to rotate, while the at least one baffle is configured to remain fixed relative to rotations of the filling receptacle and the plurality of carriages.

In an example embodiment, the at least one baffle is configured to deflect the aerosol-forming substrate toward the first series of vacuum ports during rotations of the filling receptacle.

In an example embodiment, the at least one baffle includes a first baffle, a second baffle, a third baffle, and a fourth baffle.

In an example embodiment, the first baffle is configured to facilitate an initial filling of the aerosol-forming substrate in the capsule casings, and the third baffle is configured to facilitate a subsequent filling of the aerosol-forming substrate in the capsule casings.

In an example embodiment, the second baffle is C-shaped or U-shaped and is positioned higher from a surface of the filling receptacle than the first baffle, the third baffle, and the fourth baffle.

In an example embodiment, the second baffle is configured to temporarily accumulate the aerosol-forming substrate for purposes of determining an appropriate rate for supplying the aerosol-forming substrate to the filling receptacle.

In an example embodiment, the fourth baffle is configured to wipe excess aerosol-forming substrate from the first series of vacuum ports and to direct the excess aerosol-forming substrate toward an inner portion of the filling receptacle.

At least one embodiment relates to a method of filling capsule casings with aerosol-forming substrate. In an example embodiment, the method includes supplying the aerosol-forming substrate to a filling receptacle defining a series of vacuum ports.

In an example embodiment, the method additionally includes engaging the capsule casings with an underside of the filling receptacle and the series of vacuum ports, the capsule casings having open top ends and air-permeable bottom ends.

In an example embodiment, the method also includes providing vibrations to increase a particulate motion of the aerosol-forming substrate in the filling receptacle.

In an example embodiment, the method further includes applying a vacuum to the air-permeable bottom ends of the capsule casings such that the aerosol-forming substrate in the filling receptacle is drawn through the series of vacuum ports and into the open top ends of the capsule casings.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 45 is a block diagram of a method of filling capsule casings with aerosol-forming substrate according to an example embodiment.

DETAILED DESCRIPTION OF EXAMPLE EMBODIMENTS

Figure 1:
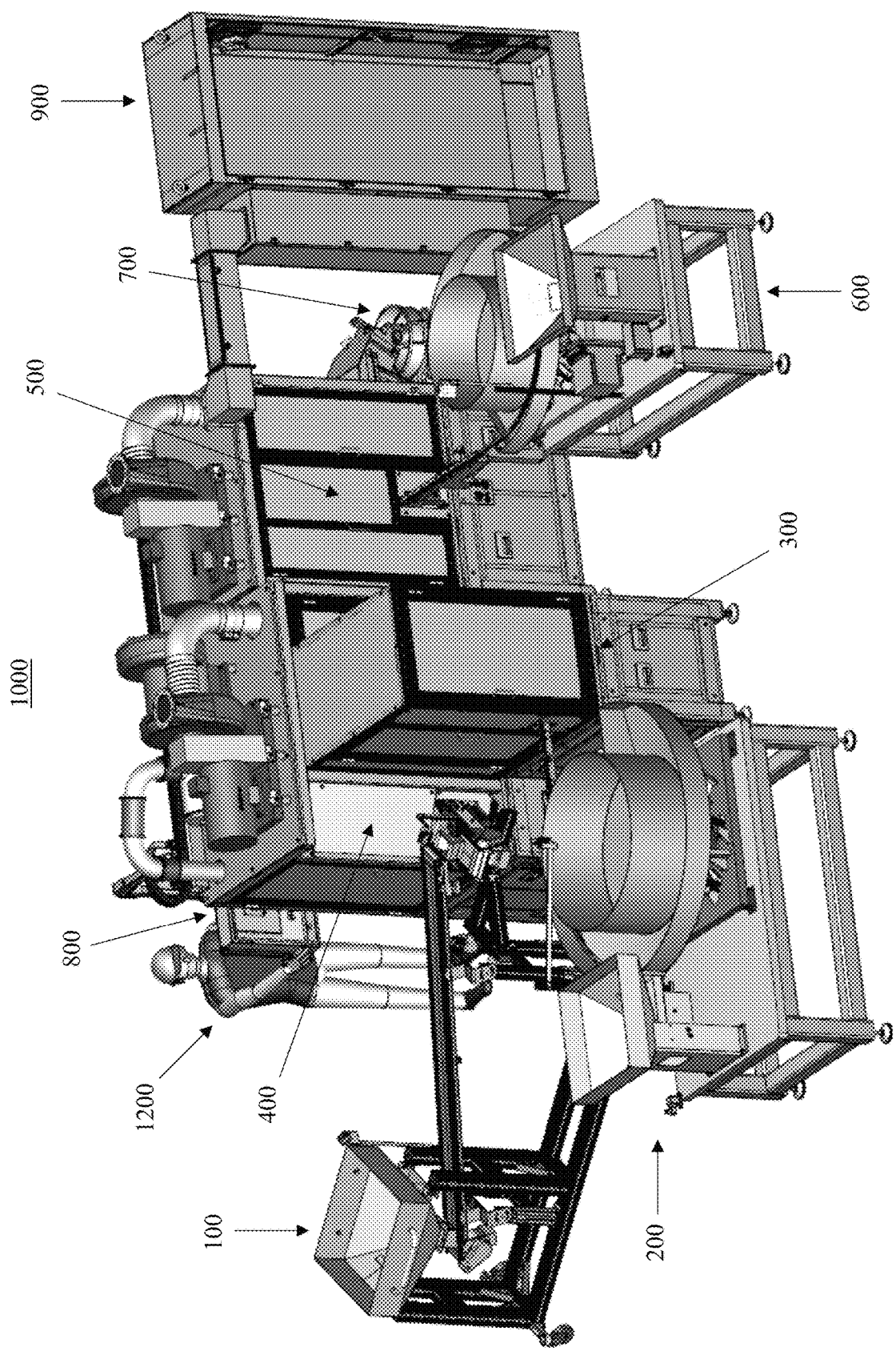
FIG. 1 is a front perspective view of an automated production line including a filling station for heat-not-burn (HNB) aerosol-generating capsules according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

When the terms "about" or "substantially" are used in this specification in connection with a numerical value, it is intended that the associated numerical value includes a manufacturing or operational tolerance (e.g., ±10%) around the stated numerical value. Moreover, when the terms "generally" or "substantially" are used in connection with geometric shapes, it is intended that precision of the geometric shape is not required but that latitude for the shape is within the scope of the disclosure. Furthermore, regardless of whether numerical values or shapes are modified as "about," "generally," or "substantially," it will be understood that these values and shapes should be construed as including a manufacturing or operational tolerance (e.g., ±10%) around the stated numerical values or shapes.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. For example, when an elastic layer and a support layer are removably coupled to one another, the elastic layer and the support layer can be separated upon the application of sufficient force.

Figure 2:
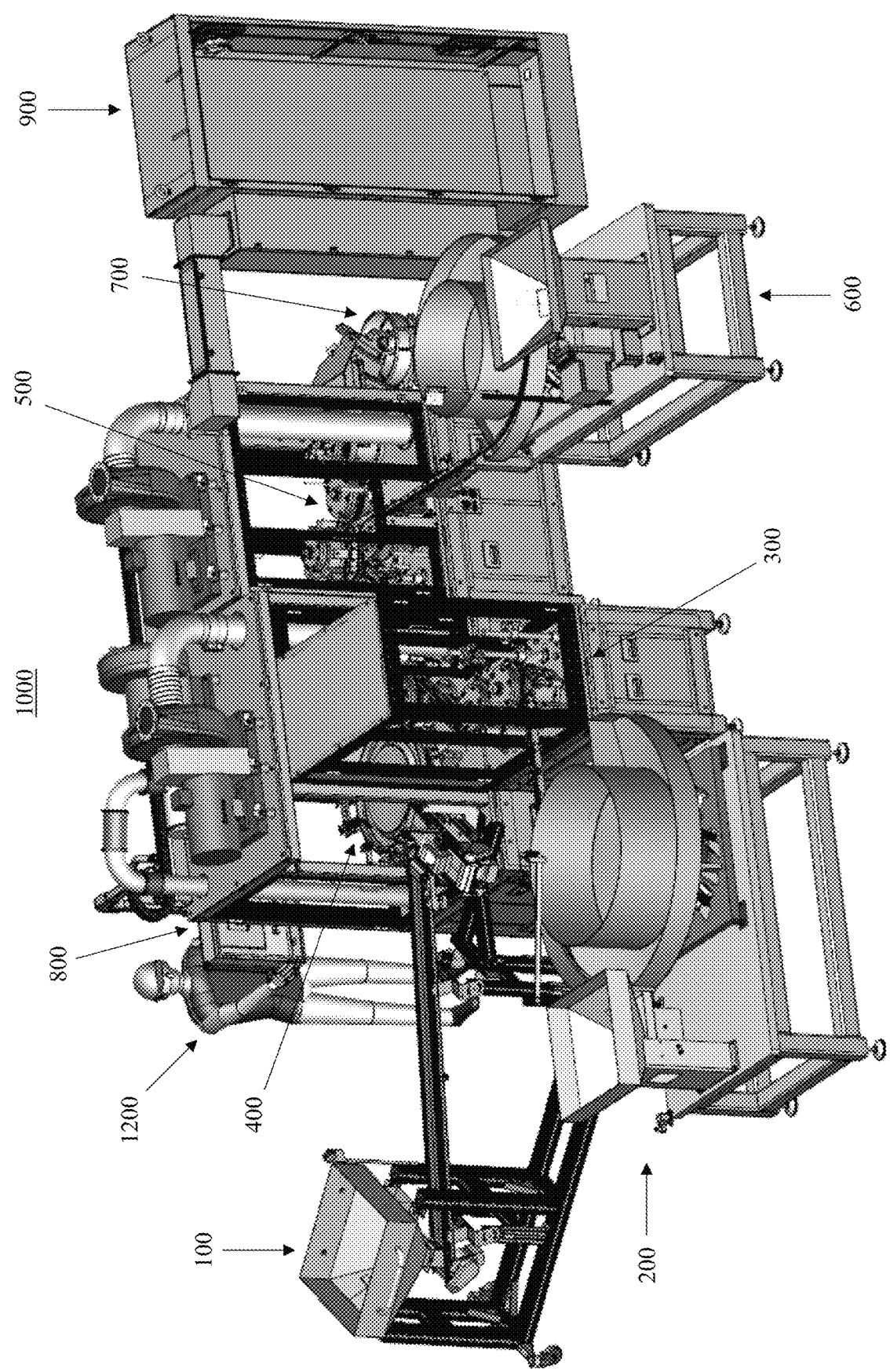
FIG. 2 is a more open view of FIG. 1 wherein various panels/coverings have been hidden to allow viewing of the interior.

FIG. 1 is a front perspective view of an automated production line including a filling station for heat-not-burn (HNB) aerosol-generating capsules according to an example embodiment. FIG. 2 is a more open view of FIG. 1 wherein various panels/coverings have been hidden to allow viewing of the interior. Referring to FIGS. 1-2, an automated production line 1000 includes a substrate supply station 100 configured to supply an aerosol-forming substrate to a filling station 400. A capsule casing supply station 200 is configured to supply empty capsule casings to a pre-filling inspection station 300. According to an example embodiment, the capsule casing supply station 200 is configured to orient the empty capsule casings such that the open ends are facing up and then supplying the oriented capsule casings to the pre-filling inspection station 300. Capsule casings that are improperly oriented (e.g., upside down) and/or physically defective are detected and rejected in the pre-filling inspection station 300. The properly-oriented capsule casings are then filled with aerosol-forming substrate in the filling station 400. The filling station 400 may also inspect for proper filling. A cap supply station 600 is configured to supply caps to the capping station 500. The properly filled capsule casings are capped with these caps in the capping station 500. The capping station 500 also inspects for proper capping before sending the capsules to the collection station 700. An operator 1200 can interface with the automated production line 1000 via a control station 800. Furthermore, electronics and other sensitive equipment may be stored in an electrical enclosure assembly 900.

Figure 3:
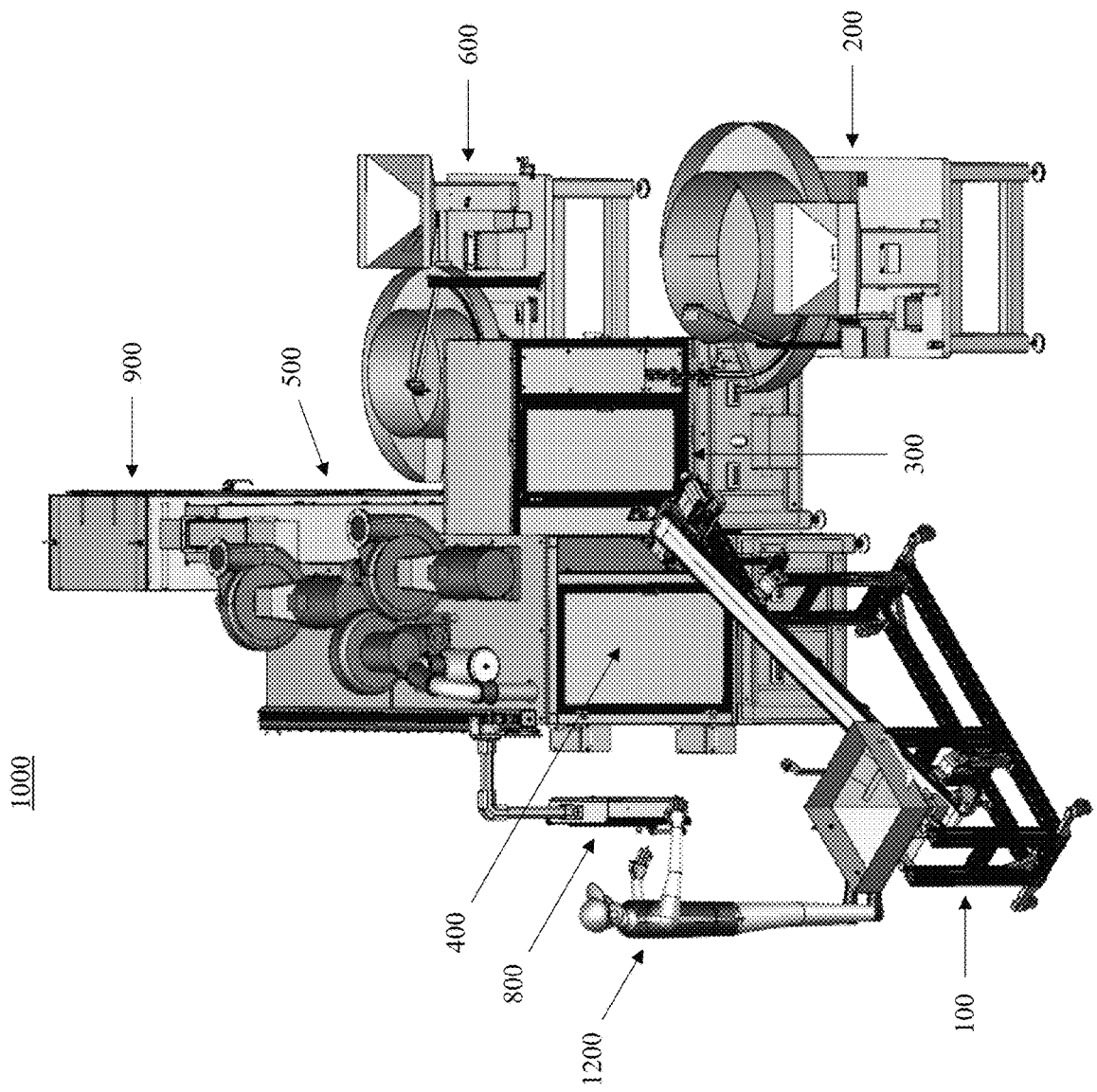
FIG. 3 is a first side perspective view of the automated production line of FIG. 1.
Figure 4:
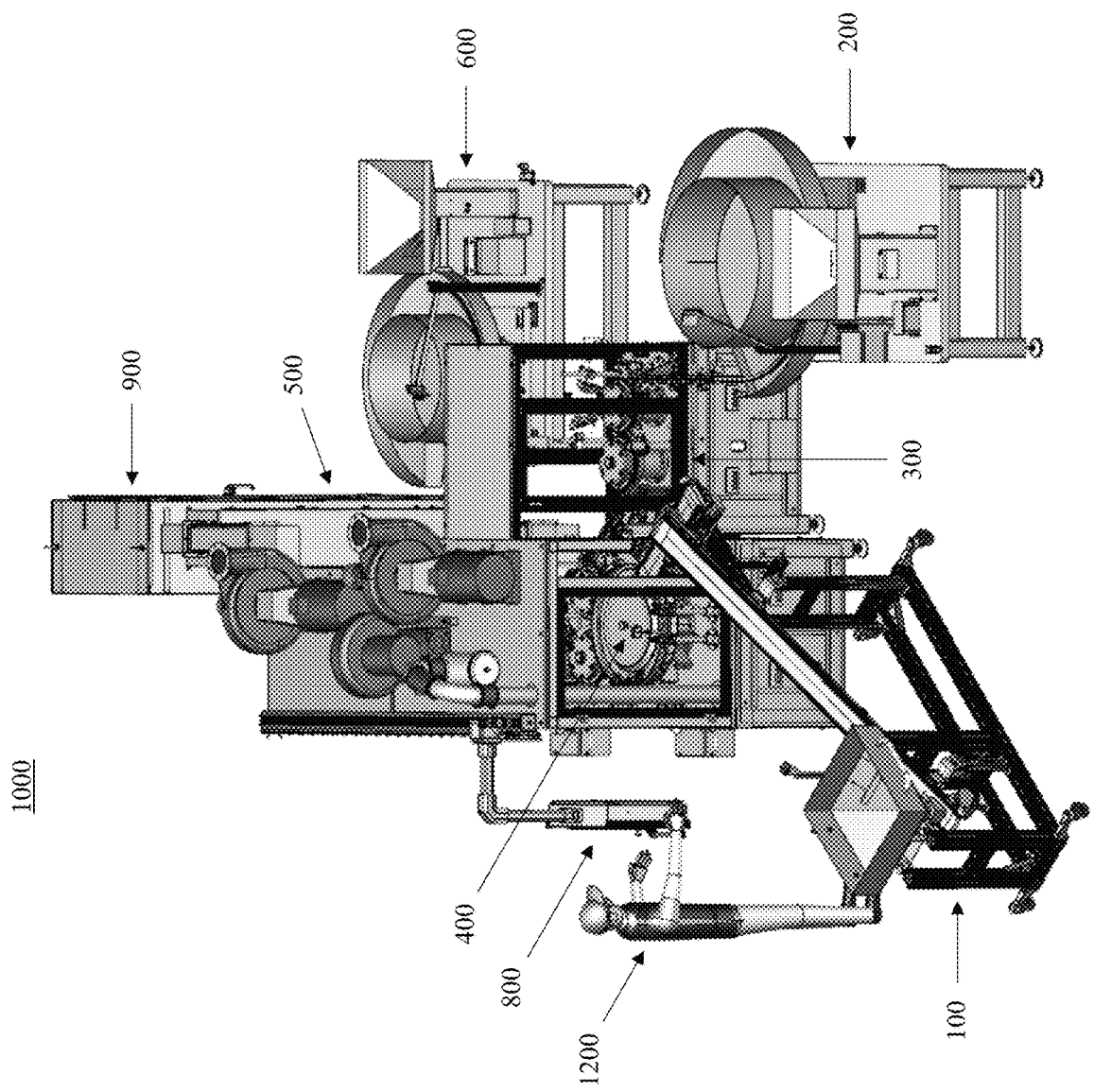
FIG. 4 is a more open view of FIG. 3 wherein various panels/coverings have been hidden to allow viewing of the interior.

FIG. 3 is a first side perspective view of the automated production line of FIG. 1. FIG. 4 is a more open view of FIG. 3 wherein various panels/coverings have been hidden to allow viewing of the interior. Referring to FIGS. 3-4, the pre-filling inspection station 300 includes, inter alia, a rejection chute and a rejection bin for the rejected (e.g., improperly-oriented) capsule casings. In an example embodiment, the empty capsule casings that are detected in the pre-filling inspection station 300 to be improperly oriented (e.g., upside down) and/or physically defective are ejected into the rejection chute which directs those rejected capsule casings to the rejection bin. Optionally, the capsule casings collected in the rejection bin can be further inspected in a separate step/process to identify and recover the capsule casings that were merely improperly oriented and not physically defective which can be returned (e.g., manually or automatically via a conveyance system) to the capsule casing supply station 200 for another round of orientation so that the empty capsule casings will have their open ends facing up when supplied to the pre-filling inspection station 300.

Figure 5:
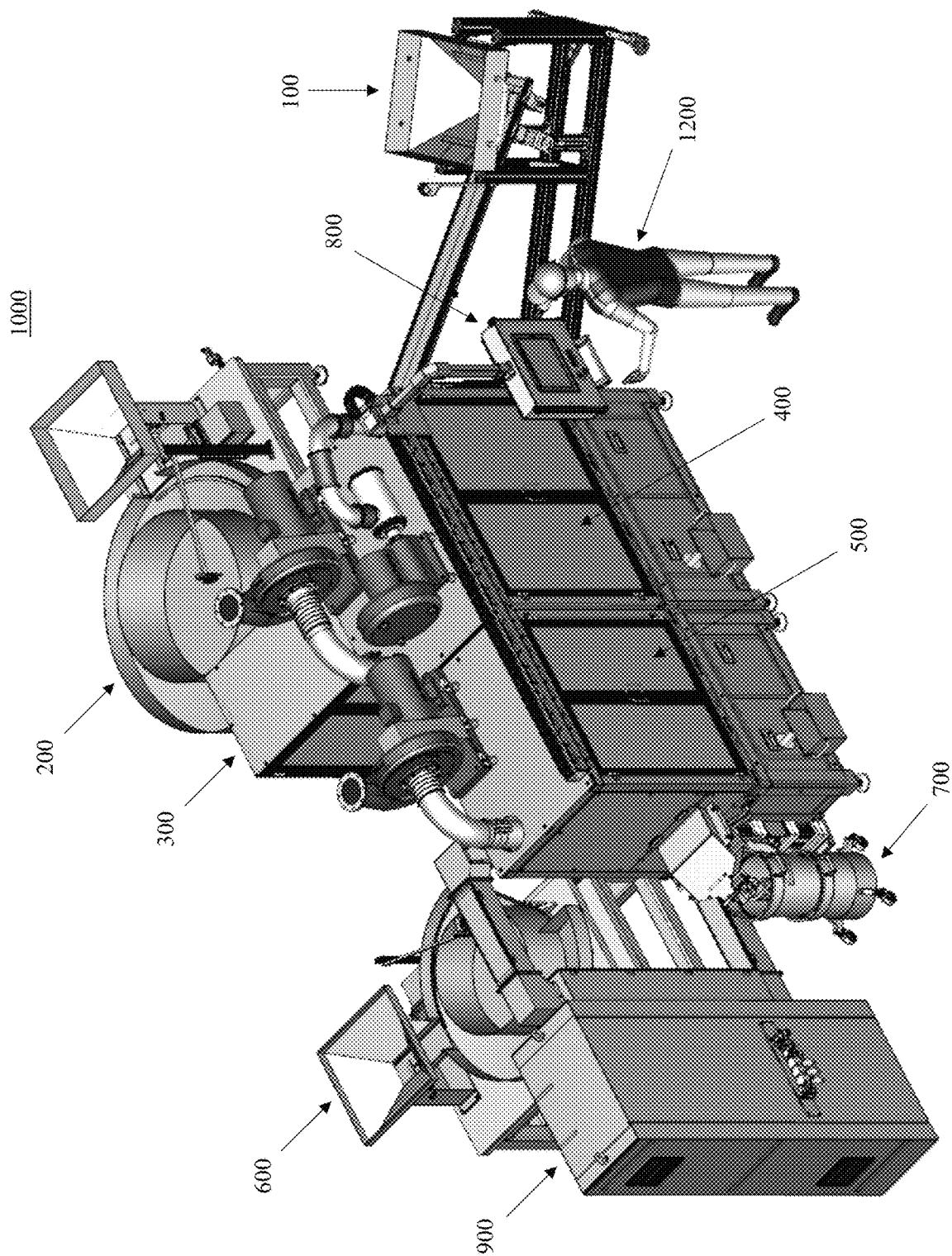
FIG. 5 is a rear perspective view of the automated production line of FIG. 1.
Figure 6:
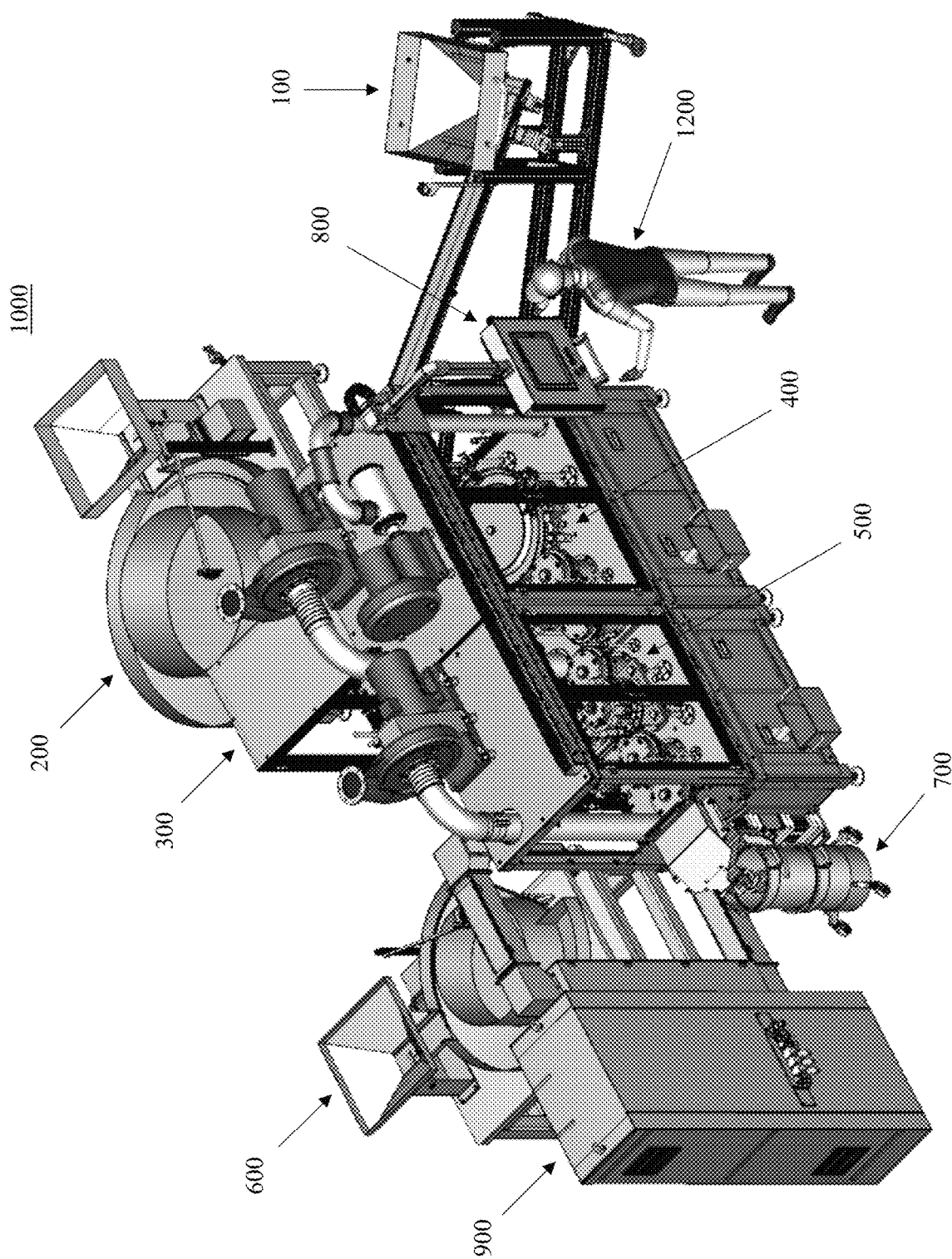
FIG. 6 is a more open view of FIG. 5 wherein various panels/coverings have been hidden to allow viewing of the interior.

FIG. 5 is a rear perspective view of the automated production line of FIG. 1. FIG. 6 is a more open view of FIG. 5 wherein various panels/coverings have been hidden to allow viewing of the interior. Referring to FIGS. 5-6, the filling station 400 includes, inter alia, a rejection chute and a rejection bin for improperly-filled capsule casings. In an example embodiment, capsule casings that are detected to be improperly filled in the filling station 400 are ejected into the rejection chute which directs those improperly-filled capsule casings to the rejection bin. Similarly, the capping station 500 also includes, inter alia, a rejection chute and a rejection bin for improperly-capped capsules. In an example embodiment, capsules that are detected to be improperly capped in the capping station 500 are ejected into the rejection chute which directs those improperly-capped capsules to the rejection bin.

Figure 7:
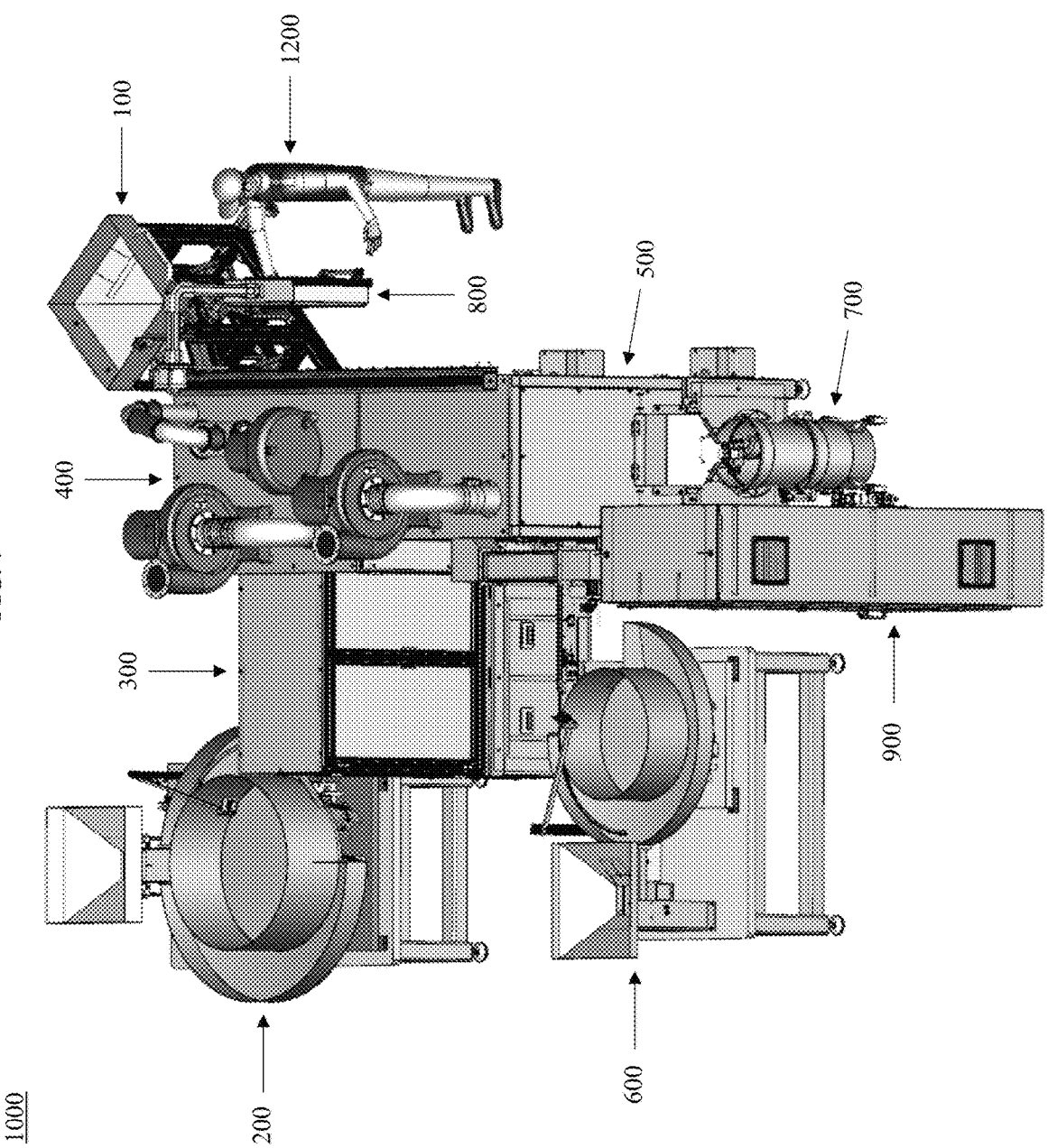
FIG. 7 is a second side perspective view of the automated production line of FIG. 1.
Figure 8:
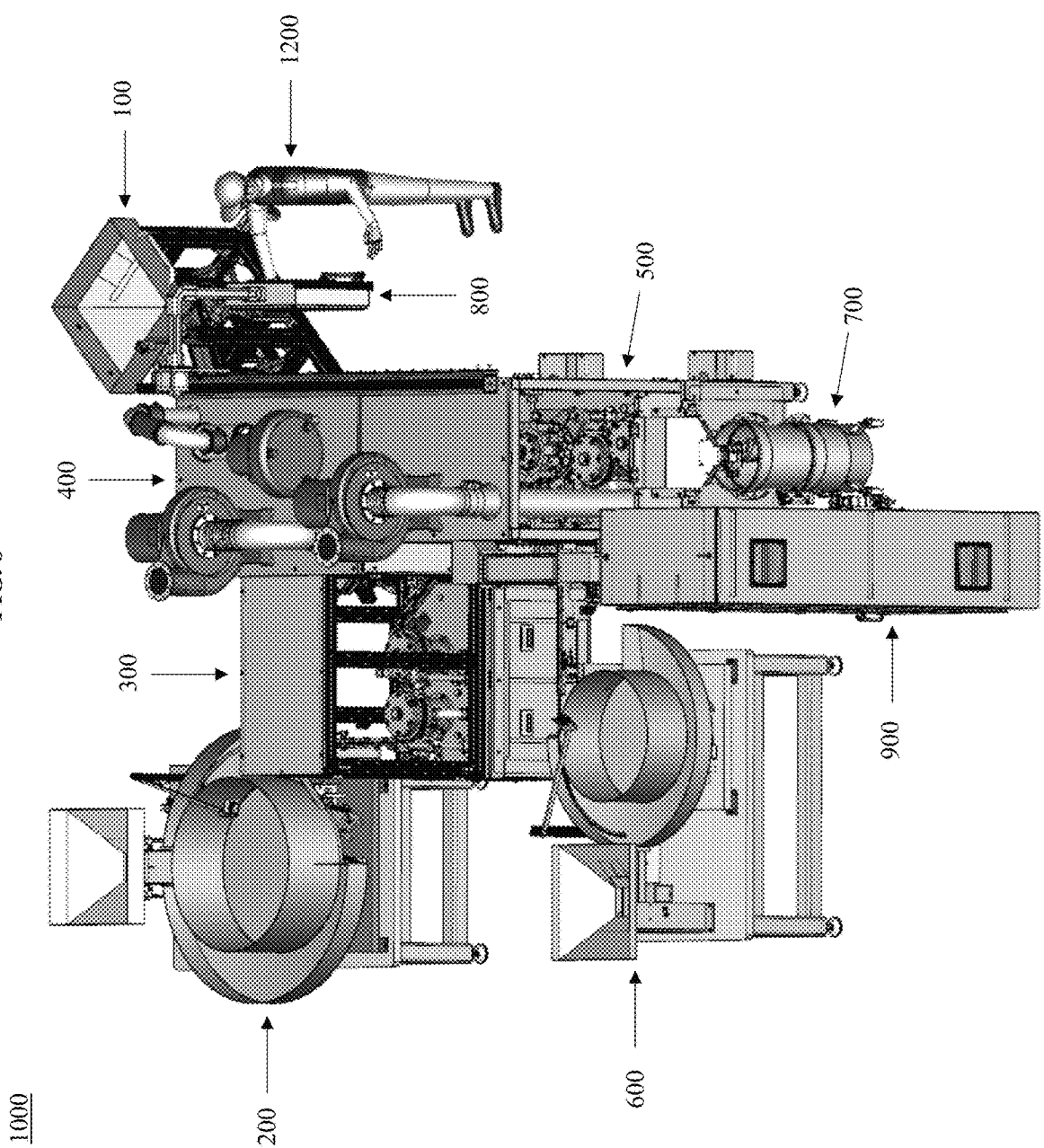
FIG. 8 is a more open view of FIG. 7 wherein various panels/coverings have been hidden to allow viewing of the interior.

FIG. 7 is a second side perspective view of the automated production line of FIG. 1. FIG. 8 is a more open view of FIG. 7 wherein various panels/coverings have been hidden to allow viewing of the interior. Referring to FIGS. 7-8, capsules that pass inspection in the capping station 500 are directed to a collection station 700. In an example embodiment, the collection station 700 may include a collection chute that is configured to initially receive capsules from the capping station 500 and to deliver the capsules to a collection container, which can then be unloaded (e.g., manually or automatically via a conveyance system) for further processing and/or packaging.

Figure 9:
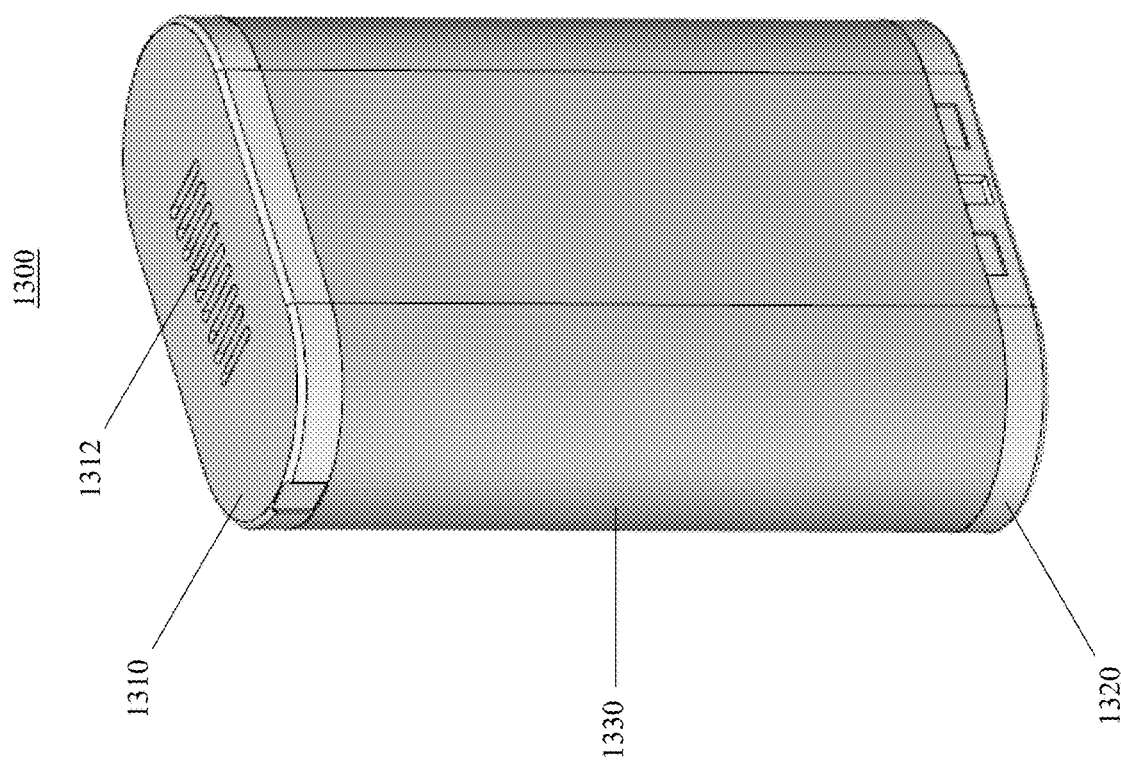
FIG. 9 is a downstream perspective view of an aerosol-generating capsule for an aerosol-generating device according to an example embodiment.
Figure 10:
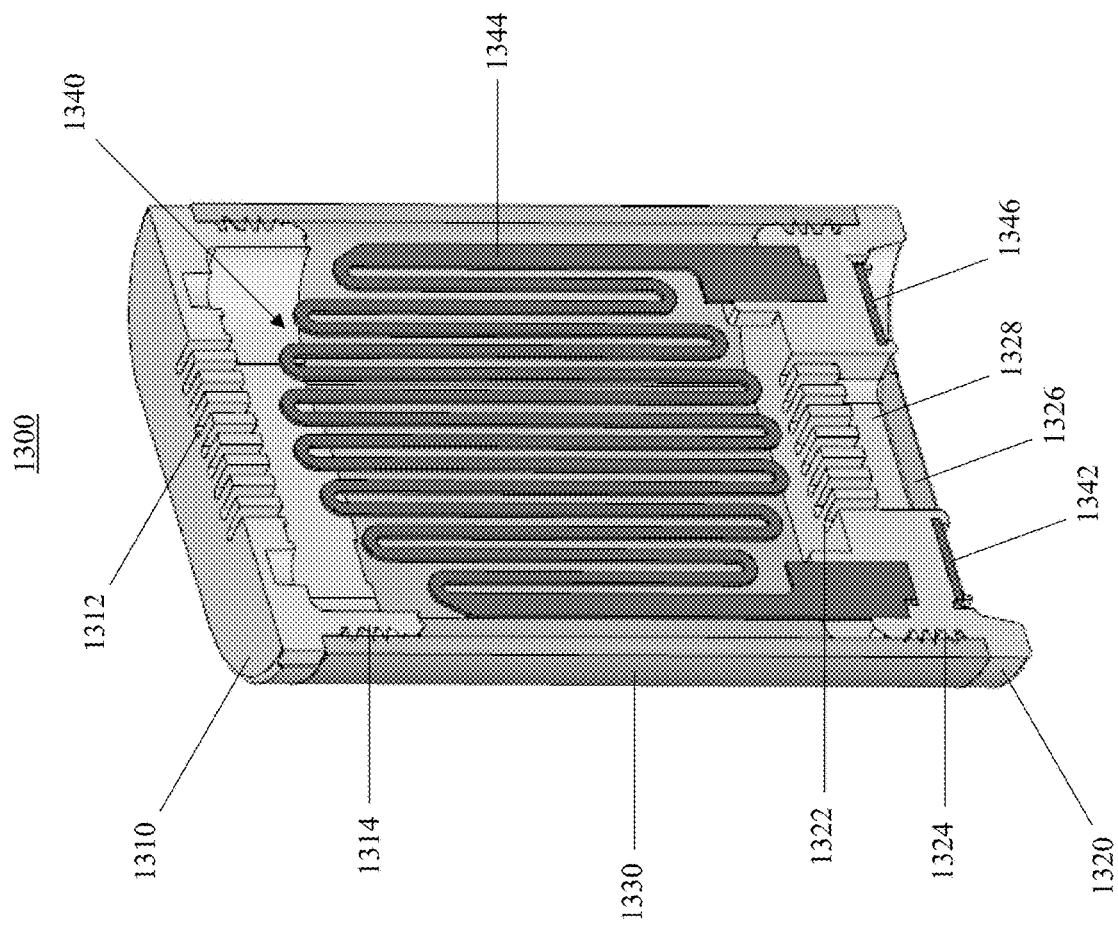
FIG. 10 is a cross-sectional view of the aerosol-generating capsule of FIG. 9.
Figure 11:
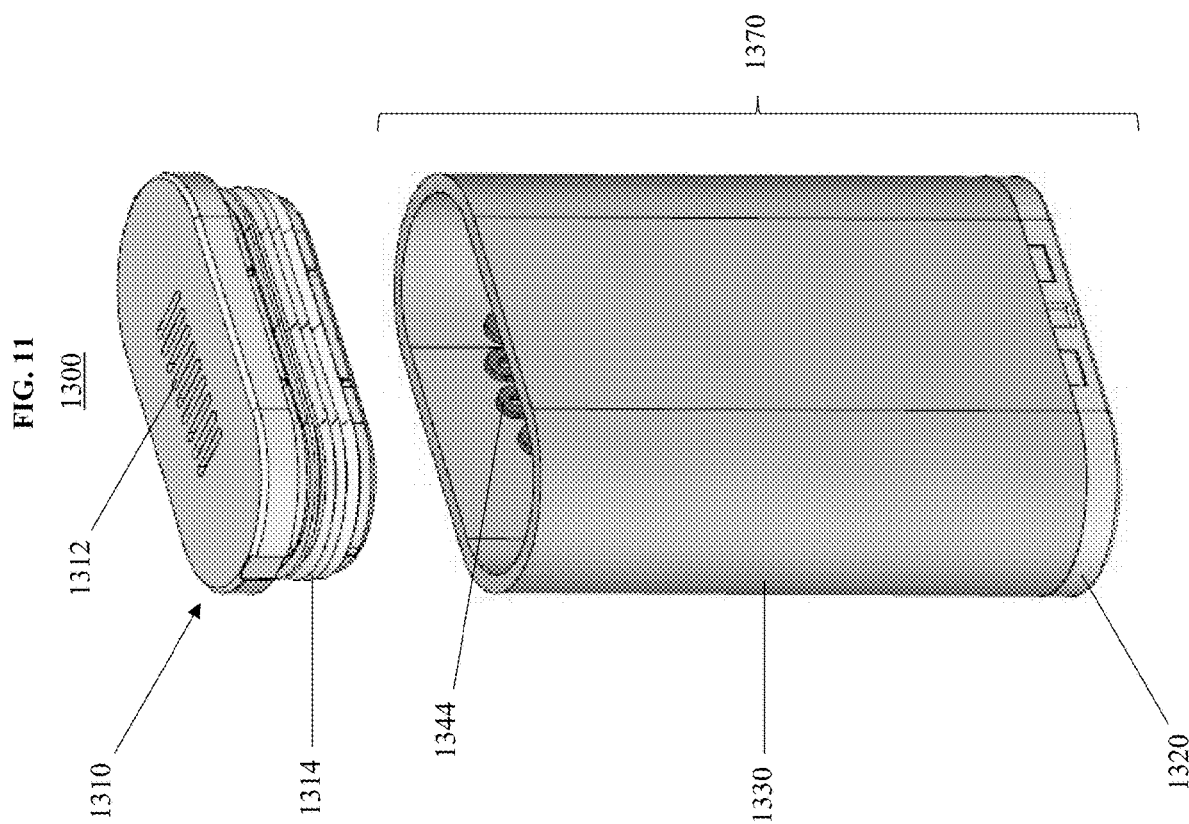
FIG. 11 is a partially-exploded view of the aerosol-generating capsule of FIG. 9.
Figure 12:
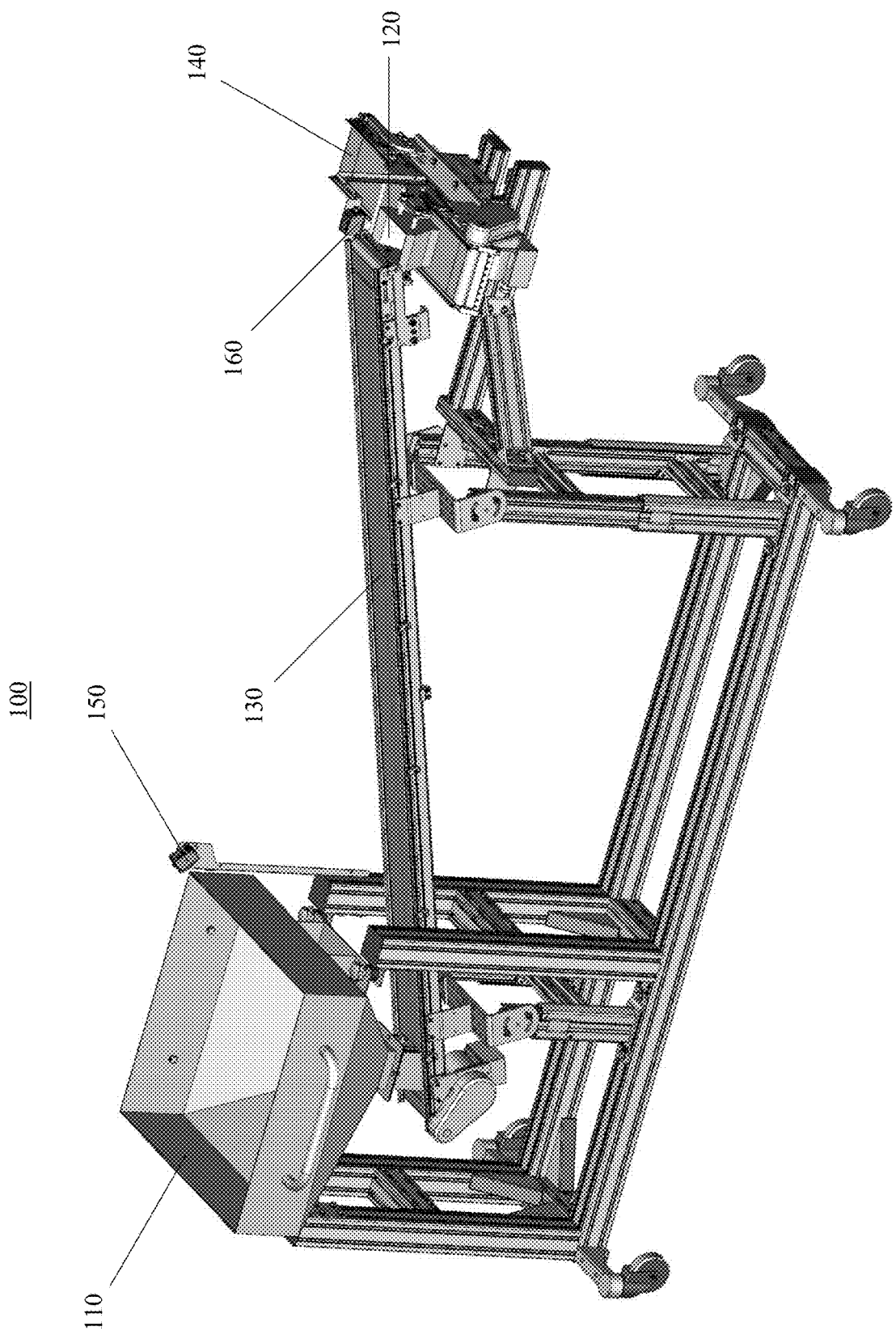
FIG. 12 is an isolated view of a substrate supply station according to an example embodiment.

FIG. 9 is a downstream perspective view of an aerosol-generating capsule for an aerosol-generating device according to an example embodiment. FIG. 10 is a cross-sectional view of the aerosol-generating capsule of FIG. 9. FIG. 11 is a partially-exploded view of the aerosol-generating capsule of FIG. 9. Referring to FIGS. 9-11, the capsule 1300 has a housing configured to contain an aerosol-forming substrate (e.g., aerosol-forming substrate 1860' in FIG. 28) and a heater, wherein the downstream portion of the housing may be in the form of a first end cap 1310 (e.g., downstream cap) as an aerosol-permeable top end. The upstream portion of the housing may be in the form of a second end cap 1320 (e.g., upstream cap, connector cap) as an air-permeable bottom end. The body portion of the housing may be in the form of a cover 1330 (e.g., shell, box sleeve).

The first end cap 1310 defines a first opening 1312, while the second end cap 1320 defines a second opening 1322. In an example embodiment, the first opening 1312 is in the form of a series of outlet openings (e.g., nine outlet openings), and the second opening 1322 is in the form of a series of inlet openings (e.g., eight inlet openings). In another instance, instead of being arranged in series, the openings may be arranged in an array of rows and columns. Additionally, each of the openings may have a width of about 0.26 mm-0.30 mm (e.g., 0.28 mm) to reduce or prevent the egress of particles of the aerosol-forming substrate. Although rectangular recesses are shown on the sides of the first end cap 1310 and the second end cap 1320, it should be understood that these features (e.g., gating features) are the result of a manufacturing process (e.g., injection molding) and may be omitted is some embodiments. Furthermore, the second end cap 1320 may expose a first end section 1342 and a second end section 1346 of a heater 1340. As illustrated, the second opening 1322 may be between the exposed portions of the first end section 1342 and the second end section 1346.

As shown in the drawings, the capsule 1300 has a shape wherein an end view or cross-section resembles a rectangle with a pair of opposing semicircular ends (e.g., elongated circle, obround, discorectangle, stadium, racetrack). The shape of the capsule 1300 may also be viewed as one wherein a cylinder has been diametrically elongated or flattened along its longitudinal axis. However, it should be understood that the capsule 1300 may have other suitable shapes. For example, in some instances, the capsule 1300 may have an ovoid or ellipsoid shape with an oval or elliptical cross-section. In other instances, the capsule 1300 may have a cuboid-like shape (e.g., rounded rectangular cuboid) with a rectangular cross-section. The chamber defined within the capsule 1300 may have the same or a different shape as the exterior of the capsule 1300. For instance, the cross-sections of the chamber and the exterior of the capsule 1300 may both be obround. In another instance, the cross-section of the chamber may be non-obround (e.g., rectangular), while the cross-section of the exterior of the capsule 1300 may be obround (or vice versa).

Referring to FIG. 10, the intermediate section 1344 of the heater 1340 is an internal segment configured to heat an aerosol-forming substrate within the capsule 1300. The first end section 1342 and the second end section 1346 of the heater 1340 are external segments configured to establish an electrical connection with a power source. While the heater 1340 may be in the form of a resistive heater, it should be understood that other options are possible. For instance, the heater 1340 may alternatively be in the form of a susceptor for inductive heating. In other instances, a heater may not even be present within the capsule 1300 but, instead, may be part of an aerosol-generating device that is designed to receive and heat the capsule 1300.

In addition to the second opening 1322, the second end cap 1320 also defines an alignment recess 1326 and an inlet recess 1328. The alignment recess 1326 and the inlet recess 1328 may be viewed as being in a multi-level arrangement, wherein the base/inner end surface of the alignment recess 1326 (which exposes the first end section 1342 and the second end section 1346) may be regarded as being on one level, while the base/inner end surface of the inlet recess 1328 (or the grille-like surface of the second opening 1322) may be regarded as being on another level. The alignment recess 1326 is configured to facilitate a positioning of the capsule 1300 during its insertion into the device body of an aerosol-generating device. In an example embodiment, the alignment recess 1326 has angled sidewalls which taper inward toward the inlet recess 1328. With the angled sidewalls, the alignment recess 1326 may be quickly coupled with a corresponding engagement member of the device body with greater ease. For instance, when received within the capsule-receiving cavity of the aerosol-generating device, the alignment recess 1326 of the capsule 1300 may be engaged with the angled surfaces, while the inlet recess 1328 of the capsule 1300 may be engaged with the capsule seal. As a result, the capsule 1300 may be properly loaded and aligned within the device body of the aerosol-generating device in a relatively consistent manner.

The first end cap 1310 includes a first sealing ridge 1314, while the second end cap 1320 includes a second sealing ridge 1324. In an example embodiment, the first sealing ridge 1314 is in the form of a series of ribs (e.g., four ribs), and the second sealing ridge 1324 is in the form of a series of ribs (e.g., four ribs). In some instances, the ribs in each of the series may be of different heights to ensure a desired contact with the cover 1330. When the capsule 1300 is assembled, the first sealing ridge 1314 of the first end cap 1310 and the second sealing ridge 1324 of the second end cap 1320 are configured to interface with the inner surface of the cover 1330 (e.g., via an interference fit) to provide an air seal. As a result, when air is directed to the capsule 1300 during an operation of the aerosol-generating device, the air will enter the capsule 1300 via the inlet recess 1328 and the second opening 1322 in the second end cap 1320 (as opposed to entering the capsule 1300 via a gap between the second end cap 1320 and the cover 1330, wherein such air may essentially just flow along the inner surface of the cover 1330 so as to primarily bypass the aerosol-forming substrate and/or the intermediate section 1344 of the heater 1340). Similarly, with an appropriate seal, the aerosol generated within the chamber of the capsule 1300 will be drawn out through the first opening 1312 in the first end cap 1310 (as opposed to leaking out through a gap between the first end cap 1310 and the cover 1330).

The first end cap 1310 and the second end cap 1320 may be configured to include lead-in features to facilitate their introduction into the cover 1330. For instance, the first end cap 1310 may have a distal end with a periphery in a form of a tapered edge. Similarly, the second end cap 1320 may have a proximal end with a periphery in a form of a tapered edge. Such configurations may ease the insertions of the first end cap 1310 and the second end cap 1320 into the cover 1330 (e.g., via press fitting) during the assembly of the capsule 1300. As discussed herein, a capsule casing 1370 may be filled with an aerosol-forming substrate in the filling station 400 and then capped with a first end cap 1310 in the capping station 500 to produce the capsule 1300.

FIG. 12 is an isolated view of a substrate supply station according to an example embodiment. Referring to FIG. 12, the substrate supply station 100 includes a first substrate hopper 110 for initially receiving the aerosol-forming substrate which is transported with a first substrate conveyor 130 to the second substrate hopper 120. A second substrate conveyor 140 transports the aerosol-forming substrate to the filling station 400. A first substrate inspection device 150 and a second substrate inspection device 160 may be utilized in connection with the first substrate hopper 110 and the second substrate hopper 120, respectively.

FIG. 13 is an enlarged view that includes a capsule casing supply station according to an example embodiment. Referring to FIG. 13, the capsule casing supply station 200 includes a capsule casing hopper 210 for initially receiving a supply of empty capsule casings which make their way to the capsule casing orientation bowl 220. An orientation bowl inspection device 250 may be utilized in some embodiments. Oriented capsule casings make their way into the supply track 230 which becomes the pre-filling inspection track 330.

The pre-filling inspection drum 310 inspects the capsule casings for improper orientation and physical defects (e.g., upside down capsule casings, dented top rims) and identifies the capsule casings deemed to be improper. At the pre-filling rejection drum 320, the capsule casings deemed to be improper are then rejected into a rejection chute 326 which leads to a rejection bin 328.

FIG. 14 is a photograph of a capsule casing orientation bowl of a capsule casing supply station according to an example embodiment. Referring to FIG. 14, the capsule casing orientation bowl 220' is configured as a recirculating loop wherein electromagnetic pulses acting on the underlying spring structure cause the capsule casings 1370' to advance up the spiral path which has sections that favor (from a center of gravity perspective) capsule casings 1370' that are bottom heavy (i.e., properly oriented with the closed end down and open end up) and are able to pass while other capsule casings 1370' that are top-heavy (i.e., upside down and, thus, improperly oriented) will fall down to a lower level and repeat the movement until the proper orientation is achieved which eventually leads to the track (e.g., supply track 230) away from the capsule casing supply station.

FIG. 15 is an enlarged view of a track for supplying capsule casings to a pre-filling inspection station according to an example embodiment. Referring to FIG. 15, the capsule casing 1370 may be moved through the supply track 230 and the pre-filling inspection track 330 (which may be referred to collectively as an interstation capsule casing track, a casing track, or simply a track) using compressed air. The compressed air may be released at an upstream location of the track (e.g., supply track 230) and operated such that the force on the capsule casing 1370 is sufficient to propel it in a downstream direction along the remainder of the track to the pre-filling inspection station 300. As a result, the capsule casings 1370 can be continuously supplied from the capsule casing supply station 200 and driven along the track to the pre-filling inspection station 300 by the compressed air so as to maintain a queue in the downstream end of the pre-filling inspection track 330 for uptake by the pre-filling inspection drum 310. In other instances, a conveyor belt (e.g., analogous to cap conveyor 572 in FIG. 36) within the supply track 230 and the pre-filling inspection track 330 may be used. In such an instance, a conveyor belt may be arranged to physically engage or otherwise contact the capsule casing 1370 so as to drive it along the supply track 230 and the pre-filling inspection track 330. The conveyor belt may be positioned to contact the bottom and/or side(s) of the capsule casing 1370. Additionally, the conveyor belt may be in the form of a single belt or a plurality of belts that span all/an entirety, substantially all, or just a part/portion/section/segment of the track between the capsule casing supply station 200 and the pre-filling inspection station 300. With regard to an example embodiment where the conveyor belt spans just a part/portion/section/segment of the track, the conveyor belt may be provided at an upstream location of the track (e.g., supply track 230) and operated such that the contact between the capsule casing 1370 and the moving conveyor belt is sufficient to propel the capsule casing 1370 in a downstream direction along the remainder of the track to the pre-filling inspection station 300. Furthermore, the track may have a gradual/slight slope or decline for at least part of the path from the capsule casing supply station 200 to the pre-filling inspection station 300 to facilitate the travel of the capsule casing 1370 and the formation/maintenance of the queue (e.g., via gravity assist).

Figure 16:
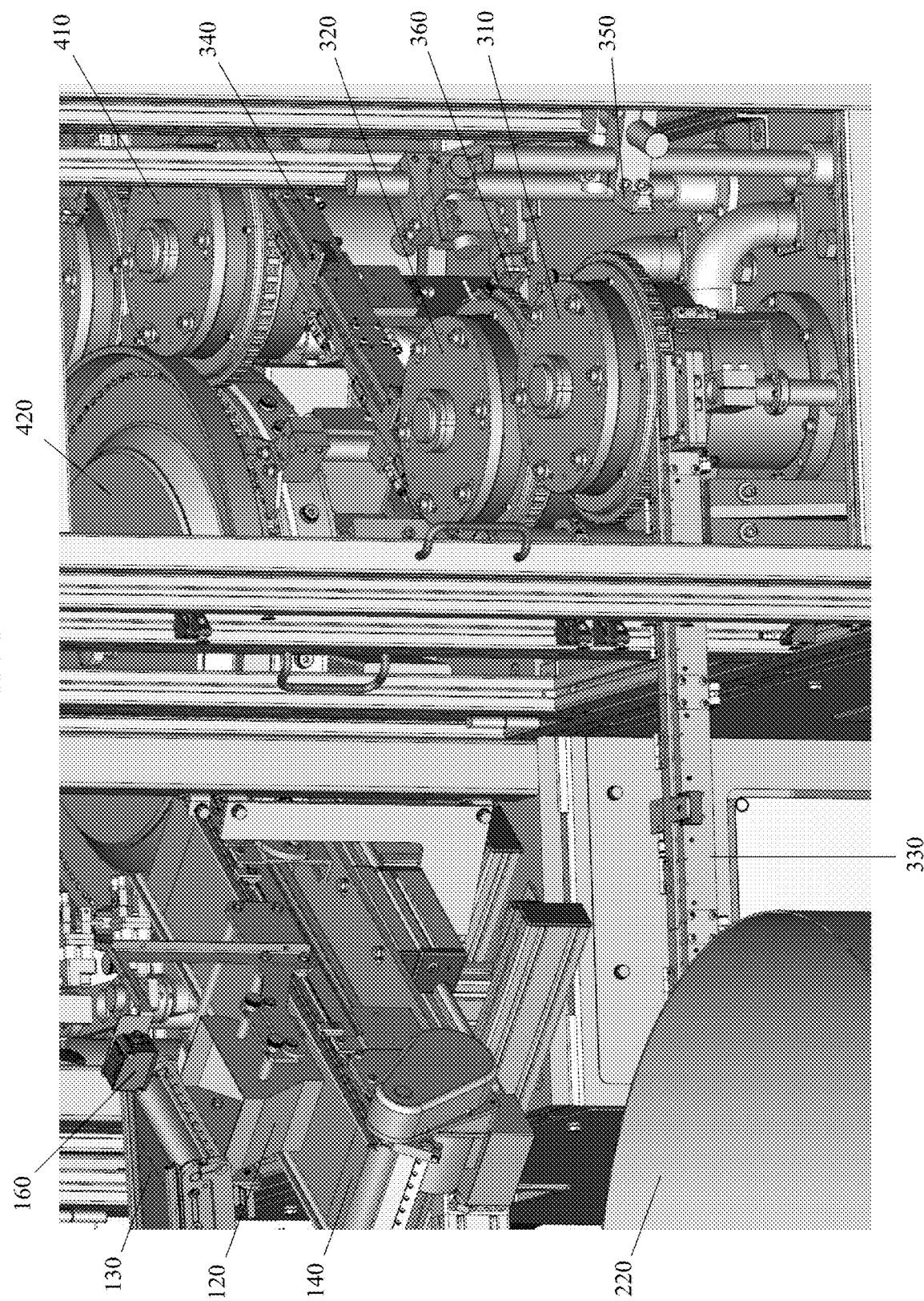
FIG. 16 is an enlarged view that includes a pre-filling inspection station according to an example embodiment.

FIG. 16 is an enlarged view that includes a pre-filling inspection station according to an example embodiment. Referring to FIG. 16, the queue of capsule casings 1370 in the pre-filling inspection track 330 is designed such that, when transferred to the pre-filling inspection drum 310, each flute of the pre-filling inspection drum 310 will be occupied by a capsule casing 1370. Downstream from the pre-filling inspection drum 310 is a pre-filling rejection drum 320, and capsule casings 1370 which make it past the pre-filling rejection drum 320 are directed into a filling track 340 which feeds into the transfer drum 410 of the filling station 400.

Figure 17:
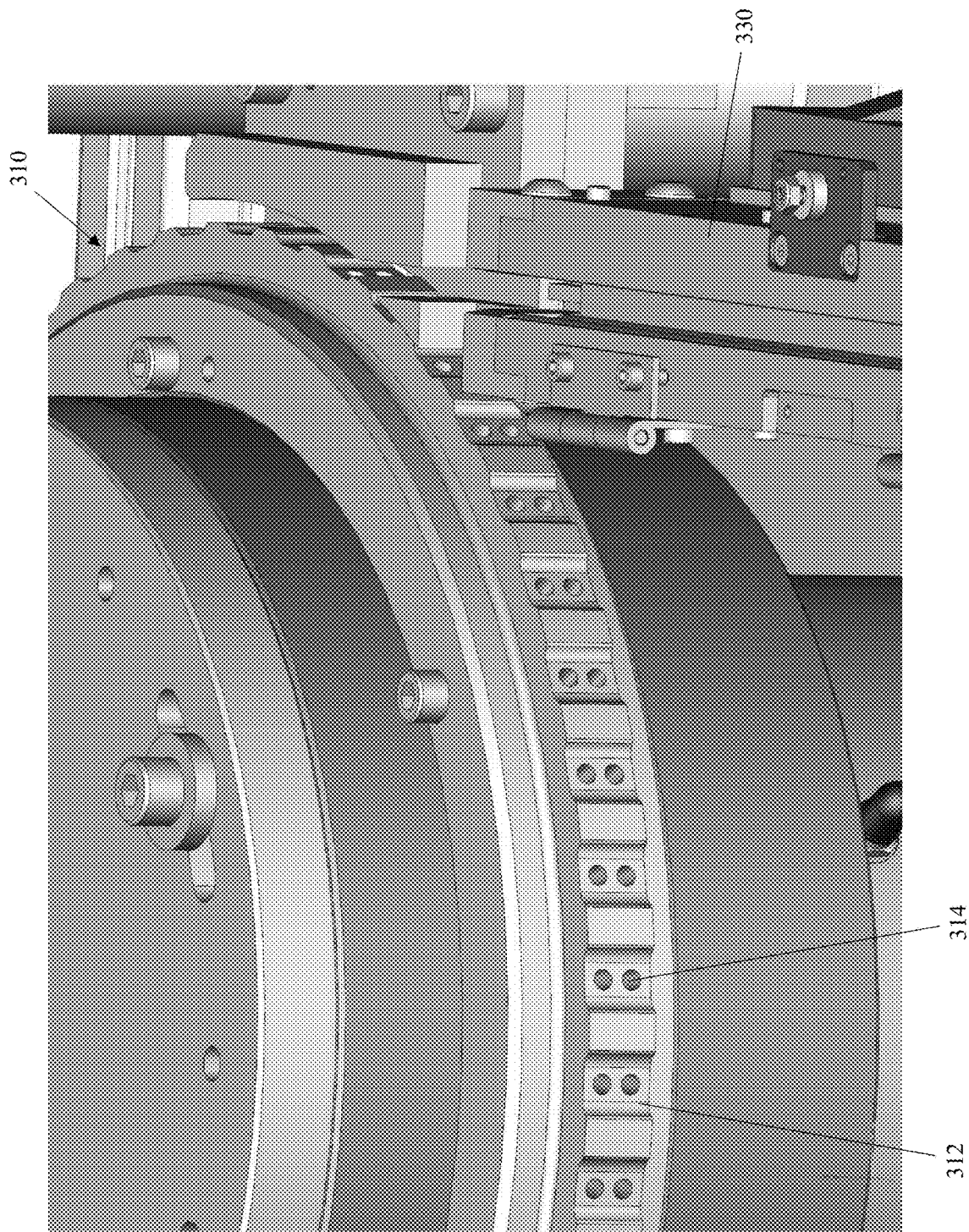
FIG. 17 is an enlarged view of a transfer point at an upstream side of a pre-filling inspection station according to an example embodiment.

FIG. 17 is an enlarged view of a transfer point at an upstream side of a pre-filling inspection station according to an example embodiment. Referring to FIG. 17, the pre-filling inspection drum 310 is configured to receive capsule casings 1370 (from the pre-filling inspection track 330) in the flutes 312 defined on the drum surface. Additionally, ports 314 assist in holding onto the capsule casings 1370 when a vacuum is applied. For instance, the queue of capsule casings 1370 in the pre-filling inspection track 330 may be designed such that the capsule casings 1370 are urged toward the pre-filling inspection drum 310 (e.g., via compressed air and/or conveyor belt(s)). As a result, when the pre-filling inspection drum 310 rotates (e.g., counterclockwise) and accepts a capsule casing 1370 in a flute 312, the queue will advance such that the next capsule casing 1370 will be ready to be accepted by the next flute 312 and so forth. Furthermore, although two ports 314 are illustrated as being in each flute 312 of the pre-filling inspection drum 310, it should be understood that example embodiments are not limited thereto. For instance, each flute 312 may have a single port 314 or a plurality of ports 314 (e.g., 3 ports).

Figure 18:
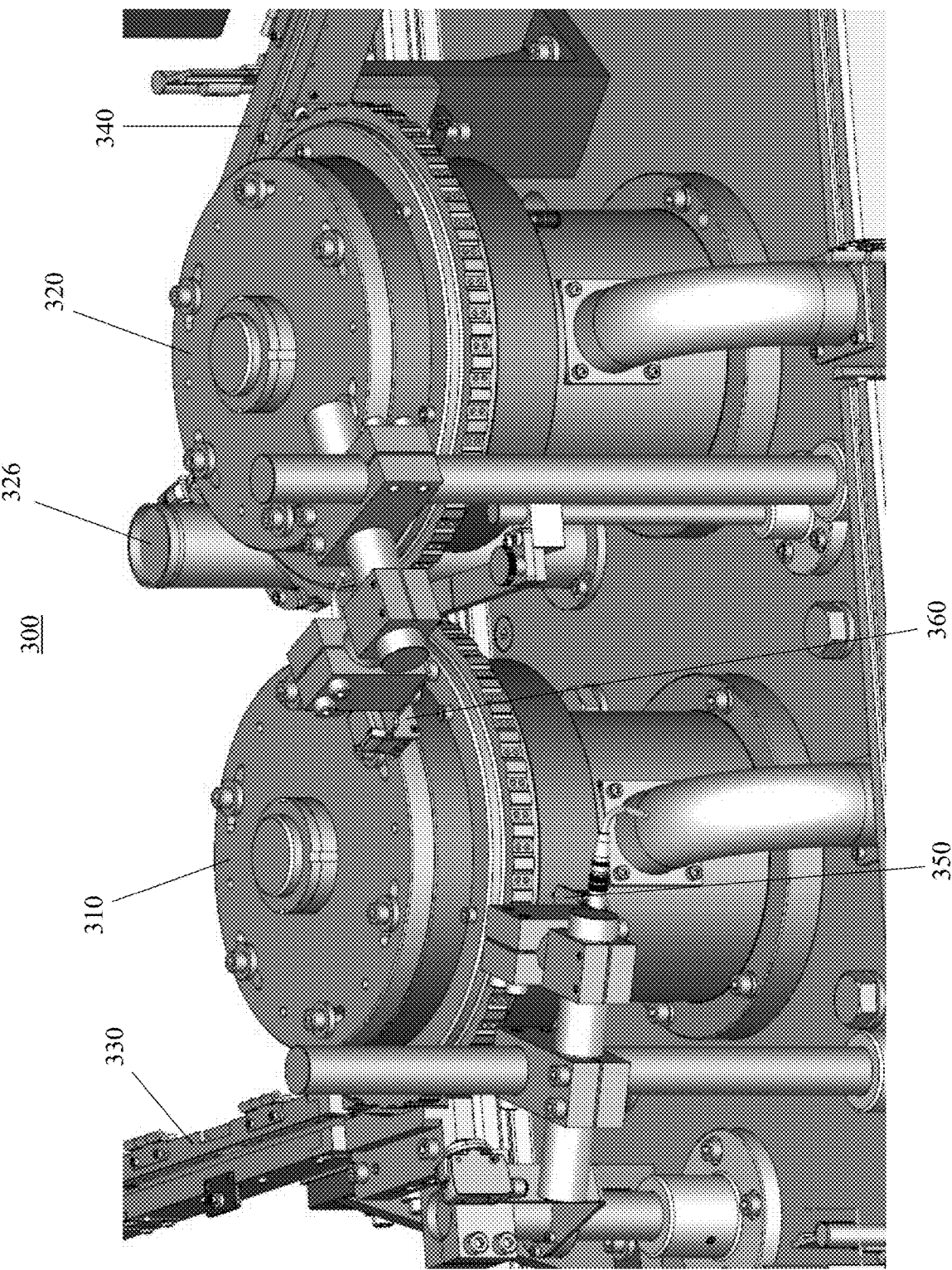
FIG. 18 is another enlarged view that includes a pre-filling inspection station according to an example embodiment.

FIG. 18 is another enlarged view that includes a pre-filling inspection station according to an example embodiment. Referring to FIG. 18, while on the pre-filling inspection drum 310, a capsule casing 1370 is inspected by a first pre-filling inspection device 350 and a second pre-filling inspection device 360. The first pre-filling inspection device 350 inspects a capsule casing 1370 from the side, while the second pre-filling inspection device 360 inspects the capsule casing 1370 from above. Although the pre-filling inspection station 300 is illustrated such that an inspection of a capsule casing 1370 from the side by the first pre-filling inspection device 350 occurs before an inspection of the capsule casing 1370 from above by the second pre-filling inspection device 360, it should be understood that example embodiments are not limited thereto. For instance, in the alternative, the pre-filling inspection station 300 may be configured such that the second pre-filling inspection device 360 initially inspects the capsule casing 1370 from above and then the first pre-filling inspection device 350 subsequently inspects the capsule casing 1370 from the side. In yet another instance, a single pre-filling inspection device may be used to simultaneously inspect a capsule casing 1370 from the side and from above.

Figure 19:
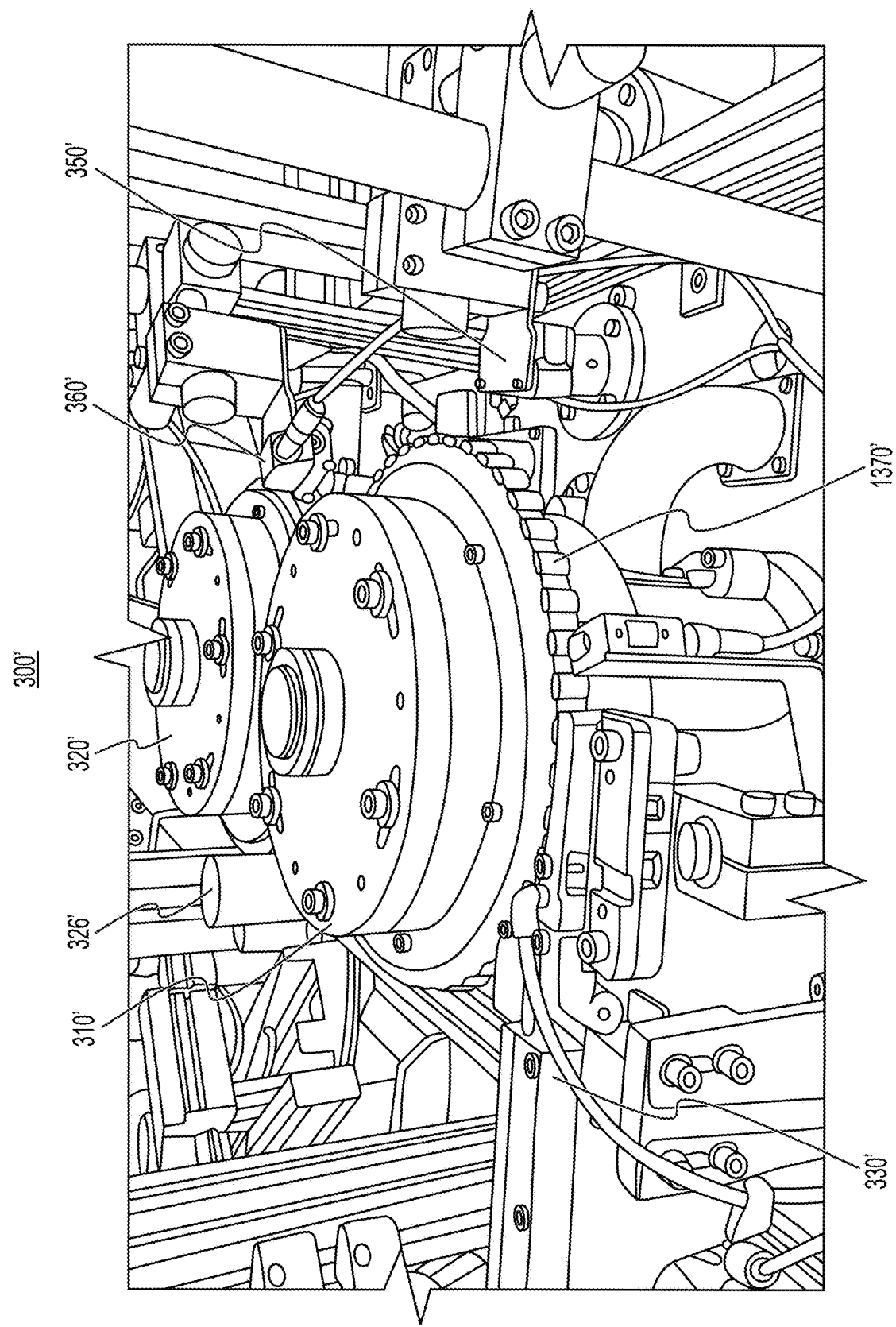
FIG. 19 is a photograph of a pre-filling inspection station according to an example embodiment.

FIG. 19 is a photograph of a pre-filling inspection station according to an example embodiment. Referring to FIG. 19, a queue of capsule casings 1370' from the pre-filling inspection track 330' are received by the pre-filling inspection drum 310' and inspected by a first pre-filling inspection device 350' and a second pre-filling inspection device 360'. Moving onward, the capsule casings 1370' on the pre-filling inspection drum 310' are transferred to the pre-filling rejection drum 320' where capsule casings 1370' identified as being improper (by the first pre-filling inspection device 350' and/or the second pre-filling inspection device 360') are rejected into a rejection chute 326'.

Figure 20:
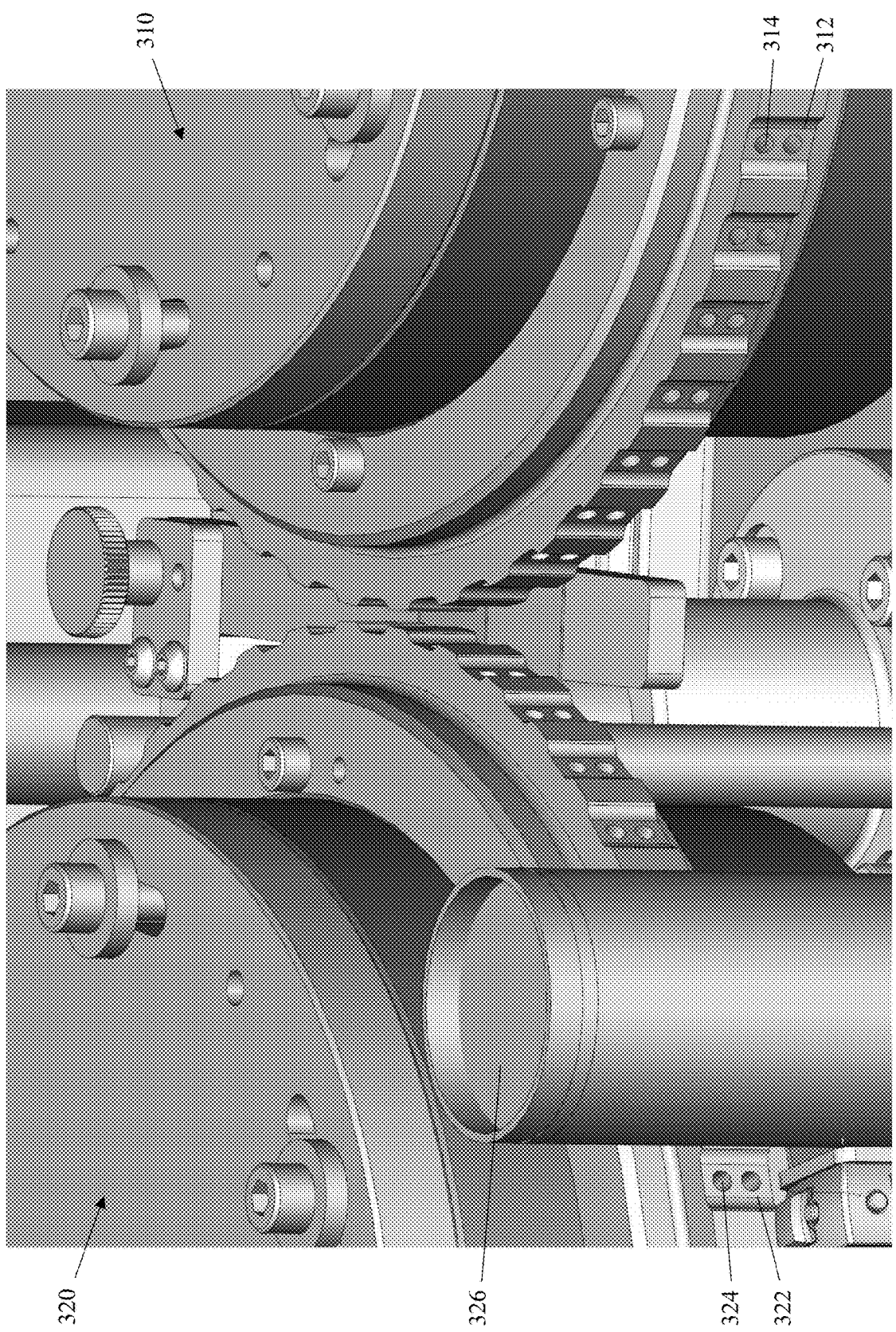
FIG. 20 is an enlarged view of a transfer point between a pre-filling inspection drum and a pre-filling rejection drum of a pre-filling inspection station according to an example embodiment.

FIG. 20 is an enlarged view of a transfer point between a pre-filling inspection drum and a pre-filling rejection drum of a pre-filling inspection station according to an example embodiment. Referring to FIG. 20, a capsule casing 1370 (e.g., analogous to capsule casing 1370' in FIG. 19) seated in a flute 312 of the pre-filling inspection drum 310 and held with a vacuum applied via the ports 314 will undergo drum-to-drum transfer at a transfer point with the pre-filling rejection drum 320 such that the capsule casing 1370 will become seated in a flute 322 and held with a vacuum applied via the ports 324. It should be understood that the transfer point is the location where a capsule casing 1370 seated in a flute 312 of the pre-filling inspection drum 310 (e.g., rotating counterclockwise) comes in sufficient proximity to a flute 322 in the pre-filling rejection drum 320 (e.g., rotating clockwise) to allow a transfer of the capsule casing 1370 to the flute 322 in the pre-filling rejection drum 320. In an example embodiment, a vacuum in connection with the ports 314 in a flute 312 of the pre-filling inspection drum 310 is momentarily interrupted or halted at the transfer point to facilitate the transfer of a capsule casing 1370 via a vacuum in connection with the ports 324 in a corresponding flute 322 of the pre-filling rejection drum 320. Furthermore, capsule casings 1370 previously identified on the pre-filling inspection drum 310 as being improper (by the first pre-filling inspection device 350 and/or the second pre-filling inspection device 360) can be rejected into a rejection chute 326. For instance, the rejection chute 326 may have an opening (hidden from view in FIG. 20) into which an improper capsule casing 1370 can be ejected (e.g., via a puff of air from one or more corresponding ports 324) when the flute 322 with the improper capsule casing 1370 passes in front of the opening in the rejection chute 326. When a puff of air is used to eject an improper capsule casing 1370, the puff of air may be designed to be forceful enough to overcome the vacuum currently holding the capsule casing 1370 in the flute 322 of the pre-filling rejection drum 320.

Figure 21:
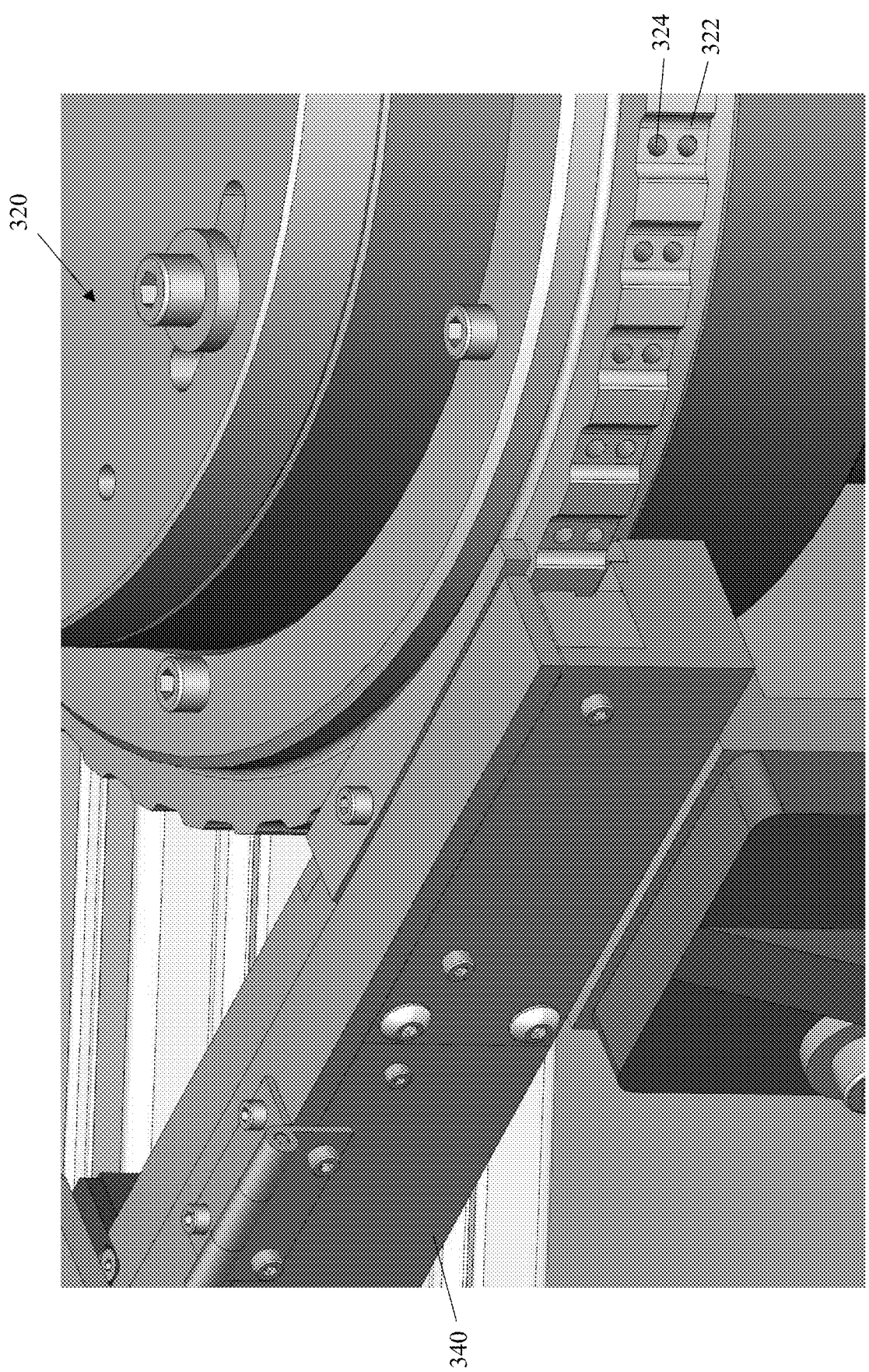
FIG. 21 is an enlarged view of a transfer point at a downstream side of a pre-filling inspection station according to an example embodiment.

FIG. 21 is an enlarged view of a transfer point at a downstream side of a pre-filling inspection station according to an example embodiment. Referring to FIG. 21, as the pre-filling rejection drum 320 rotates clockwise, the capsule casings 1370 in the flutes 322 are delivered to the filling track 340. In an example embodiment, the interface of the pre-filling rejection drum 320 and the filling track 340 may include a deflector (e.g., wedge or other structure with a tapered edge) that is configured to dislodge the capsule casings 1370 from the flutes 322 of the pre-filling rejection drum 320. For instance, the deflector may have a first surface and a second surface, wherein the first surface meets the second surface at a tapered edge. The first surface of the deflector may define a sidewall to/of an entrance of the filling track 340, while the second surface of the deflector may face the pre-filling rejection drum 320. In some instances, the second surface of the deflector may also have a curvature that corresponds to the curvature of the drum surface of the pre-filling rejection drum 320 that defines the flutes 322. The orientation and proximity of the deflector to the pre-filling rejection drum 320 is such that there will not be enough clearance for the capsule casings 1370 to remain in the flutes 322 after encountering the deflector. As a result, as the pre-filling rejection drum 320 rotates clockwise, the capsule casings 1370 will encounter the tapered edge of the deflector and become dislodged from the flutes 322. Furthermore, the momentum of the capsule casings 1370 from the rotation of the pre-filling rejection drum 320 will help to propel the dislodged capsule casings 1370 into and along the filling track 340. The filling track 340 defines an internal channel that leads to the filling station 400.

Figure 22:
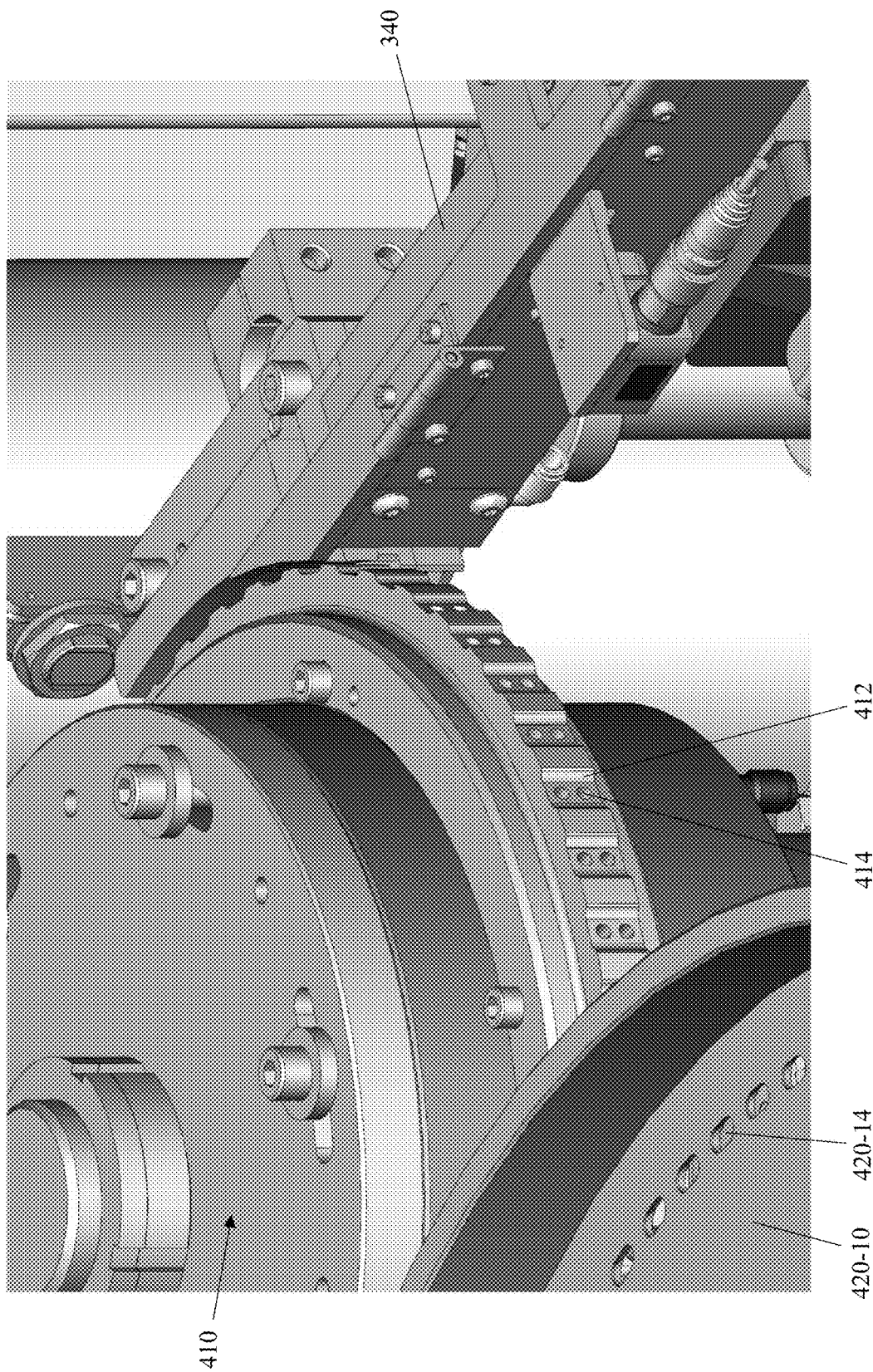
FIG. 22 is an enlarged view of a transfer point at an upstream side of a filling station according to an example embodiment.

FIG. 22 is an enlarged view of a transfer point at an upstream side of a filling station according to an example embodiment. Referring to FIG. 22, the transfer drum 410 receives capsule casings 1370 from the filling track 340 such that the capsule casings 1370 are seated in flutes 412 and held with a vacuum applied via the ports 414. As discussed supra (e.g., in connection with FIGS. 15-19), compressed air and/or conveyor belt(s) may also be used to form and maintain a queue of capsule casings 1370 in at least the downstream end of the filling track 340. As a result, when the transfer drum 410 rotates (e.g., counterclockwise) and accepts a capsule casing 1370 in a flute 412, the queue will advance such that the next capsule casing 1370 will be ready to be accepted by the next flute 412 and so forth. From the transfer drum 410, the capsule casings 1370 will be transported to a filling drum 420 for engagement with a filling receptacle, e.g., a filling pan 420-10, via ports 420-14 defined therein.

Figure 23:
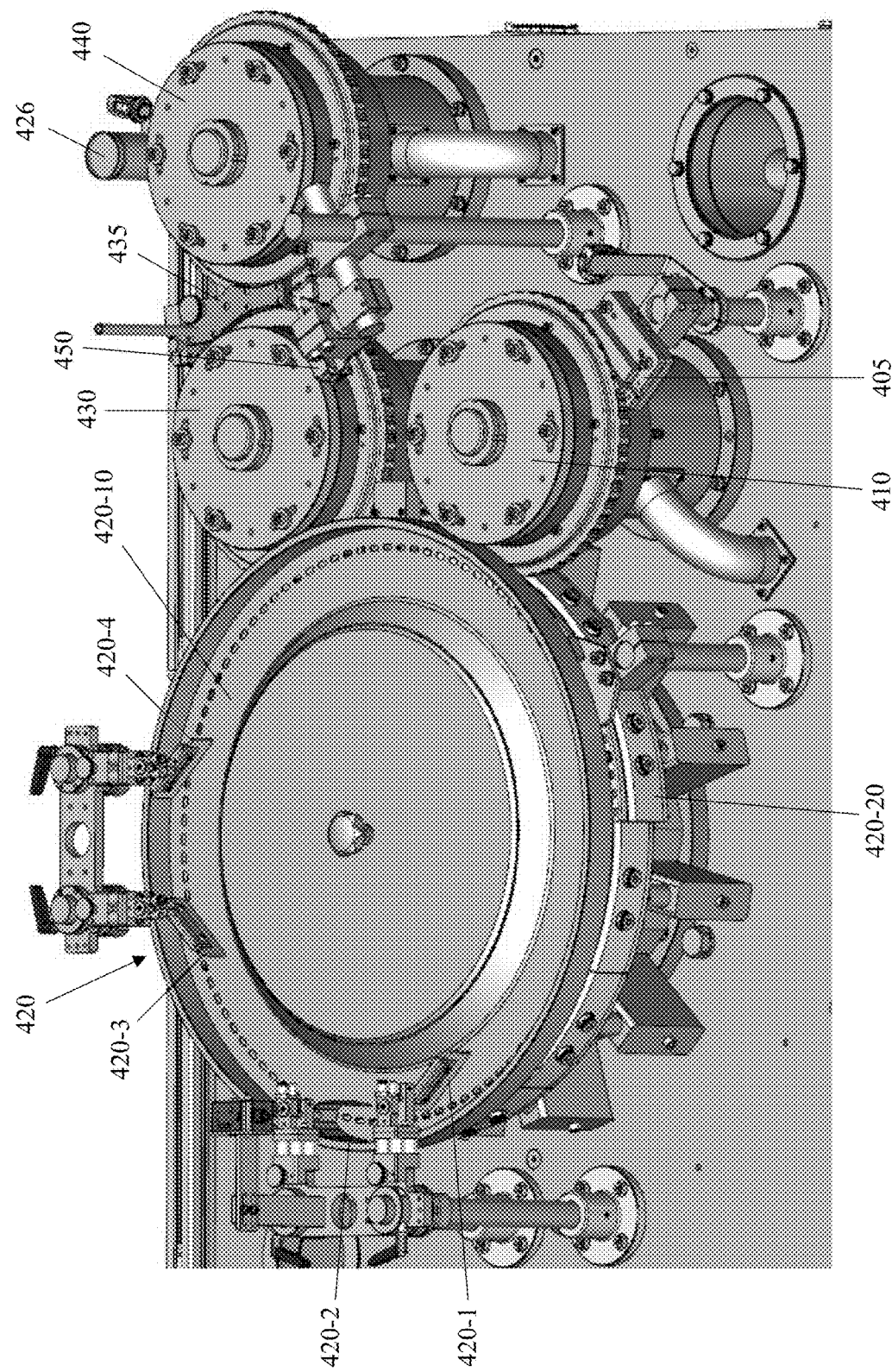
FIG. 23 is a perspective view of a filling station according to an example embodiment.

FIG. 23 is a perspective view of a filling station according to an example embodiment. Referring to FIG. 23, capsule casings 1370 may be received by the transfer drum 410 of the filling station 400 with the assistance of a transfer guide 405. Subsequently capsule casings 1370 from the transfer drum 410 are received on the carriages 420-20 of the filling drum 420. Aerosol-forming substrate that is supplied to the filling pan 420-10 are acted upon by the first baffle 420-1, the second baffle 420-2, the third baffle 420-3, and the fourth baffle 420-4. The filled capsule casings move on to the post-filling inspection drum 430 and are inspected by the post-filling inspection device 450. Capsule casings 1370 then move on to the post-filling rejection drum 440 with the optional assistance of a transfer guide 435, and capsule casings 1370 deemed to be improperly filled (via inspection by the post-filling inspection device 450) can be rejected into a rejection chute 426. Alternatively, the improperly filled capsule casings can be subsequently rejected in the capping station 500 (e.g., to reduce the potential mess of ejecting a filled capsule casing 1370 that has not been capped).

Figure 24:
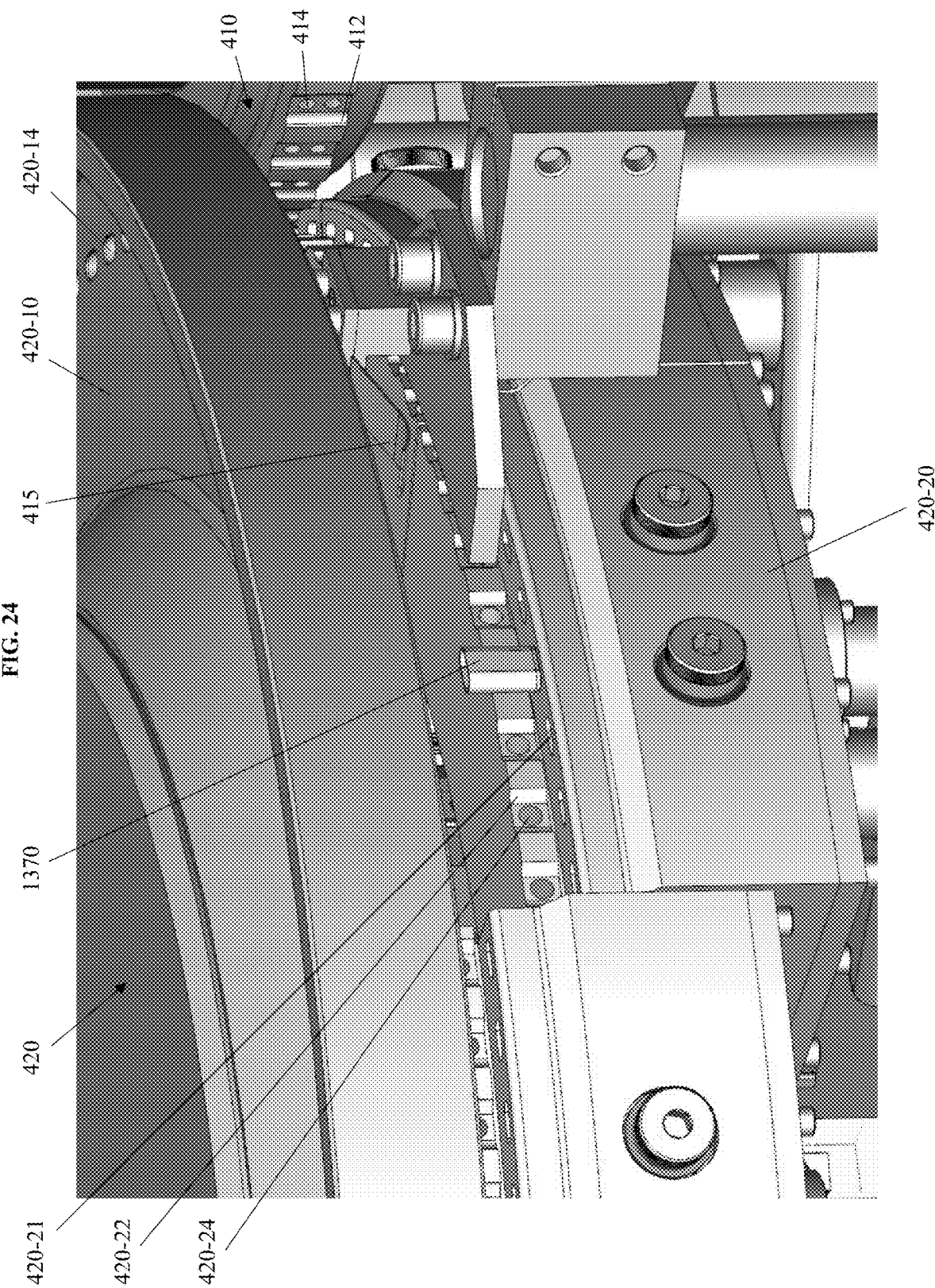
FIG. 24 is an enlarged view that includes carriages of a filling station according to an example embodiment.

FIG. 24 is an enlarged view that includes carriages of a filling station according to an example embodiment. Referring to FIG. 24, when transferred from the transfer drum 410 to the filling drum 420, a capsule casing 1370 is configured to be seated within a flute 420-22 of the carriage 420-20 and held with a vacuum applied via the port 420-24 (which may also be referred to as a vacuum port). In other instances, the capsule casing 1370 may be directed to and retained in the flute 420-22 via mechanical guides and retaining structures so as to render the port 420-24 optional. Additionally, a height guide 415 will help ensure that the capsule casing 1370 is positioned to cover the port 420-21 (which may also be referred to as a vacuum port), which facilitates the vacuum filling with the aerosol-forming substrate. As will be discussed herein in more detail, the aerosol-forming substrate is supplied to the filling pan 420-10 and is drawn through the ports 420-14 to the capsule casings 1370 during vacuum filling.

Figure 25:
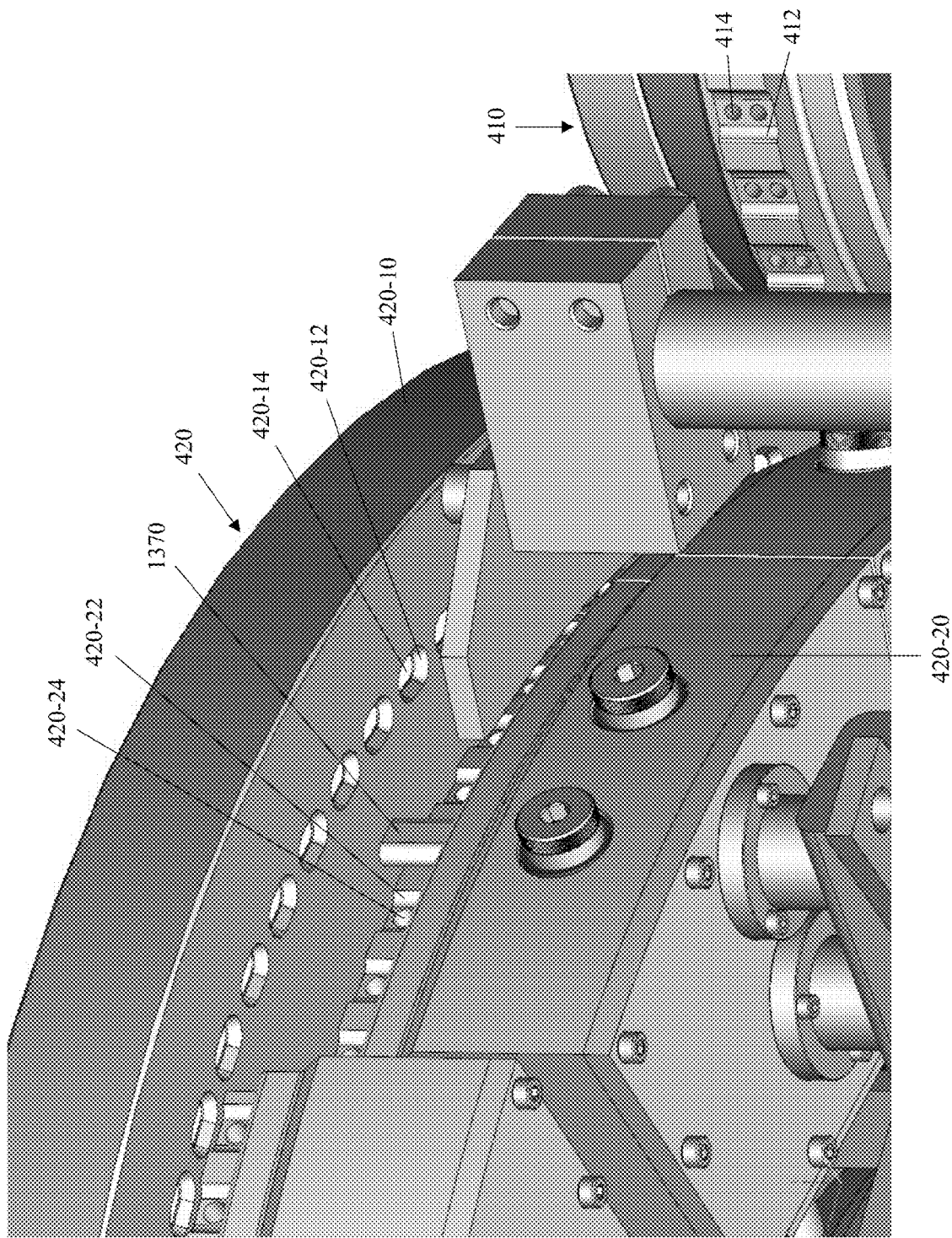
FIG. 25 is an enlarged view that includes an underside of a filling pan of a filling station according to an example embodiment.

FIG. 25 is an enlarged view that includes an underside of a filling pan of a filling station according to an example embodiment. Referring to FIG. 25, the ports 420-14 (which may also be referred to as vacuum ports) in the filling pan 420-10 each have a chamfered edge 420-12 (e.g., 30 degree angle) which facilitates the insertion of the capsule casing 1370 into the port 420-14 when the carriage 420-20 is raised to permit filling with the aerosol-forming substrate.

Figure 26:
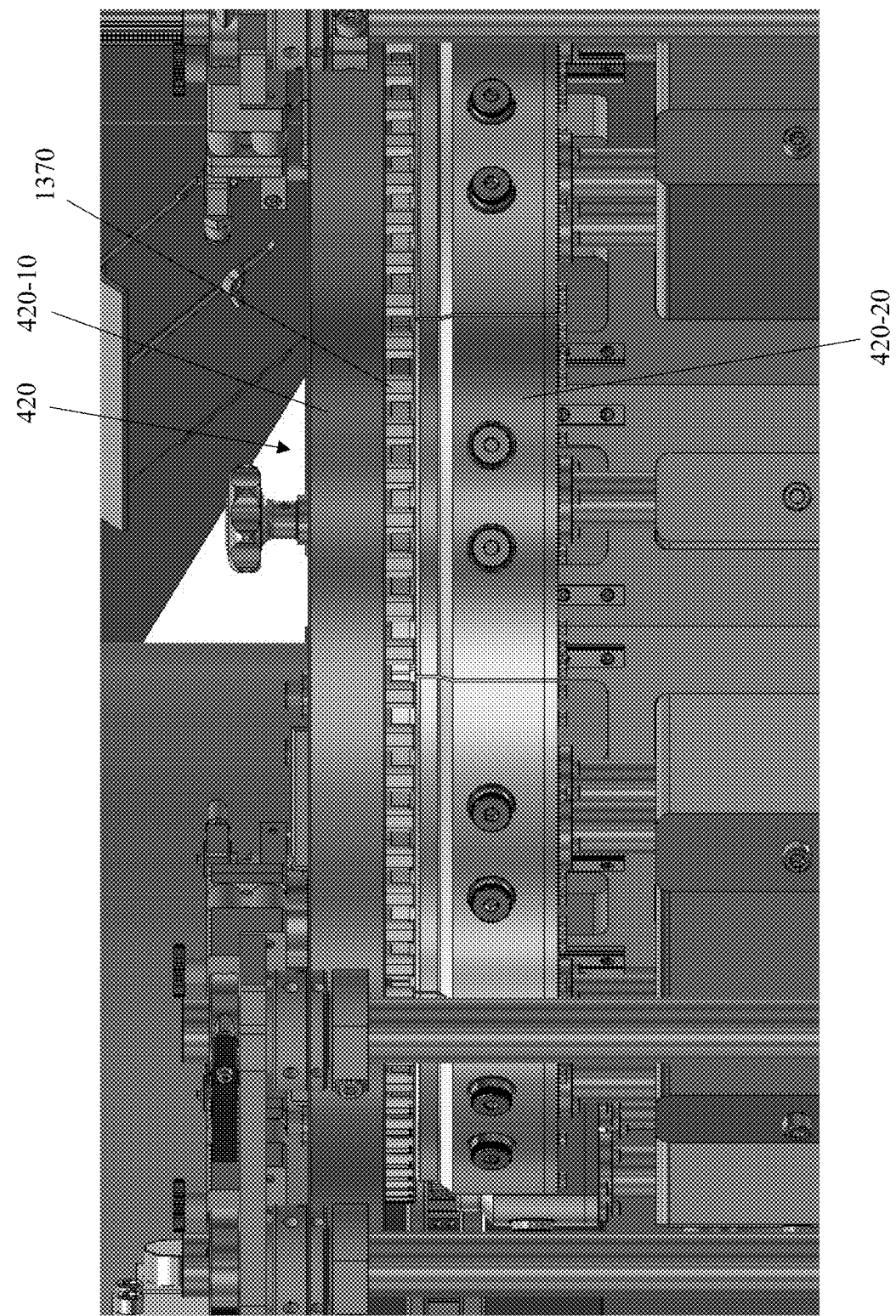
FIG. 26 is an enlarged view that includes a filling drum of a filling station according to an example embodiment.

FIG. 26 is an enlarged view that includes a filling drum of a filling station according to an example embodiment. Referring to FIG. 26, the carriages 420-20 of the filling drum 420 are configured to move axially between a lowered position (for loading/unloading capsule casings 1370) and a raised position (for filling the capsule casings 1370). As shown, the carriages 420-20 in the raised position are in the filling zone and will lower once out of the filling zone to enable transfer from the filling drum 420.

Figure 27:
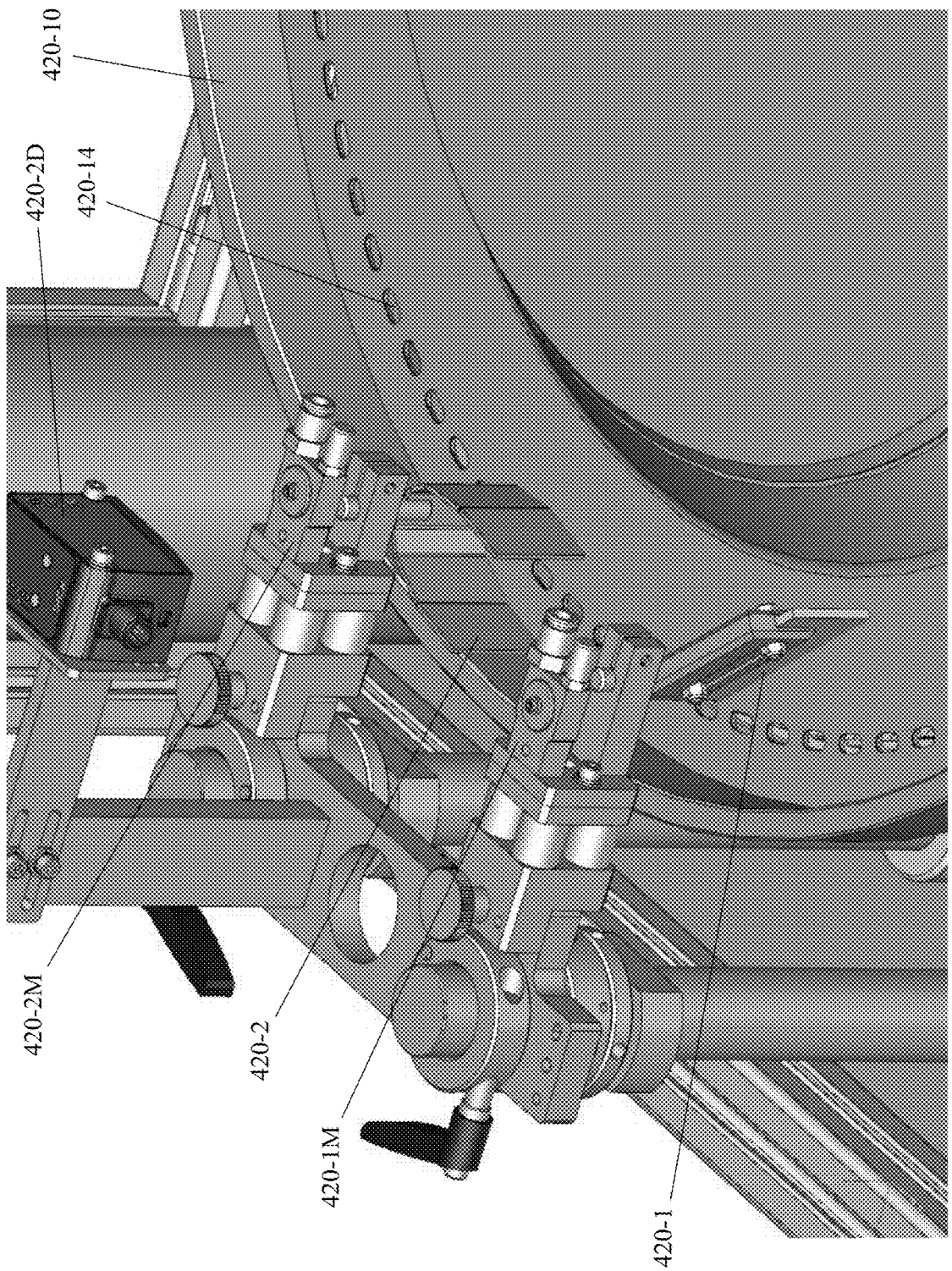
FIG. 27 is an enlarged view that includes a pair of baffles of a filling station according to an example embodiment.

FIG. 27 is an enlarged view that includes a pair of baffles of a filling station according to an example embodiment. Referring to FIG. 27, a first motor 420-1M (e.g., pneumatic vibratory motor) is used to vibrate a first baffle 420-1. The vibration functions to increase the particulate motion of the aerosol-forming substrate such that it becomes more fluidic-like and enhances filling. The first baffle 420-1 is angled to deflect the aerosol-forming substrate toward the ports 420-14 when the filling pan 420-10 rotates, wherein a vacuum applied through the capsule cases 1370 will cause the aerosol-forming substrate to flow through the ports 420-14 and into the capsule cases 1370.

A second motor 420-2M (e.g., pneumatic vibratory motor) is also used to vibrate a second baffle 420-2. The second baffle 420-2 is curved (e.g., U-shaped or C-shaped) and is designed to catch some of the aerosol-forming substrate when the filling pan 420-10 rotates. A detector 420-2D measures a height of the temporary build-up of aerosol-forming substrate caught by the second baffle 420-2 and will signal that (or control) the supply of aerosol-forming substrate should be slowed if the height is greater than an upper threshold or increased if the height is below a lower threshold.

Figure 28:
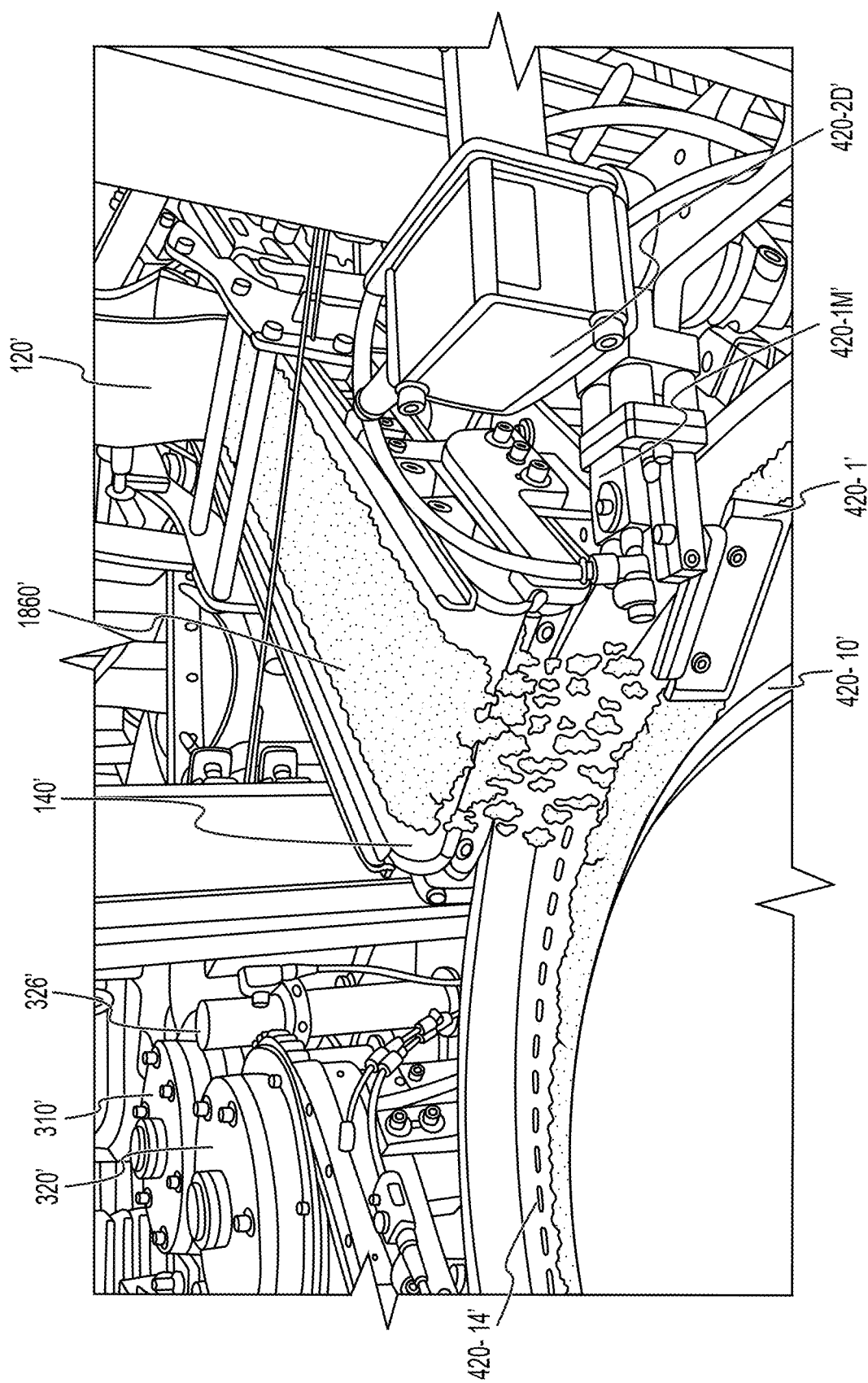
FIG. 28 is a photograph of a supply of aerosol-forming substrate to a filling station according to an example embodiment.

FIG. 28 is a photograph of a supply of aerosol-forming substrate to a filling station according to an example embodiment. Referring to FIG. 28, the aerosol-forming substrate 1860' supplied from the second substrate hopper 120' by the second substrate conveyer 140' to the filling pan 420-10' is agitated (e.g., to become more fluidized in behavior) and directed toward the ports 420-14' by the first baffle 420-1'. A first motor 420-1M' (e.g., pneumatic vibratory motor) may be used to vibrate the first baffle 420-1' to help agitate/mobilize the aerosol-forming substrate 1860' for a first round of filling. A detector 420-2D' may measure a height of the temporary build-up of aerosol-forming substrate 1860' caught by the second baffle (which may be analogous to the second baffle 420-2 in FIG. 27) in order to control the supply speed of the aerosol-forming substrate 1860'.

Figure 29:
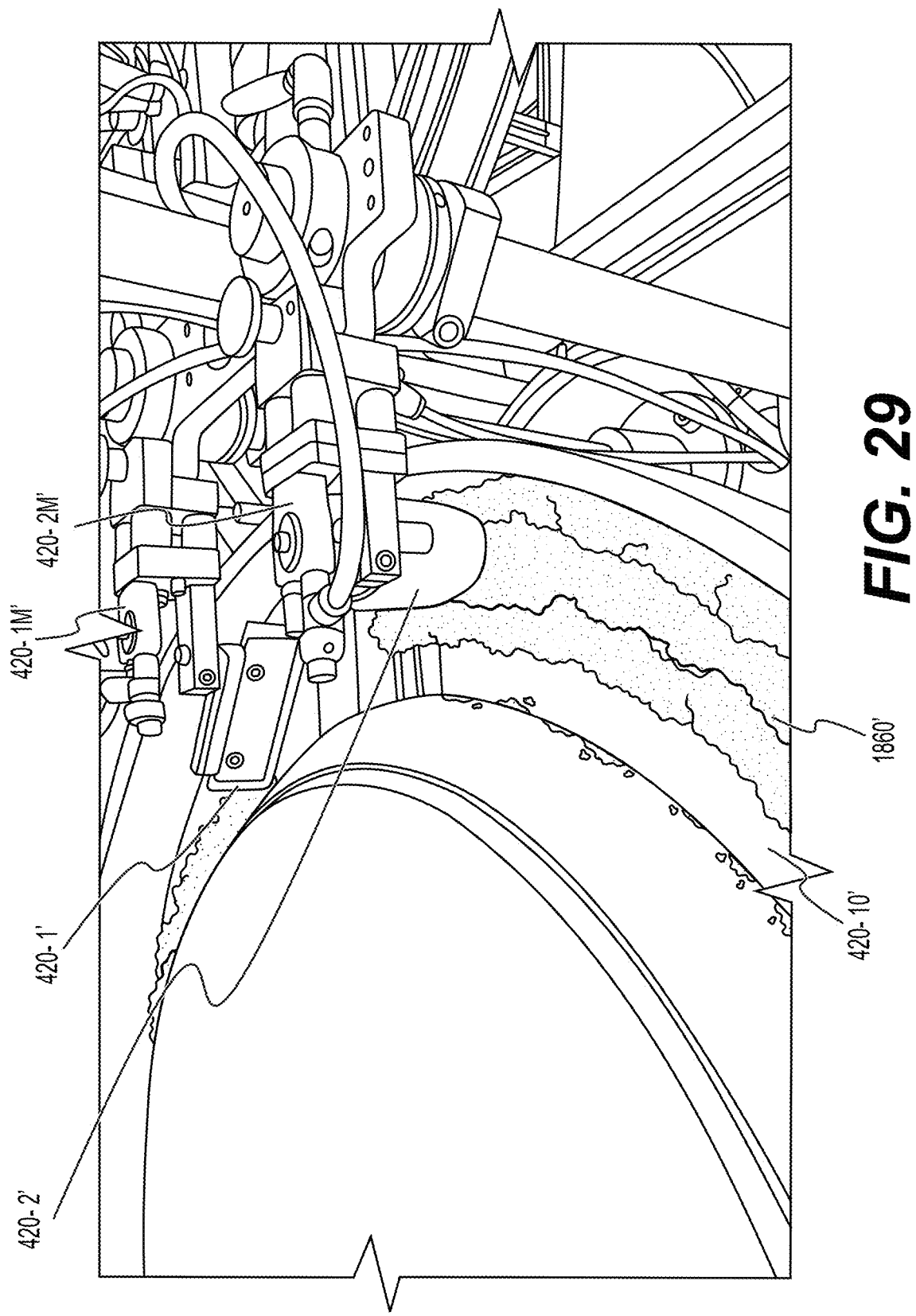
FIG. 29 is a photograph that includes a pair of baffles of a filling station according to an example embodiment.

FIG. 29 is a photograph that includes a pair of baffles of a filling station according to an example embodiment. Referring to FIG. 29, downstream from the first baffle 420-1' is the second baffle 420-2', which is positioned slightly higher than the other three baffles (e.g., several mm above the surface of the filling pan 420-10'). In one instance, the second baffle 420-2' is positioned 3 mm above the surface of the filling pan 420-10'. A second motor 420-2M' (e.g., pneumatic vibratory motor) may be used to vibrate the second baffle 420-2 to help agitate/mobilize the aerosol-forming substrate 1860'.

Figure 30:
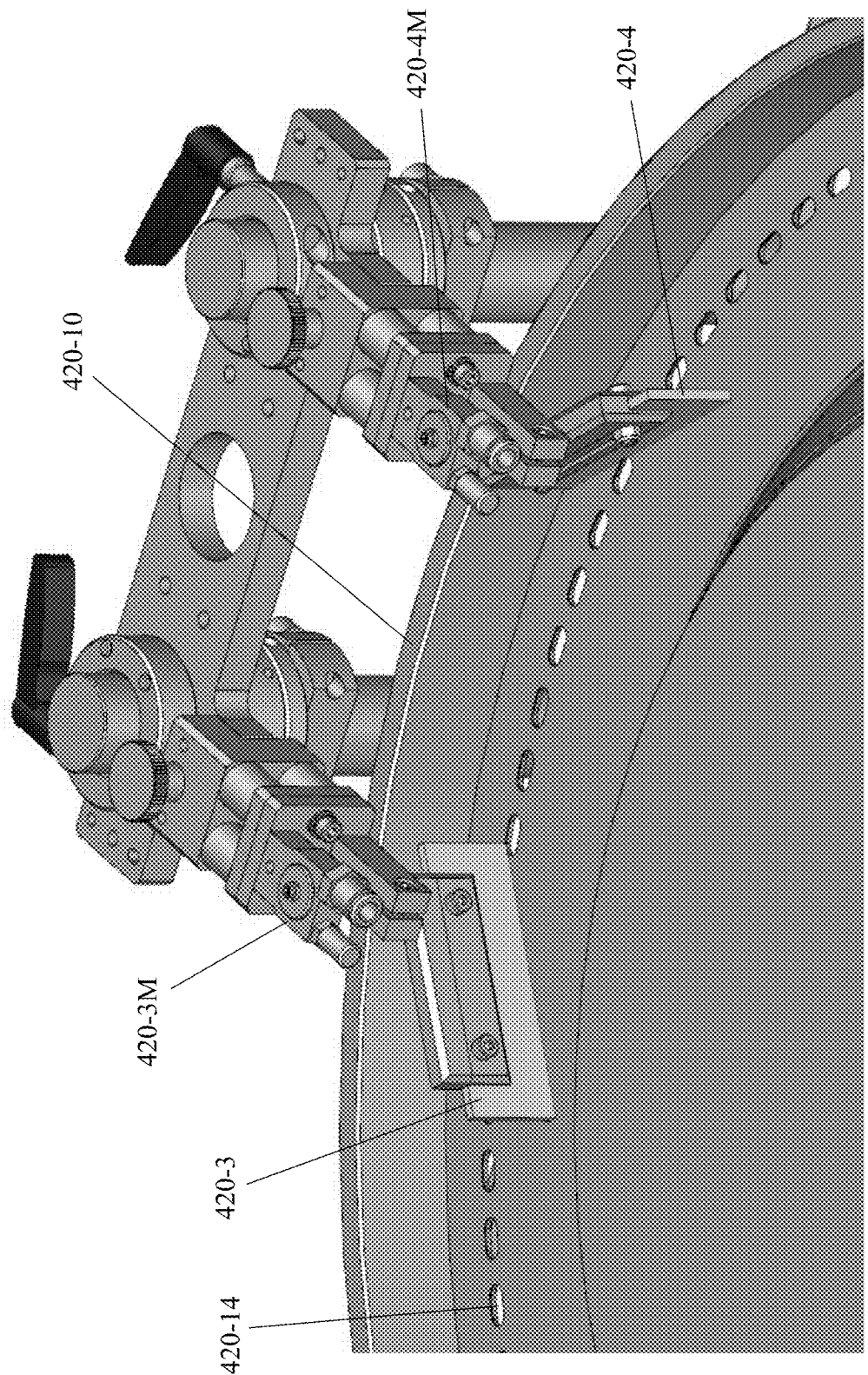
FIG. 30 is an enlarged view that includes another pair of baffles of a filling station according to an example embodiment.

FIG. 30 is an enlarged view that includes another pair of baffles of a filling station according to an example embodiment. Referring to FIG. 30, a third motor 420-3M' and a fourth motor 420-4M are used to vibrate the third baffle 420-3 and the fourth baffle 420-4, respectively, to help agitate/mobilize the aerosol-forming substrate (e.g., aerosol-forming substrate 1860' in FIG. 29). The third baffle 420-3 redirects the aerosol-forming substrate toward the ports 420-14 in the filling pan 420-10 such that a second round of filling occurs (i.e., the initial quantity from the first baffle 420-1 is drawn in and leaves a gap/room for more aerosol-forming substrate). The fourth baffle 420-4 wipes off the excess and directs it away from the ports 420-14 so that aerosol-forming substrate is not needlessly lost when the carriages 420-20 lower the capsule casings 1370 away from the filling pan 420-10 for transfer.

Figure 31:
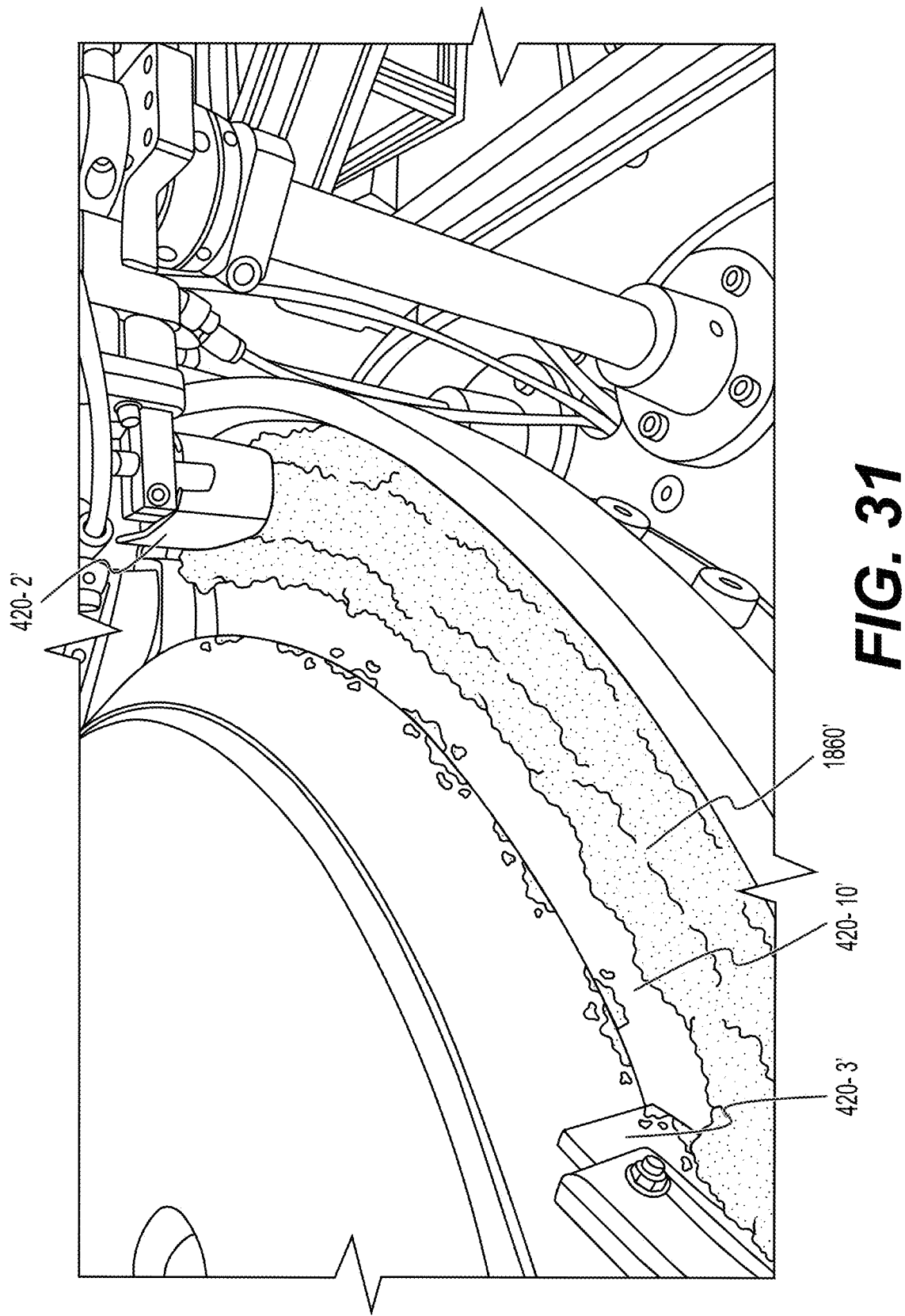
FIG. 31 is a photograph of a section of a filling pan between a first pair of baffles and a second pair of baffles of a filling station according to an example embodiment.

FIG. 31 is a photograph of a section of a filling pan between a first pair of baffles and a second pair of baffles of a filling station according to an example embodiment. Referring to FIG. 31, the layer of aerosol-forming substrate 1860' formed on the filling pan 420-10' by the second baffle 420-2' is deflected toward the ports by the third baffle 420-3' so that the capsule casings can be topped off.

Figure 32:
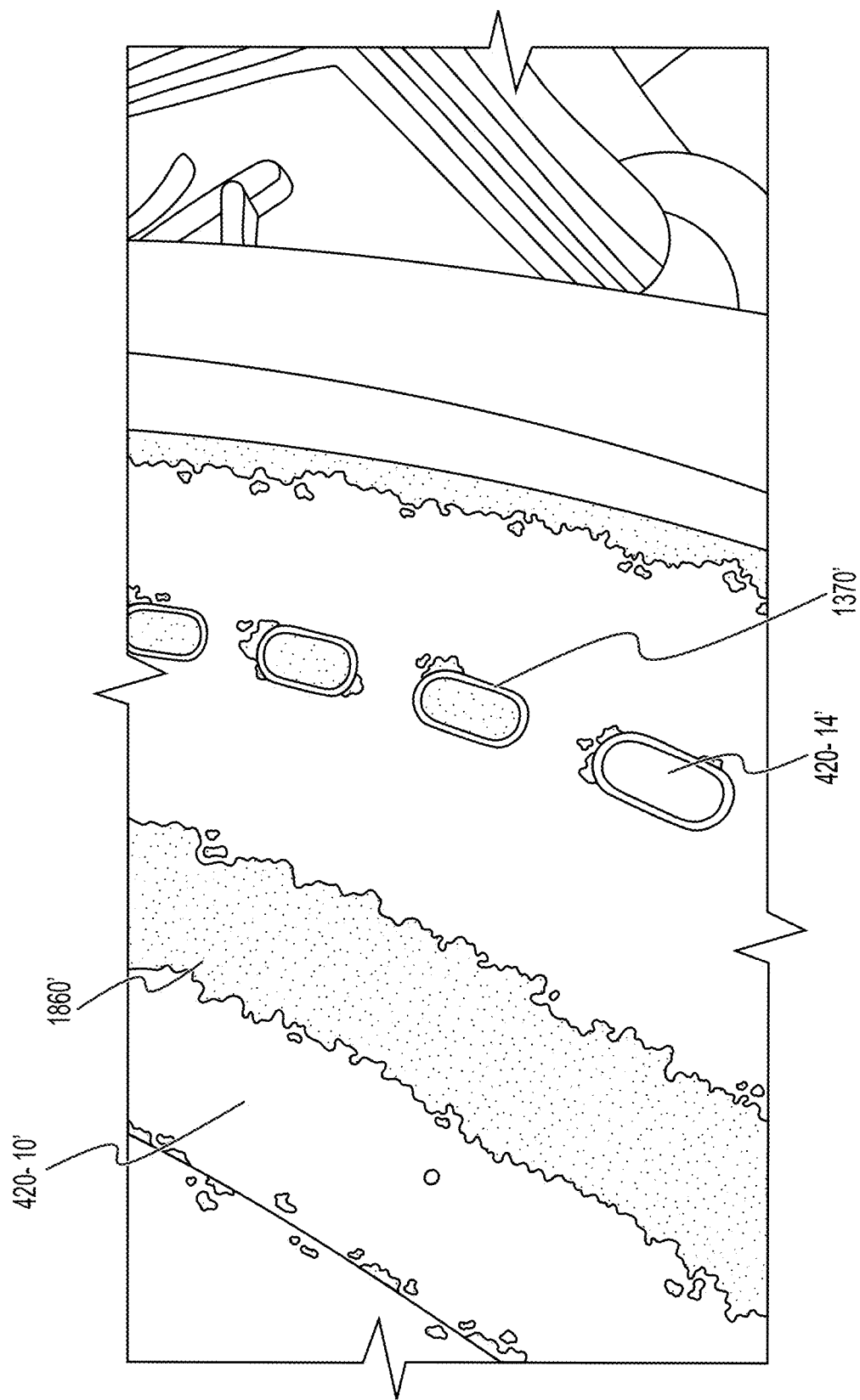
FIG. 32 is a photograph of a section of a filling pan downstream from a second pair of baffles of a filling station according to an example embodiment.

FIG. 32 is a photograph of a section of a filling pan downstream from a second pair of baffles of a filling station according to an example embodiment. Referring to FIG. 32, the rim of the capsule casings 1370' are substantially flush with the surface of the filling pan 420-10' during filling. In addition the size and shape of the capsule casings 1370' are a relatively close fit with the ports 420-14' such that the aerosol-forming substrate 1860' is not substantially lost to the miniscule gaps.

Figure 33:
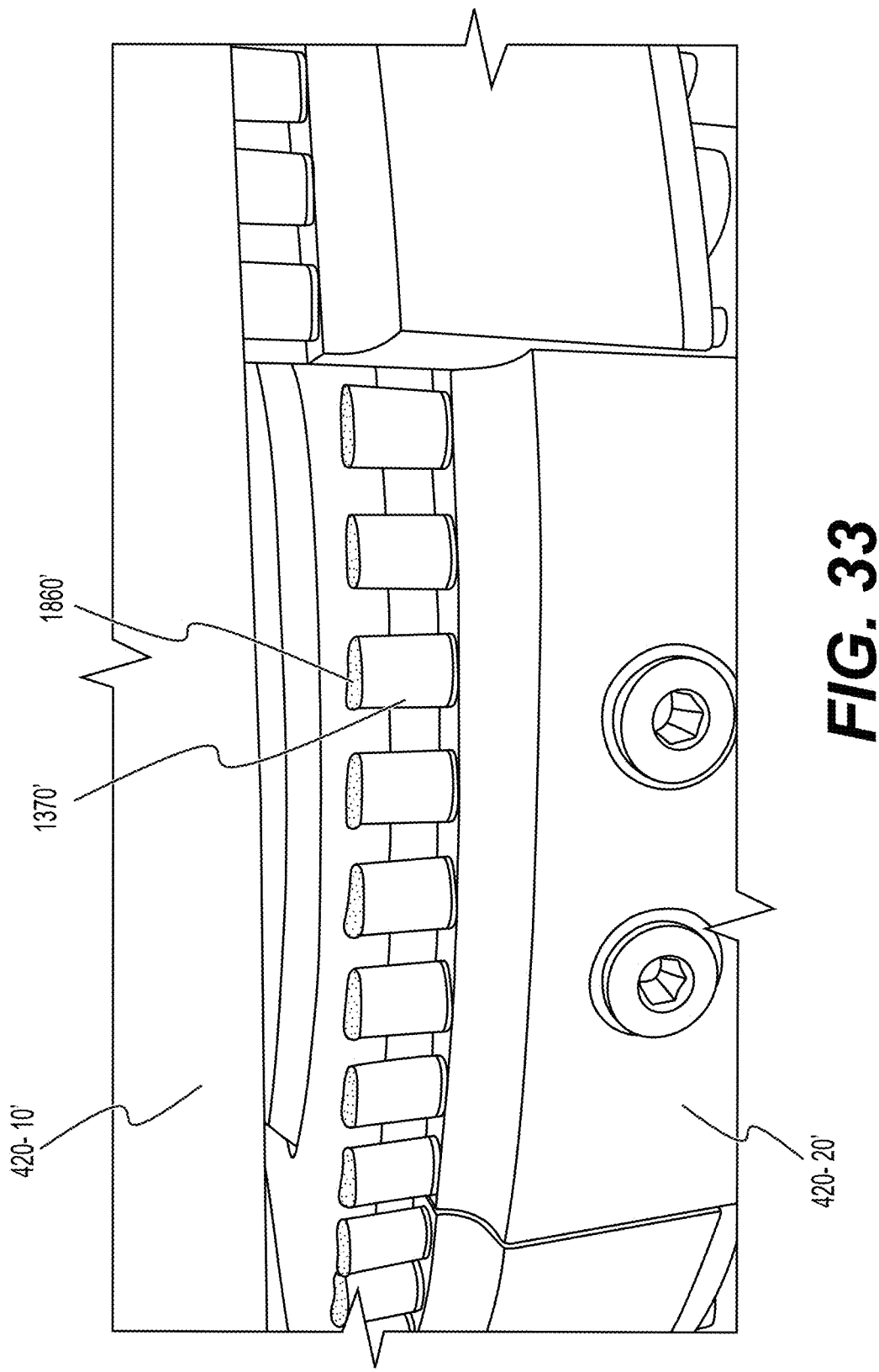
FIG. 33 is a photograph of filled capsule casings on a lowered carriage of a filling station according to an example embodiment.

FIG. 33 is a photograph of filled capsule casings on a lowered carriage of a filling station according to an example embodiment. Referring to FIG. 33, after the fourth baffle (e.g., fourth baffle 420-4 in FIG. 30), a carriage 420-20' and the capsule casings 1370' thereon are lowered from the filling pan 420-10' for transfer. As shown, the aerosol-forming substrate 1860' will extend slightly above the rim of the capsule casings 1370' after filling due (at least in part) to the application of a vacuum. In addition, the vacuum filling will cause the packing density of the aerosol-forming substrate 1860' drawn into the capsule casings 1370' to be greater than via gravity loading.

Figure 34:
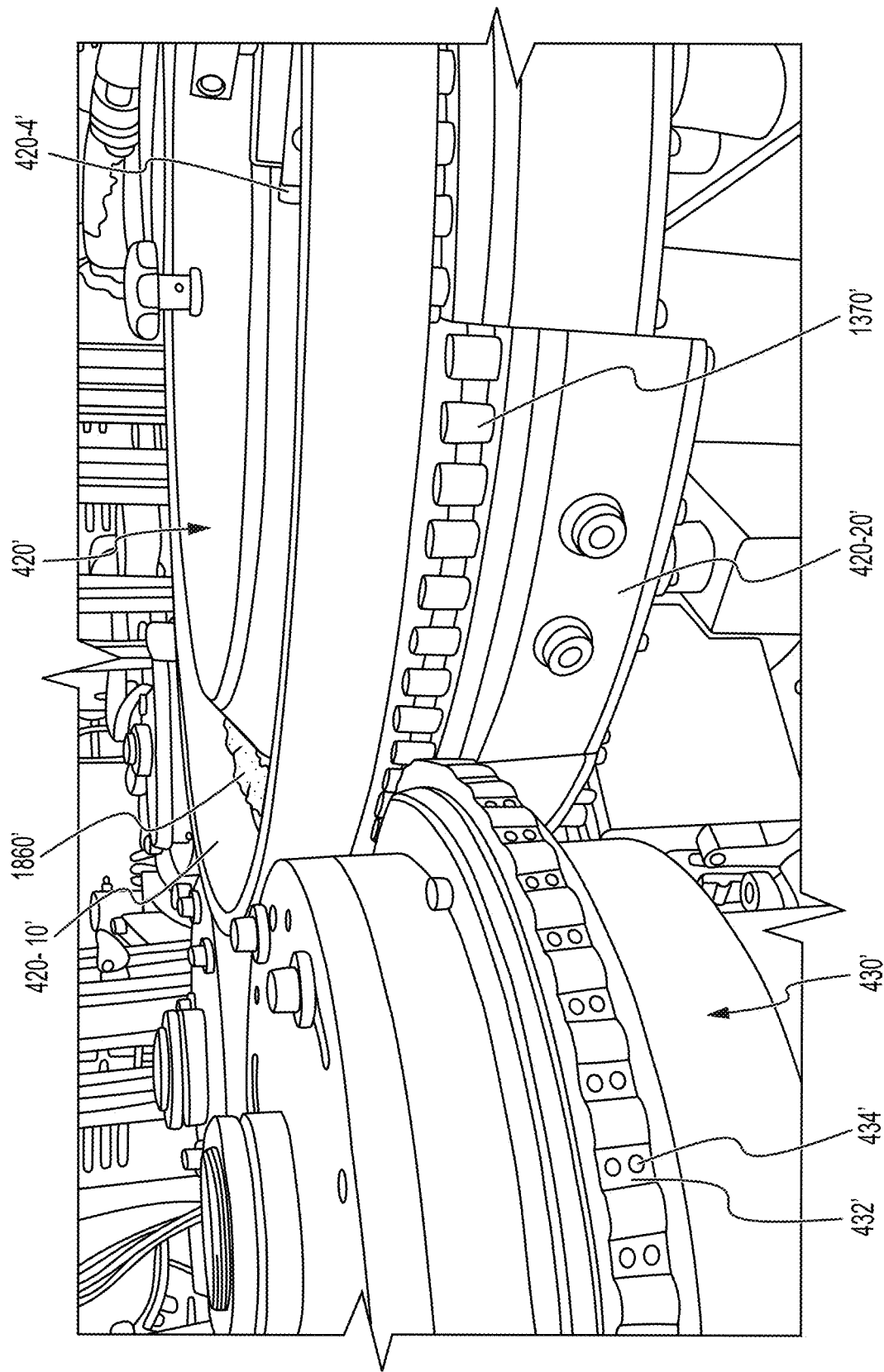
FIG. 34 is a photograph of a transfer of filled capsule casings from a filling drum to a post-filling inspection drum according to an example embodiment.

FIG. 34 is a photograph of a transfer of filled capsule casings from a filling drum to a post-filling inspection drum according to an example embodiment. Referring to FIG. 34, the carriages 420-20' of the filling drum 420' will begin to lower once past the fourth baffle 420-4', which wipes off excess aerosol-forming substrate 1860' and moves it away from the ports in the filling pan 420-10'. Once a carriage 420-20' is in its lowered position, the capsule casings 1370' thereon can be transferred from the filling drum 420' (e.g., which is rotating clockwise) to the flutes 432' of the post-filling inspection drum 430' (e.g., which is rotating counter-clockwise) via a vacuum applied through the ports 434'.

Figure 13:
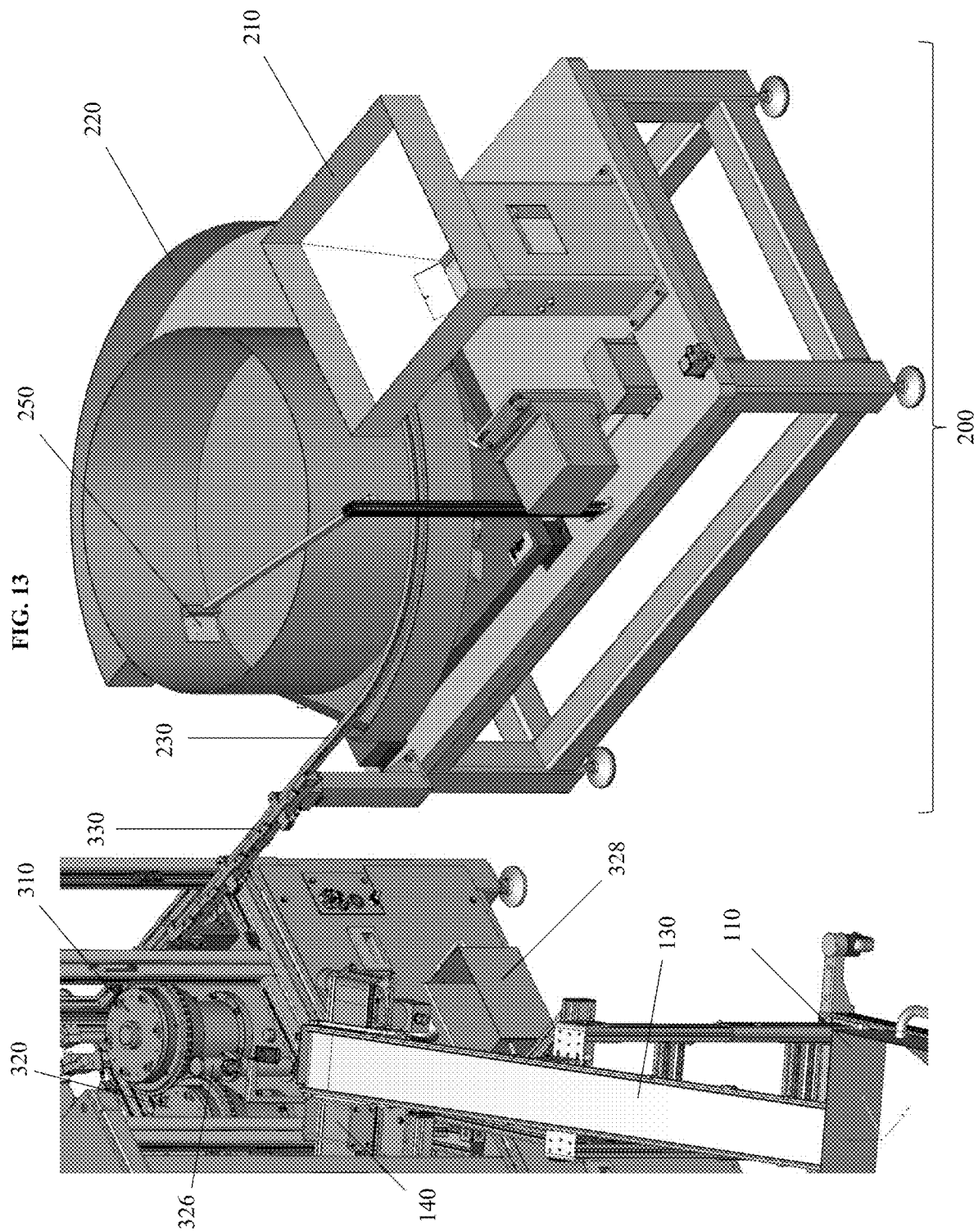
FIG. 13 is an enlarged view that includes a capsule casing supply station according to an example embodiment.
Figure 14:
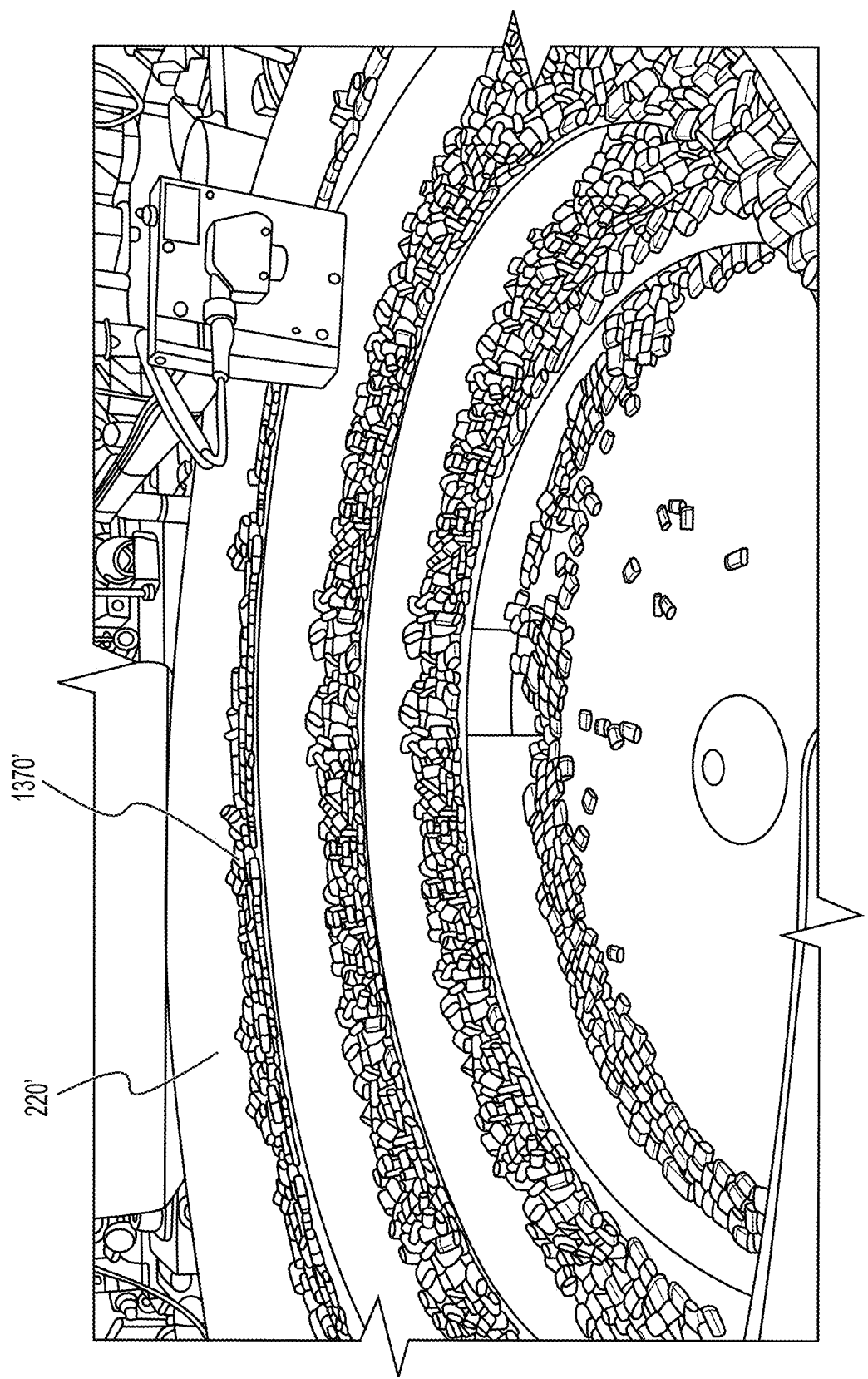
FIG. 14 is a photograph of a capsule casing orientation bowl of a capsule casing supply station according to an example embodiment.
Figure 15:
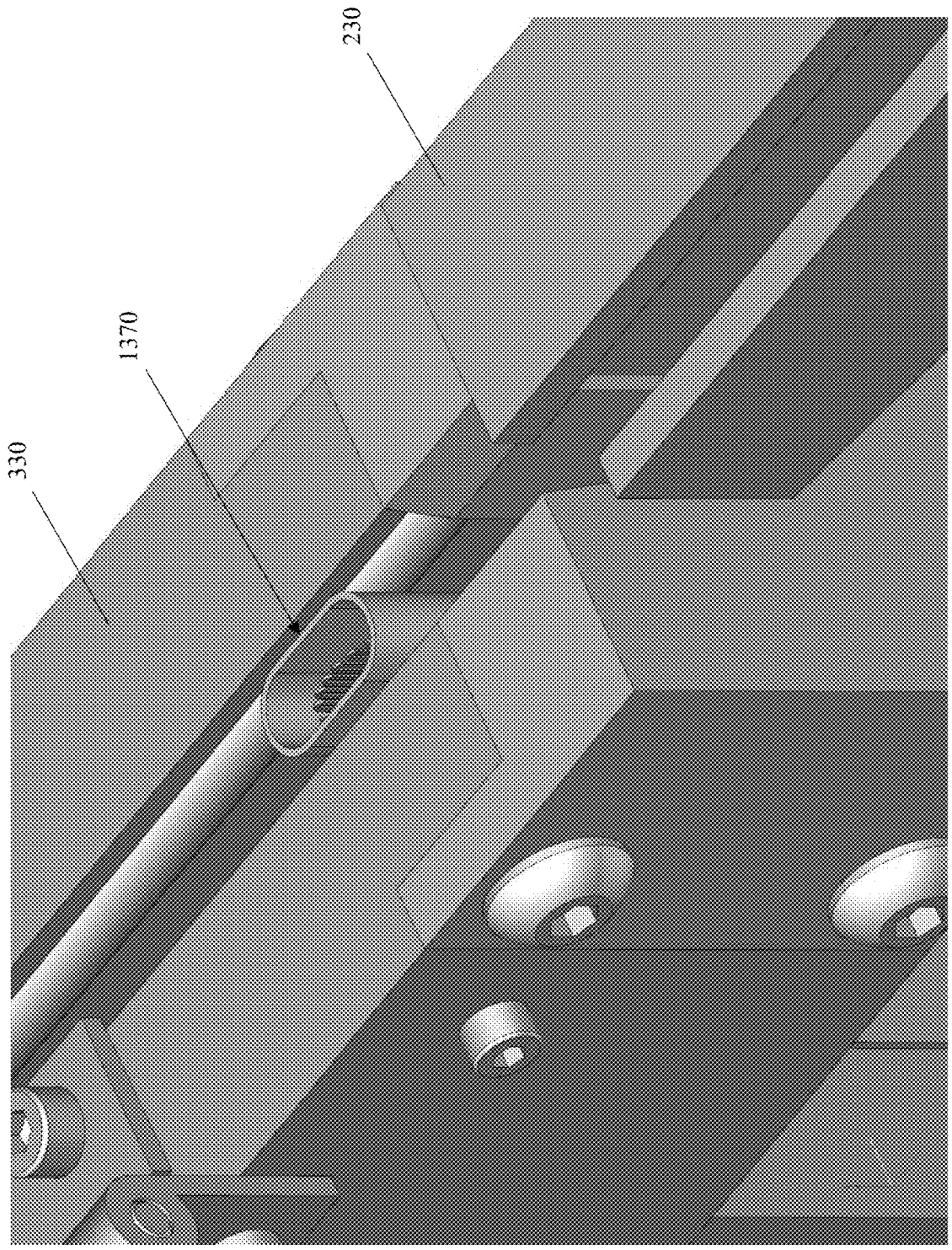
FIG. 15 is an enlarged view of a track for supplying capsule casings to a pre-filling inspection station according to an example embodiment.
Figure 35:
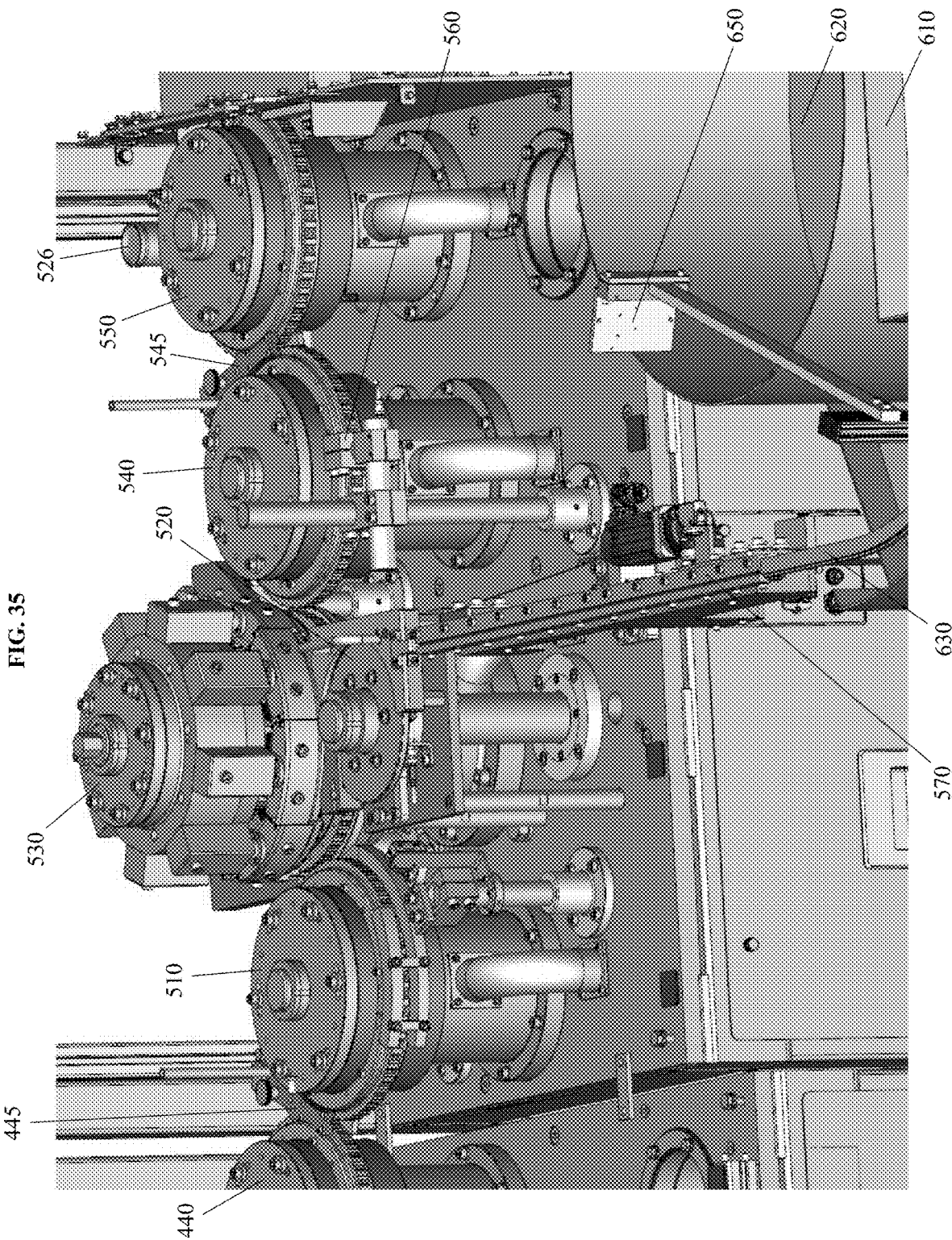
FIG. 35 is a perspective view that includes a capping station according to an example embodiment.

FIG. 35 is a perspective view that includes a capping station according to an example embodiment. Referring the FIG. 35, the process and associated mechanisms for cap orientation via the cap supply station 600 (e.g., FIG. 1) may be similar to the process and associated mechanisms for capsule casing orientation via the capsule casing supply station 200 (e.g., FIGS. 13-14). The cap supply station 600 may include a cap hopper 610, a cap orientation bowl 620, and an orientation bowl inspection device 650. Caps are initially introduced into the cap supply station 600 via the cap hopper 610 and make their way to the cap orientation bowl 620. In the cap orientation bowl 620, the caps (e.g., first end caps 1310) may be oriented as shown in FIG. 11 to facilitate their insertion into the capsule casings 1370. For instance, the cap orientation bowl 620 may be configured as a recirculating loop and actuated (e.g., electromagnetic pulses acting on an underlying spring structure) such that the caps advance up a spiral path which has sections that favor a properly oriented cap (e.g., orientation of first end cap 1310 in FIG. 11) and which eventually leads to the supply track 630. As a result, properly oriented caps (e.g., in an upright position) will have a higher likelihood of advancing past this section and continuing eventually to the supply track 630. In contrast, improperly oriented caps (e.g. upside down caps) will have a higher likelihood of falling down to a lower level of the cap orientation bowl 620 and repeating the path until the proper orientation is achieved. As shown in FIG. 35, the filled capsule casings from the post-filling rejection drum 440 of the filling station 400 are transferred to the transfer drum 510 of the capping station 500 with the optional assistance of a transfer guide 445, while the oriented caps are transported to the cap feeding drum 520 via the supply track 630 and the cap feeding track 570 (which may be referred to collectively as an interstation cap track, a cap track, or simply a track). The capping of the filled capsule casings with the caps is performed with the capping drum 530. A post-capping inspection device 560 inspects the capsules on the post-capping inspection drum 540 before the capsules are transferred to the post-capping rejection drum 550 where defective capsules are rejected via the rejection chute 526. A transfer guide 545 may be utilized to facilitate a transfer of the capsules from the post-capping inspection drum 540 to the post-capping rejection drum 550.

Figure 36:
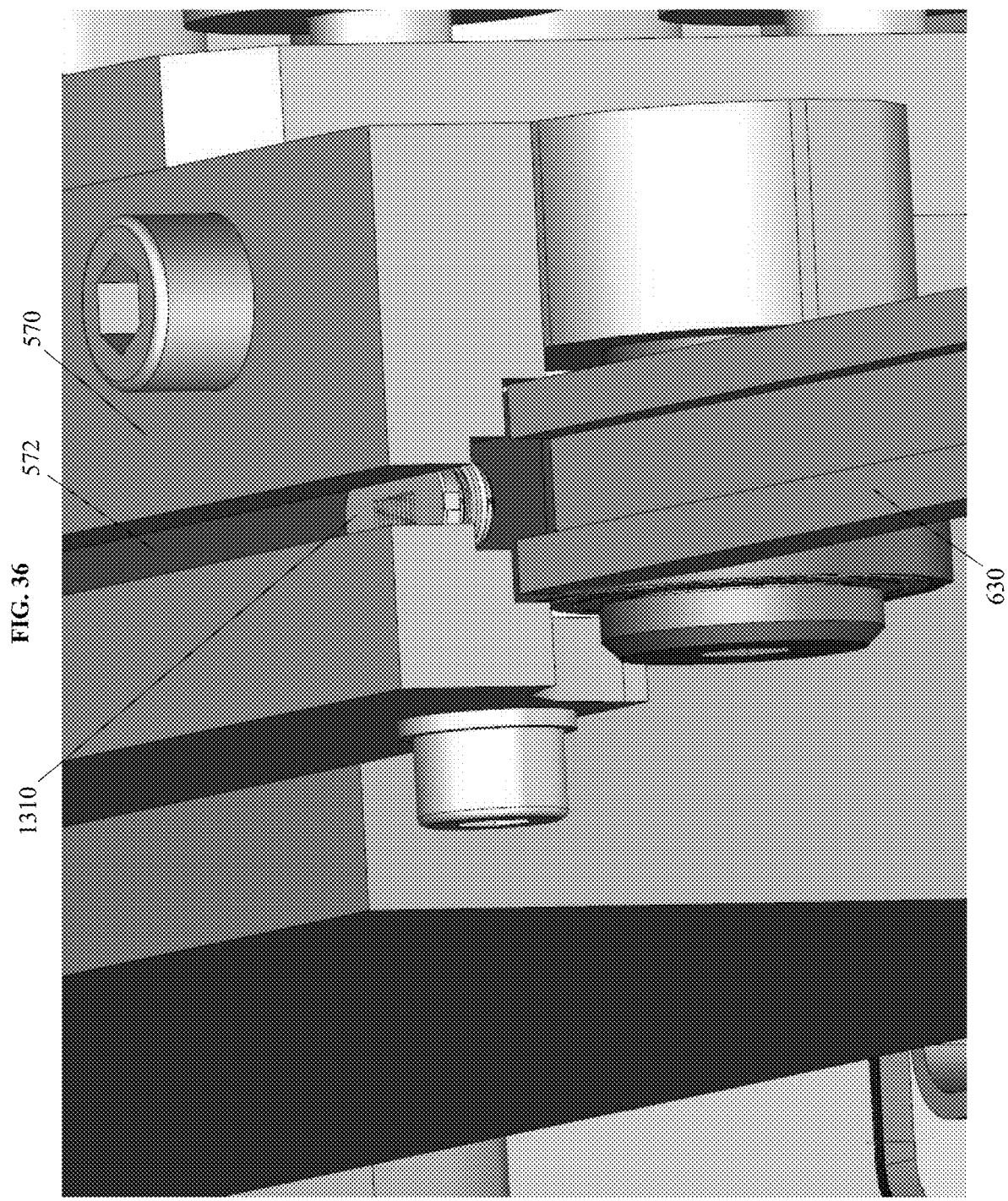
FIG. 36 is an enlarged view of a track for supplying caps to a capping station according to an example embodiment.

FIG. 36 is an enlarged view of a track for supplying caps to a capping station according to an example embodiment. Referring to FIG. 36, a cap conveyor 572 may be used to transport the first end cap 1310 received from the supply track 630 down the cap feeding track 570. The supply track 630 and the cap feeding track 570 are configured such that the first end cap 1310 from the cap supply station 600 maintains an upright and longitudinal orientation (as shown in FIG. 36) as the first end cap 1310 travels to the capping station 500.

Figure 37:
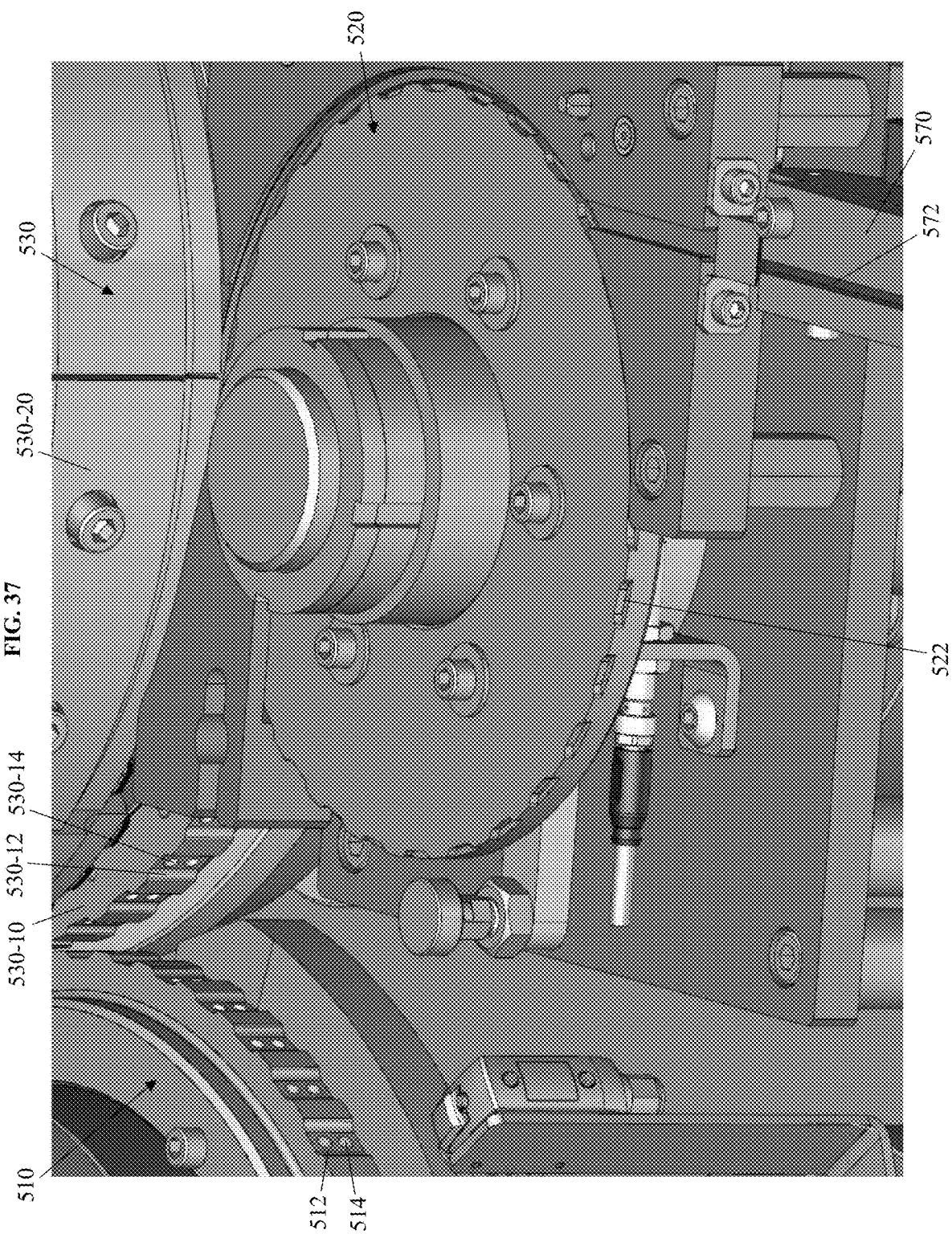
FIG. 37 is an enlarged view that includes a cap feeding drum of a capping station according to an example embodiment.

FIG. 37 is an enlarged view that includes a cap feeding drum of a capping station according to an example embodiment. Referring to FIG. 37, the cap conveyor 572 is configured to form and maintain a queue of first end caps 1310 at the downstream end of the cap feeding track 570 so as to provide a steady supply of first end caps 1310 for seating in the recesses 522 of the cap feeding drum 520. From the cap feeding drum 520, the first end caps 1310 are transferred to the capping drum 530. At the same time, filled capsule casings (e.g., capsule casings 1370' filled with aerosol-forming substrate 1860' in FIG. 34) held in the flutes 512 of the transfer drum 510 via a vacuum through the ports 514 are transferred to the capping drum 530 for capping with the first end caps 1310. The capping drum 530 includes, inter alia, a drum ring 530-10 and a plurality of carriages 530-20 configured to move axially between a raised position (for receiving the first end caps 1310) and a lowered position (for inserting the first end caps 1310 into the capsule casings). The drum ring 530-10 defines flutes 530-12 for holding the capsule casings via a vacuum applied through the ports 530-14.

Figure 38:
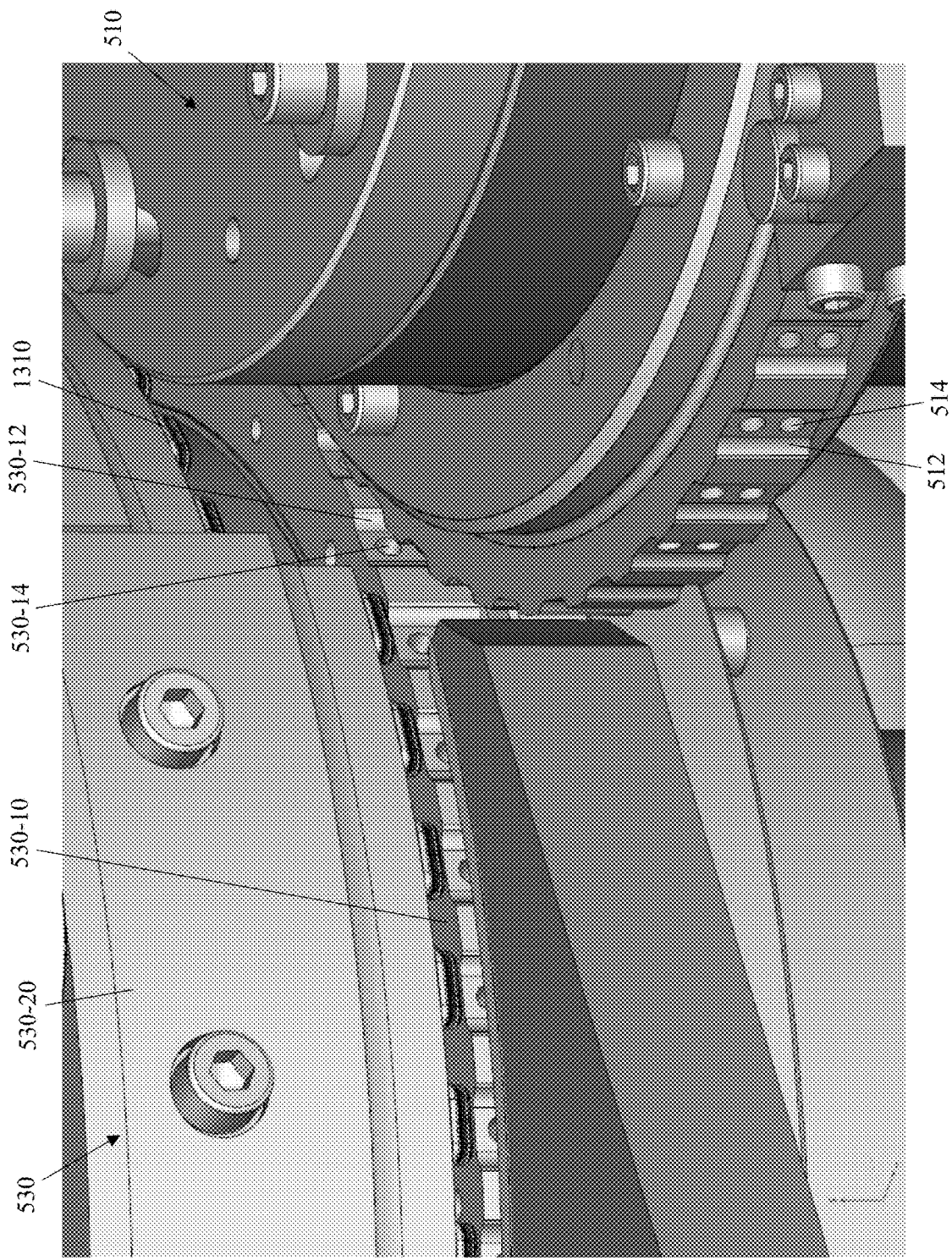
FIG. 38 is an enlarged view of a capping section of a capping station according to an example embodiment.
Figure 39:
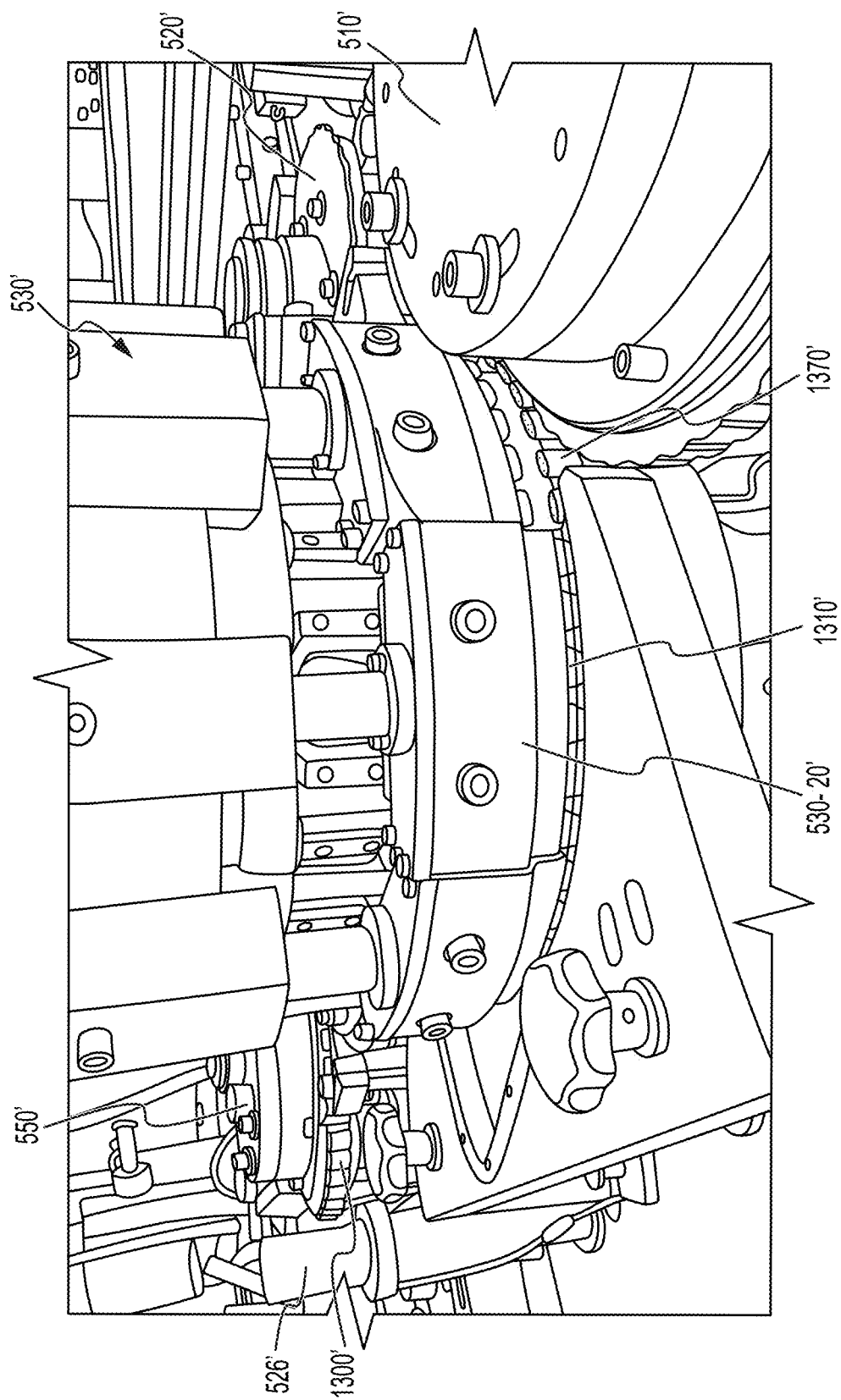
FIG. 39 is a photograph of a capping section of a capping station according to an example embodiment.

FIG. 38 is an enlarged view of a capping section of a capping station according to an example embodiment. Referring to FIG. 38, filled capsule casings (not shown in this view) held in the flutes 512 via a vacuum through the ports 514 of the transfer drum 510 (which is rotating counterclockwise) are transferred to the capping drum 530 (which is rotating clockwise). As previously noted, the capping drum 530 includes, inter alia, a drum ring 530-10 and a plurality of carriages 530-20 configured to move axially between a raised position and a lowered position. In particular, the capsule casings from the transfer drum 510 are received in the flutes 530-12 of the drum ring 530-10 and held via a vacuum through ports 530-14. First end caps 1310 from the cap feeding drum 520 are received by the carriages 530-20 and held on their undersurfaces via vacuum ports that are aligned above the flutes 530-12 of the drum ring 530-10 in which the capsule casings are held. After receiving the first end caps 1310 and as the capping drum 530 rotates clockwise, the carriages 530-20 are configured to transition from a raised position to a lowered position (after the transfer point for the capsule casing) so as to insert the first end caps 1310 into the capsule casings held by the drum ring 530-10, FIG. 39 is a photograph of a capping section of a capping station according to an example embodiment. Referring to FIG. 39, filled capsule casings 1370' from the transfer drum 510' are received by the capping drum 530' at one transfer point, while first end caps 1310' from the cap feeding drum 520' are received by the capping drum 530' at another transfer point that is upstream from the transfer point for the capsule casings 1370'. After the transfer point for the capsule casings 1370', the carriages 530-20' of the capping drum 530' are configured to transition from a raised position (at the transfer point for the first end caps 1310') to a lowered position (after the transfer point for the capsule casings 1370') so as to insert the first end caps 1310' into the capsule casings 1370' held by the capping drum 530' to yield the capsules 1300'. In an example embodiment, the capsules 1300' may be as disclosed with regard to the capsules 1300 in FIGS. 9-11. From the capping drum 530', the capsules 1300' are transferred to the post-capping inspection drum (e.g., post-capping inspection drum 540 in FIG. 35) for inspection and then to the post-capping rejection drum 550' where capsules 1300' inspected to be defective or otherwise unacceptable are ejected into the rejection chute 526'.

Figure 40:
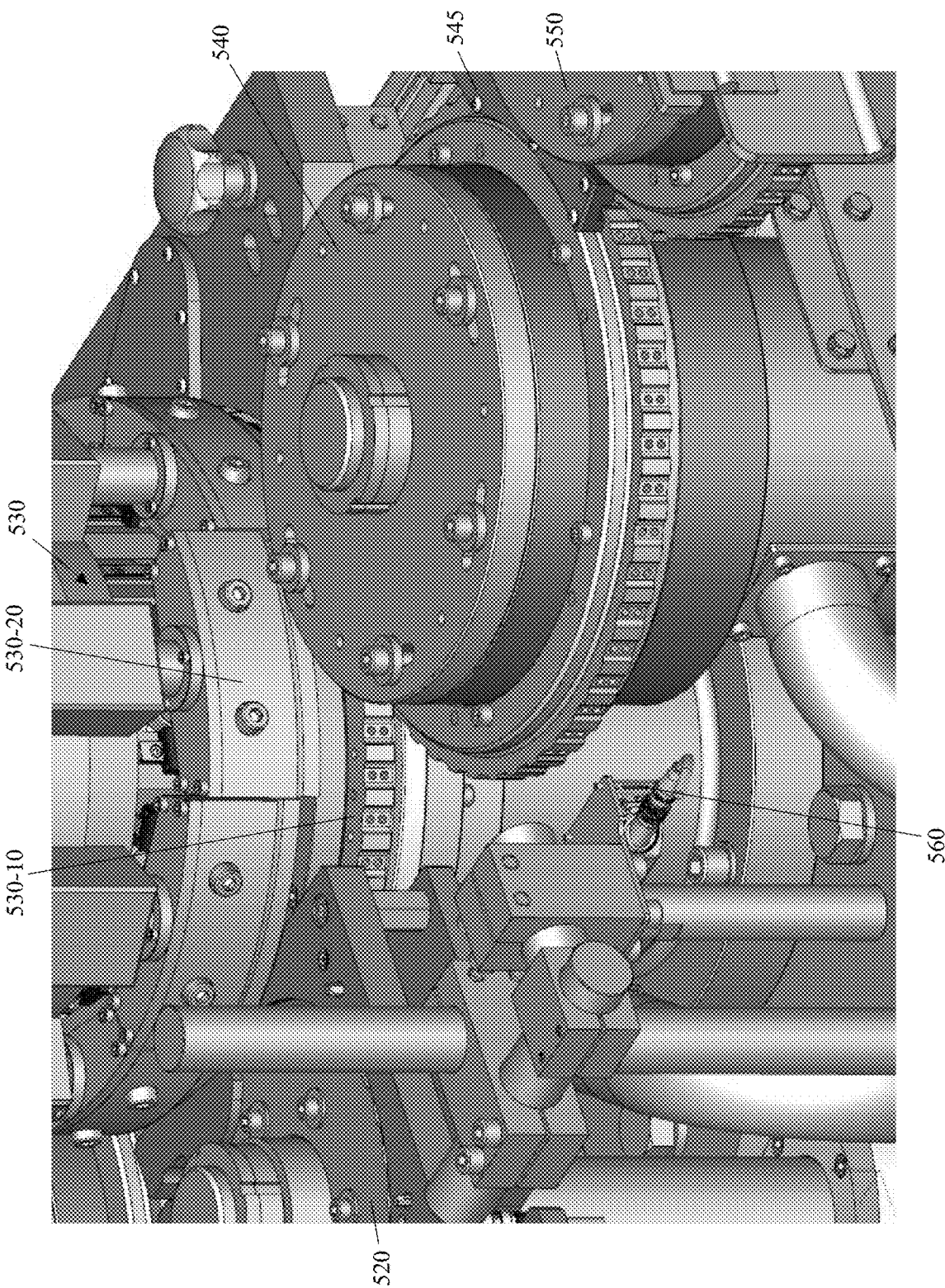
FIG. 40 is an enlarged view that includes a post-capping inspection drum of a capping station according to an example embodiment.

FIG. 40 is an enlarged view that includes a post-capping inspection drum of a capping station according to an example embodiment. Referring to FIG. 40, the carriages 530-20 of the capping drum 530 begin to transition from the lowered position back to the raised position prior to the transfer point of the capsules from the drum ring 530-10 to the post-capping inspection drum 540. Once back to the raised position, the carriages 530-20 of the capping drum 530 are configured to receive more caps (e.g., first end caps 1310) from the cap feeding drum 520 so as to repeat the capping process with more capsule casings (e.g., capsule casings 1370). From the capping drum 530, the capsules are transferred to the post-capping inspection drum 540 and inspected by a post-capping inspection device 560 (e.g., for improper capping, damage, unsatisfactory appearance/aesthetics). The capsules are then transferred to the post-capping rejection drum 550, wherein the transfer may be assisted with a transfer guide 545.

Figure 41:
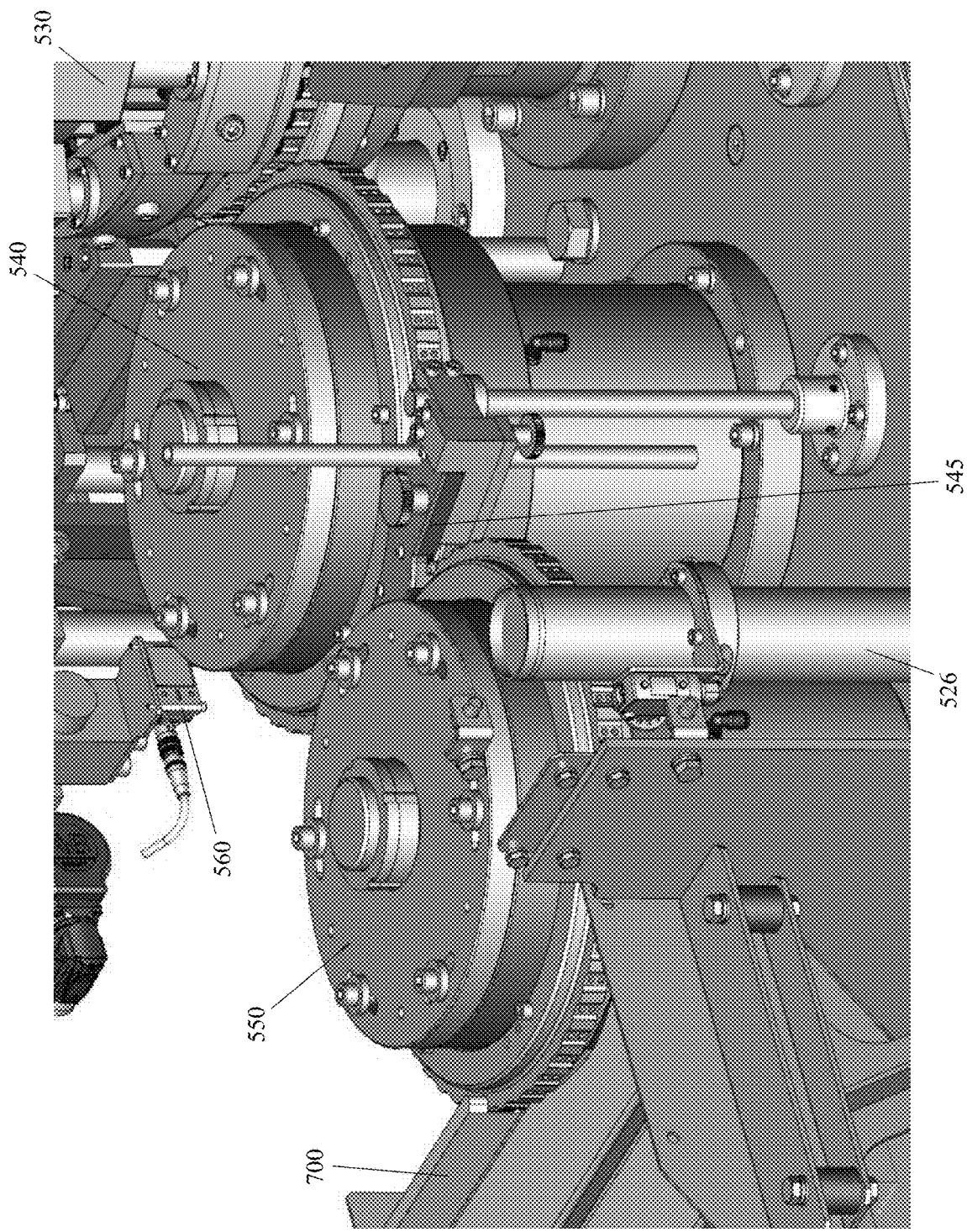
FIG. 41 is an enlarged view that includes a post-capping inspection drum and a post-capping rejection drum of a capping station according to an example embodiment.

FIG. 41 is an enlarged view that includes a post-capping inspection drum and a post-capping rejection drum of a capping station according to an example embodiment. Referring to FIG. 41, the capsules transferred from the capping drum 530 to the post-capping inspection drum 540 are inspected by the post-capping inspection device 560 before subsequent transfer to the post-capping rejection drum 550. On the post-capping rejection drum 550, capsules that were determined to be defective or otherwise unacceptable by the post-capping inspection device 560 can be ejected into the rejection chute 526. The other capsules remaining on the post-capping rejection drum 550 are deposited in the collection station 700.

Figure 42:
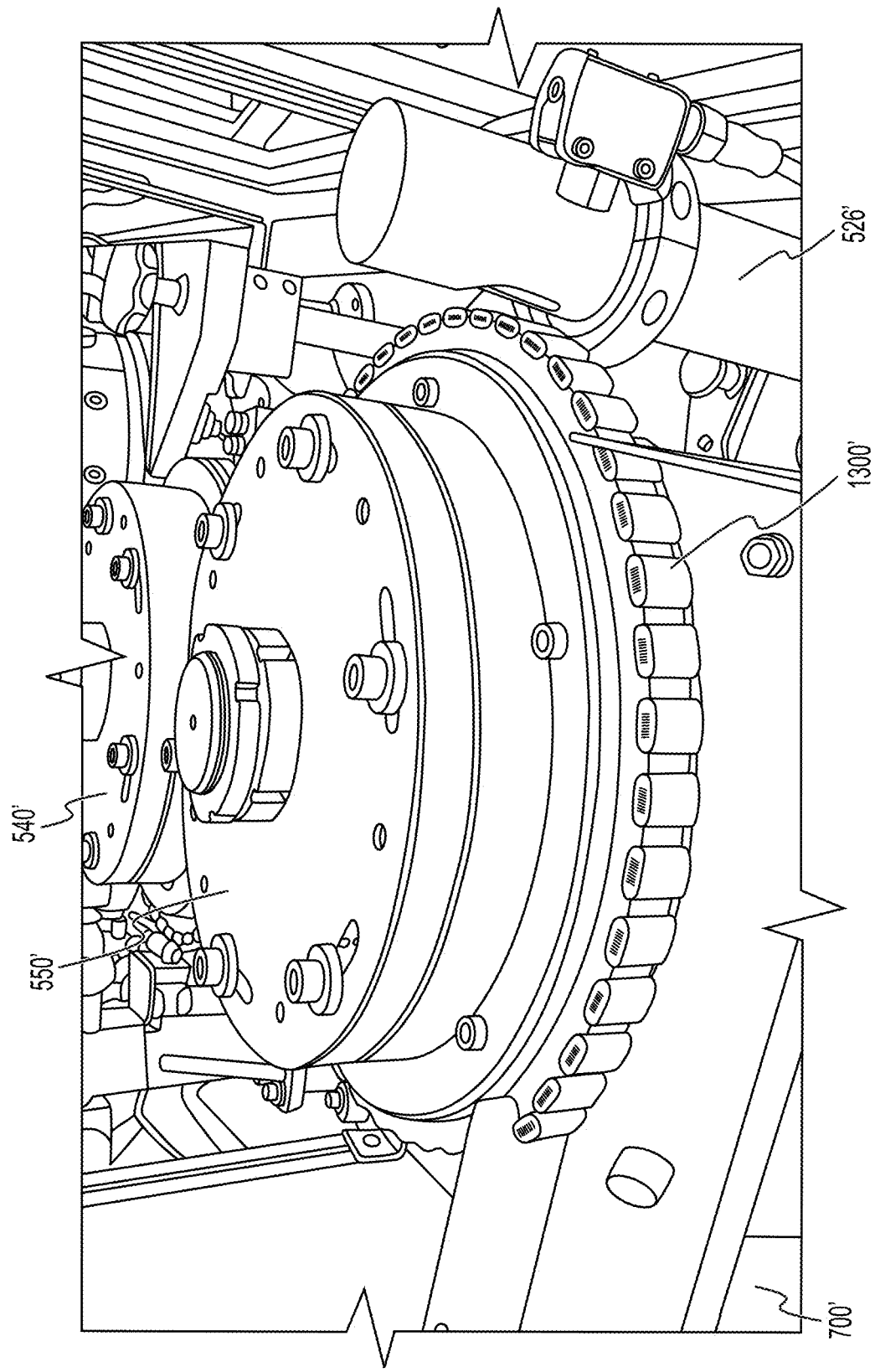
FIG. 42 is a photograph of capsules being removed from a post-capping rejection drum to a collection station according to an example embodiment.

FIG. 42 is a photograph of capsules being removed from a post-capping rejection drum to a collection station according to an example embodiment. Referring to FIG. 42, the capsules 1300' on the post-capping inspection drum 540' are transferred to the post-capping rejection drum 550'. In the example embodiment shown where the post-capping inspection drum 540' is rotating counterclockwise and the post-capping rejection drum 550' is rotating clockwise, the capsules 1300' may travel on an S-shaped path to the collection station 700'. While on the post-capping rejection drum 550', the capsules 1300' that were determined to be defective or otherwise unacceptable (by the post-capping inspection device) can be ejected into the opening in the rejection chute 526'. For the other capsules 1300' remaining on the post-capping rejection drum 550', a terminal interface (e.g., wall, barrier) can be configured to be in proximity to a point (e.g., removal point or collection point) on the post-capping rejection drum 550' downstream from the rejection chute 526' such that there is insufficient clearance for the capsules 1300' traveling on the post-capping rejection drum 550' to move past the terminal interface. As result, the capsules 1300' traveling on the post-capping rejection drum 550' will strike the terminal interface and become dislodged so as to fall into the collection station 700'. In lieu of (or in addition to) the terminal barrier, the vacuum used to hold the capsules 1300' on the post-capping rejection drum 550' can be momentarily interrupted or halted at a point or section downstream of the rejection chute 526' such that the capsules 1300' will separate from or otherwise leave the post-capping rejection drum 550' via centrifugal force for deposit in the collection station 700'.

Figure 43:
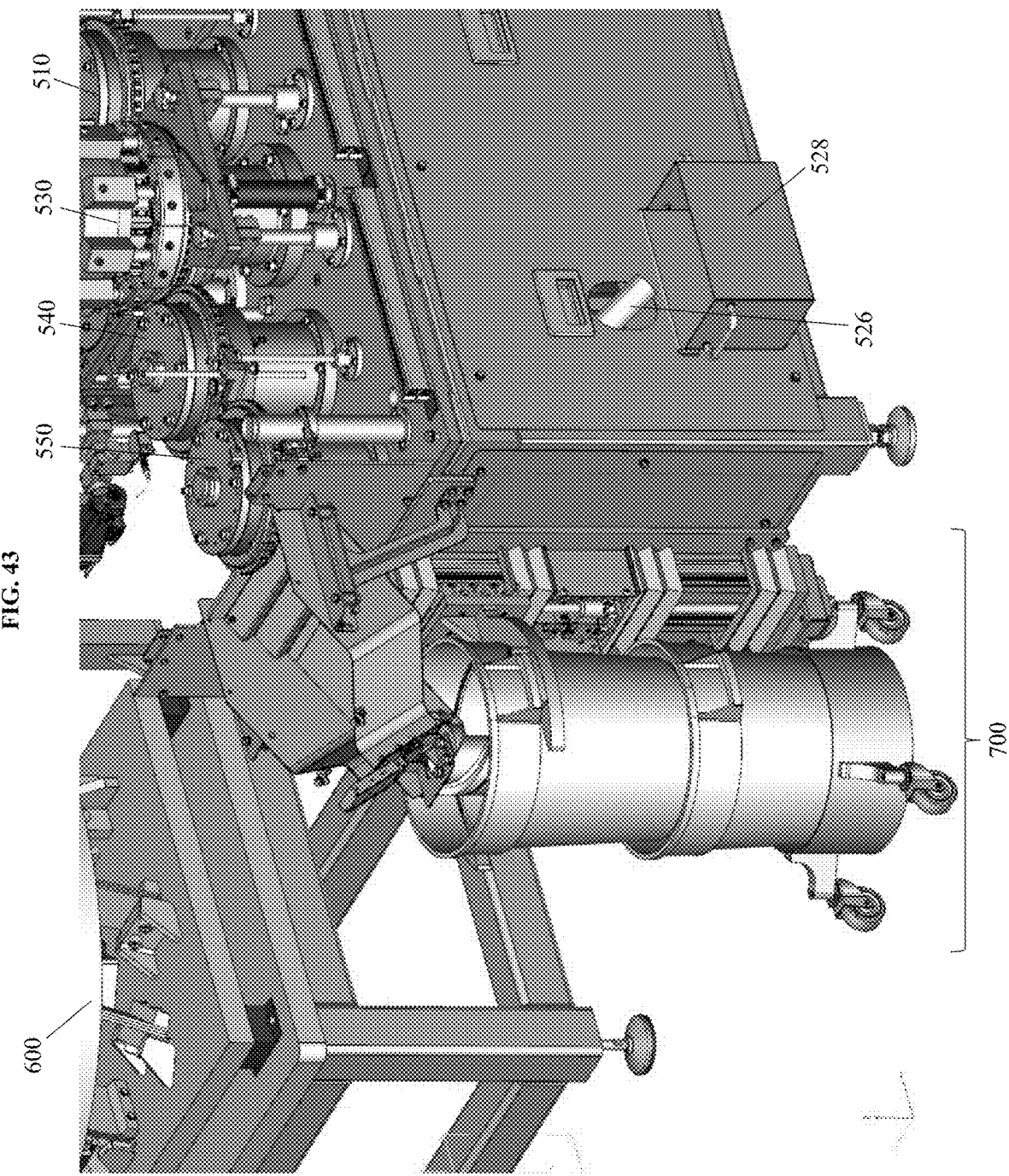
FIG. 43 is an enlarged view that includes a collection station according to an example embodiment.

FIG. 43 is an enlarged view that includes a collection station according to an example embodiment. Referring to FIG. 43, the transfer drum 510, the capping drum 530, the post-capping inspection drum 540, the post-capping rejection drum 550, and the cap supply station 600 are labeled to provide more context as to the location, size, and configuration of the collection station 700. Accordingly, the details of the transfer drum 510, the capping drum 530, the post-capping inspection drum 540, the post-capping rejection drum 550, and the cap supply station 600 that were already discussed herein will not be repeated below in the interest of brevity. As shown in FIG. 43, the distal end of the rejection chute 526 is oriented such that the capsules rejected on the post-capping rejection drum 550 are directed to a rejection bin 528.

Figure 44:
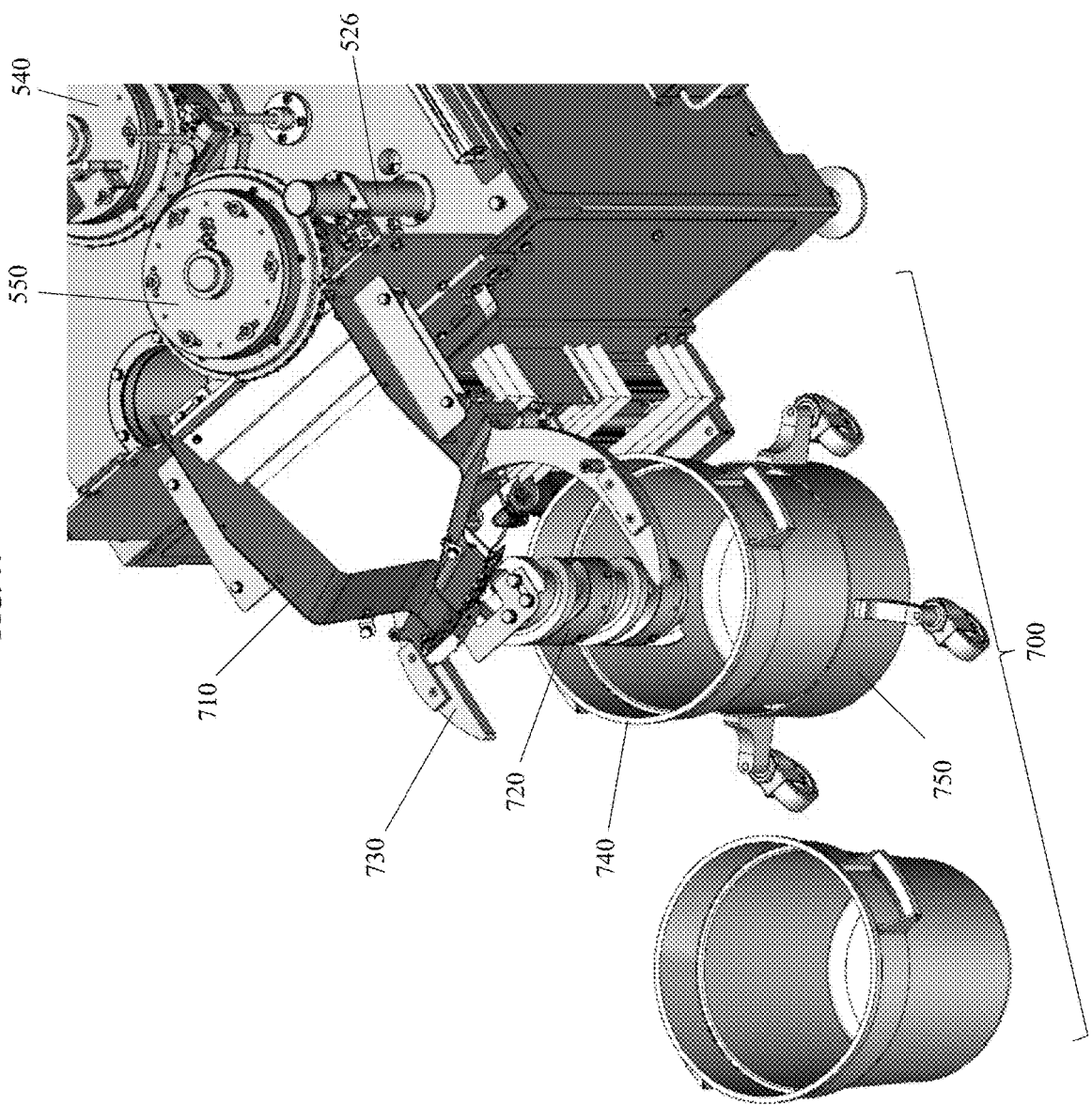
FIG. 44 is another enlarged view that includes a collection station according to an example embodiment.

FIG. 44 is another enlarged view that includes a collection station according to an example embodiment. Referring to FIG. 44, the collection station 700 may include an upper collection chute 710, a lower collection chute 720, a lifting assembly 730, a collection container 740, and a transport assembly 750. The capsules transferred from the post-capping inspection drum 540 to the post-capping rejection drum 550 that are not ejected into the rejection chute 526 will initially make their way into the upper collection chute 710 and then the lower collection chute 720 before finally reaching the collection container 740 of the collection station 700. The lower collection chute 720 may be configured to provide a spiral path downward for the capsules to mitigate potential issues that may be associated from a vertical drop into the collection container 740 (e.g., dislodging of particles of aerosol-forming substrate from the capsules, damage to the capsules).

FIG. 45 is a block diagram of a method of filling capsule casings with aerosol-forming substrate according to an example embodiment. Referring to FIG. 45, the method 2000 is a method of filling capsule casings with aerosol-forming substrate. The method 2000 may include a supplying step 2100, an engaging step 2200, a vibrating step 2300, and a vacuum step 2400. In an example embodiment, the method 2000 may be performed using the automated production line 1000 discussed herein.

In the supplying step 2100, the method 2000 may include supplying the aerosol-forming substrate to a filling receptacle defining a series of vacuum ports. In an example embodiment, the supplying step 2100 may be performed using at least the substrate supply station 100 discussed herein.

In the engaging step 2200, the method 2000 may include engaging the capsule casings with an underside of the filling receptacle and the series of vacuum ports. The capsule casings may have open top ends and air-permeable bottom ends. In an example embodiment, the engaging step 2200 may be performed using at least the capsule casing supply station 200, the pre-filling inspection station 300, and/or the filling station 400 discussed herein.

In the vibrating step 2300, the method 2000 may include providing vibrations to increase a particulate motion of the aerosol-forming substrate in the filling receptacle. In an example embodiment, the vibrating step 2300 may be performed using at least the filling station 400 discussed herein.

In the vacuum step 2400, the method 2000 may include applying a vacuum to the air-permeable bottom ends of the capsule casings such that the aerosol-forming substrate in the filling receptacle is drawn through the series of vacuum ports and into the open top ends of the capsule casings. In an example embodiment, the vacuum step 2400 may be performed using at least the filling station 400 discussed herein. It should be understood that the method 200 may include further steps associated with the capping station 500, the cap supply station 600, and/or the collection station 700 discussed herein.

Additional details and/or alternatives for the machinery, the aerosol-generating device, the capsule, and/or the aerosol-forming substrate may be found in U.S. Pat. Nos. 9,963,260; 9,968,131; 10,562,748; 10,858,137; 11,576,440; U.S. application Ser. No. 17/151,340, filed Jan. 18, 2021; U.S. application Ser. No. 17/981,973, filed Nov. 7, 2022, the entire contents of each of which are incorporated herein by reference.

As discussed herein, an aerosol-forming substrate is a material or combination of materials that may yield an aerosol. An aerosol relates to the matter generated or output by the devices disclosed, claimed, and equivalents thereof. The material may include a compound (e.g., nicotine, cannabinoid), wherein an aerosol including the compound is produced when the material is heated. The heating may be below the combustion temperature so as to produce an aerosol without involving a substantial pyrolysis of the aerosol-forming substrate or the substantial generation of combustion byproducts (if any). Thus, in an example embodiment, pyrolysis does not occur during the heating and resulting production of aerosol. In other instances, there may be some pyrolysis and combustion byproducts, but the extent may be considered relatively minor and/or merely incidental.

The aerosol-forming substrate may be a fibrous material. For instance, the fibrous material may be a botanical material. The fibrous material is configured to release a compound when heated. The compound may be a naturally occurring constituent of the fibrous material. For instance, the fibrous material may be plant material such as tobacco, and the compound released may be nicotine. The term "tobacco" includes any tobacco plant material including tobacco leaf, tobacco plug, reconstituted tobacco, compressed tobacco, shaped tobacco, or powder tobacco, and combinations thereof from one or more species of tobacco plants, such as Nicotiana rustica and Nicotiana tabacum.

In some example embodiments, the tobacco material may include material from any member of the genus Nicotiana. In addition, the tobacco material may include a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof, and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass. Furthermore, in some instances, the tobacco material may be mixed and/or combined with at least one of propylene glycol, glycerin, sub-combinations thereof, or combinations thereof.

The compound released may also be a naturally occurring constituent of a medicinal plant that has a medically-accepted therapeutic effect. For instance, the medicinal plant may be a cannabis plant, and the compound may be a cannabinoid. Cannabinoids interact with receptors in the body to produce a wide range of effects. As a result, cannabinoids have been used for a variety of medicinal purposes (e.g., treatment of pain, nausea, epilepsy, psychiatric disorders). The fibrous material may include the leaf and/or flower material from one or more species of cannabis plants such as Cannabis sativa, Cannabis indica, and Cannabis ruderalis. In some instances, the fibrous material is a mixture of 60-80% (e.g., 70%) Cannabis sativa and 20-40% (e.g., 30%) Cannabis indica.

Examples of cannabinoids include tetrahydrocannabinolic acid (THCA), tetrahydrocannabinol (THC), cannabidiolic acid (CBDA), cannabidiol (CBD), cannabinol (CBN), cannabicyclol (CBL), cannabichromene (CBC), and cannabigerol (CBG). Tetrahydrocannabinolic acid (THCA) is a precursor of tetrahydrocannabinol (THC), while cannabidiolic acid (CBDA) is precursor of cannabidiol (CBD). Tetrahydrocannabinolic acid (THCA) and cannabidiolic acid (CBDA) may be converted to tetrahydrocannabinol (THC) and cannabidiol (CBD), respectively, via heating. In an example embodiment, heat from a heater may cause decarboxylation so as to convert the tetrahydrocannabinolic acid (THCA) in the capsule to tetrahydrocannabinol (THC), and/or to convert the cannabidiolic acid (CBDA) in the capsule to cannabidiol (CBD).

In instances where both tetrahydrocannabinolic acid (THCA) and tetrahydrocannabinol (THC) are present in the capsule, the decarboxylation and resulting conversion will cause a decrease in tetrahydrocannabinolic acid (THCA) and an increase in tetrahydrocannabinol (THC). At least 50% (e.g., at least 87%) of the tetrahydrocannabinolic acid (THCA) may be converted to tetrahydrocannabinol (THC) during the heating of the capsule. Similarly, in instances where both cannabidiolic acid (CBDA) and cannabidiol (CBD) are present in the capsule, the decarboxylation and resulting conversion will cause a decrease in cannabidiolic acid (CBDA) and an increase in cannabidiol (CBD). At least 50% (e.g., at least 87%) of the cannabidiolic acid (CBDA) may be converted to cannabidiol (CBD) during the heating of the capsule.

Furthermore, the compound released may be or may additionally include a non-naturally occurring additive that is subsequently introduced into the fibrous material. In one instance, the fibrous material may include at least one of cotton, polyethylene, polyester, rayon, combinations thereof, or the like (e.g., in a form of a gauze). In another instance, the fibrous material may be a cellulose material (e.g., non-tobacco and/or non-cannabis material). In either instance, the compound introduced may include nicotine, cannabinoids, and/or flavorants. The flavorants may be from natural sources, such as plant extracts (e.g., tobacco extract, cannabis extract), and/or artificial sources. In yet another instance, when the fibrous material includes tobacco and/or cannabis, the compound may be or may additionally include one or more flavorants (e.g., menthol, mint, vanilla). Thus, the compound within the aerosol-forming substrate may include naturally occurring constituents and/or non-naturally occurring additives. In this regard, it should be understood that existing levels of the naturally occurring constituents of the aerosol-forming substrate may be increased through supplementation. For example, the existing levels of nicotine in a quantity of tobacco may be increased through supplementation with an extract containing nicotine. Similarly, the existing levels of one or more cannabinoids in a quantity of cannabis may be increased through supplementation with an extract containing such cannabinoids.

In at least one example embodiment, the aerosol-forming substrate has a resistance to draw (RTD), e.g., as contained within a capsule, of greater than or equal to about 30 mmH$_2$O (e.g., greater than or equal to about 40 mmH$_2$O, greater than or equal to about 50 mmH$_2$O, greater than or equal to about 60 mmH$_2$O, greater than or equal to about 70 mmH$_2$O, greater than or equal to about 80 mmH$_2$O, greater than or equal to about 90 mmH$_2$O, greater than or equal to about 100 mmH$_2$O, greater than or equal to about 110 mmH$_2$O, or greater than or equal to about 120 mmH$_2$O). In at least one example embodiment, the RTD is less than or equal to about 130 mmH$_2$O (e.g., less than or equal to about 120 mmH$_2$O, less than or equal to about 110 mmH$_2$O, less than or equal to about 100 mmH$_2$O, less than or equal to about 90 mmH$_2$O, less than or equal to about 80 mmH$_2$O, less than or equal to about 70 mmH$_2$O, less than or equal to about 60 mmH$_2$O, less than or equal to about 50 mmH$_2$O, or less than or equal to about 40 mmH$_2$O). In at least one example embodiment, the RTD ranges from about 60 mmH$_2$O to about 80 mmH$_2$O (e.g., from about 65 mmH$_2$O to about 75 mmH$_2$O, from about 67 mmH$_2$O to about 73 mmH$_2$O, or from about 69 mmH$_2$O to about 71 mmH$_2$O).

In at least one example embodiment, the aerosol-forming substrate has a bulk density of greater than or equal to about 0.2 g/cm$^3$ (e.g., greater than or equal to about 0.25 g/cm$^3$, greater than or equal to about 0.3 g/cm$^3$, greater than or equal to about 0.35 g/cm$^3$, greater than or equal to about 0.4 g/cm$^3$, greater than or equal to about 0.45 g/cm$^3$, greater than or equal to about 0.5 g/cm$^3$, greater than or equal to about 0.55 g/cm$^3$, greater than or equal to about 0.6 g/cm$^3$, greater than or equal to about 0.65 g/cm$^3$, greater than or equal to about 0.7 g/cm$^3$, greater than or equal to about 0.75 g/cm$^3$). In at least one example embodiment, the bulk density is less than or equal to about 0.8 g/cm$^3$ (e.g., less than or equal to about 0.75 g/cm$^3$, less than or equal to about 0.7 g/cm$^3$, less than or equal to about 0.65 g/cm$^3$, less than or equal to about 0.6 g/cm$^3$, less than or equal to about 0.55 g/cm$^3$, less than or equal to about 0.5 g/cm$^3$, less than or equal to about 0.45 g/cm$^3$, less than or equal to about 0.4 g/cm$^3$, less than or equal to about 0.35 g/cm$^3$, less than or equal to about 0.3 g/cm$^3$, or less than or equal to about 0.25 g/cm$^3$). In at least one example embodiment, the bulk density ranges from about 0.3 g/cm$^3$ to about 0.5 g/cm$^3$ (e.g., from about 0.35 g/cm$^3$ to about 0.45 g/cm$^3$, or from about 0.37 g/cm$^3$ to about 0.43 g/cm$^3$).

In at least one example embodiment, the aerosol-forming substrate has a particulate form with a mean particle size (e.g., diameter) of greater than or equal to about 270 μm (e.g., greater than or equal to about 280 μm, greater than or equal to about 290 μm, greater than or equal to about 300 μm, greater than or equal to about 310 μm, greater than or equal to about 320 μm, greater than or equal to about 330 μm, greater than or equal to about 340 μm, greater than or equal to about 350 μm, greater than or equal to about 360 μm, greater than or equal to about 370 μm, greater than or equal to about 380 μm, greater than or equal to about 390 μm, greater than or equal to about 400 μm, or greater than or equal to about 410 μm). In at least one example embodiment, the mean particle size is less than or equal to about 415 μm (e.g., less than or equal to about 410 μm, less than or equal to about 400 μm, less than or equal to about 390 μm, less than or equal to about 380 μm, less than or equal to about 370 μm, less than or equal to about 360 μm, less than or equal to about 350 μm, less than or equal to about 340 μm, less than or equal to about 330 μm, less than or equal to about 320 μm, less than or equal to about 310 μm, less than or equal to about 300 μm, less than or equal to about 290 μm, or less than or equal to about 280 μm).

In at least one example embodiment, the aerosol-forming substrate has a 10th percentile diameter ranging from about 160 μm to about 225 μm. In at least one example embodiment, the aerosol-forming substrate has a 50th percentile (or median) diameter ranging from about 260 μm to about 385 μm. In at least one example embodiment, the aerosol-forming substrate has a 90th percentile diameter ranging from about 390 μm to about 635 μm.

Although the capsule 1300 herein is disclosed as having a heater 1340, it should be understood that example embodiments are not limited thereto. For instance, a heater may not be present in the capsule 1300 but instead be part of the aerosol-generating device that receives the capsule 1300. In other instances where a heater 1340 is present within the capsule 1300, the heater 1340 may include a first end section 1342, an intermediate section 1344, and a second end section 1346. The intermediate section 1344 of the heater 1340 may have a planar and winding form resembling a compressed oscillation or zigzag with a plurality of parallel segments (e.g., eight to sixteen parallel segments). In an example embodiment, the two outermost parallel segments of the intermediate section 1344 may be wider than the inner parallel segments (e.g., 0.60 mm versus 0.30 mm) for thermal relief and mechanical stiffening. The inner parallel segments of the intermediate section 1344 may also be closer to the first opening 1312 in the first end cap 1310 and the second opening 1322 in the second end cap 1320 than the outer parallel segments of the intermediate section 1344. Such a configuration may promote heating in the center of the capsule 1300. However, it should be understood that other forms for the intermediate section 1344 of the heater 1340 are also possible (e.g., spiral form, flower-like form).

The terminus of each of the first end section 1342 and the second end section 1346 may be oriented orthogonally to the plane of the intermediate section 1344. Each of the first end section 1342 and the second end section 1346 may also include segments having a sideways J-shape. Furthermore, each of the first end section 1342 and the second end section 1346 may include opposing finger/claw-like structures. The finger/claw-like structures may serve as locating features for manufacturing equipment (e.g., overmolding tool). As a result, the first end section 1342 and the second end section 1346 may be embedded relatively securely within the second end cap 1320 while providing a pair of electrical contact surfaces.

In other instances, the transition from the intermediate section 1344 to the first end section 1342 and the second end section 1346 may involve little or no dimension change (e.g., uniform width versus the wider, thermal relief/lower resistance sections). In addition, the first end section 1342 and the second end section 1346 may each include a simplified tab as the anchor structure and the electrical contact structure.

Herein, the aerosol-forming substrate 1860' may be in a loose form (e.g., particles, fibers, grounds, fragments, shreds) that does not have a set shape but rather is configured to take on the shape of an available space within a chamber when introduced into a capsule. Specifically, during assembly/loading, the loose form of the aerosol-forming substrate 1860' may partially or fully occupy the available space within a chamber of a capsule so as to be on respective sides of the intermediate section of the heater (e.g., so as to surround and contact the intermediate section 1344 of the heater 1340). For instance, the loose form of the aerosol-forming substrate 1860' may be used to fill in a remainder of a chamber (e.g., top off a chamber) that is already loaded with an aerosol-forming substrate in consolidated form. In another instance, the loose form of the aerosol-forming substrate 1860' may be used to fill the entirety of a chamber of a capsule. Furthermore, the aerosol-forming substrate 1860' may be loaded into capsule (e.g., capsule 1300) via a vacuum-assisted process.

To mitigate/address the electrically-insulating effect of the metal oxide layer, an electrical contact arrangement may be configured such that an associated force between the engaging structures is focused on a relatively small surface area so as to increase the likelihood of penetrating (e.g., mechanically and/or electrically) the metal oxide layer and thereby improving the quality and consistency of an electrical connection with the underlying metal. In an example embodiment, an electrical contact pad may be fabricated/modified to introduce at least one surface discontinuity which provides for one or more focused points of contact (e.g., edge(s)) with a corresponding connector when electrically engaged. As used herein, a surface discontinuity should be understood to be disruption in an otherwise smooth and continuous surface. The surface discontinuity (or each of the surface discontinuities) may occupy a contiguous area of about 0.2 mm²-0.80 mm² (e.g., 0.4 mm²-0.6 mm²).

The contact pad may be provided with a surface discontinuity (or a plurality of surface discontinuities) to enhance the electrical connection between at least one of the connector pins and the contact pad. In an example embodiment, the surface discontinuity may be in the form of at least one opening in the surface of the contact pad. The opening may have a circular shape, although other shapes may also be utilized. The opening may be provided as a recess/indentation (e.g., dimple) in the contact pad. Alternatively, the opening may be provided as a through hole that completely penetrates the contact pad. With regard to manufacturing, the contact pad may be punched, stamped, drilled, etched, or otherwise machined before the assembly of the capsule in order to achieve one or more openings as the surface discontinuity. Alternatively, techniques such as drilling may be performed after the assembly of the capsule. As a result of the surface discontinuity in the contact pad, a mechanically-vulnerable (e.g., structurally-vulnerable) portion is provided via the rim/edge of the opening which increases the likelihood that a corresponding connector pin will physically pierce, compromise, or otherwise break through this relatively weak point/portion in the outer oxide layer so as to establish a secure and consistent electrical connection with the underlying metal of the contact pad.

A shear surface approach may also be utilized, wherein the contact pad is provided with a protrusion, such as a chamfer (e.g., R0.1 chamfer), as the surface discontinuity for enhancing an electrical connection with the connector pin. The contact pad may be machined to form the chamfer, although example embodiments are not limited thereto. The connector pin may be provided with a flat contact tip to help focus the engagement force on the chamfer, thus increasing the likelihood of the connector pin penetrating the outer layer of metal oxide and directly contacting the underlying metal for a more reliable electrical connection. While only one chamfer and corresponding connector pin are discussed, it should be understood that example embodiments are not limited thereto, and additional chamfers and corresponding connector pins may be provided in other instances.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

The invention claimed is:

1. A filling station for aerosol-generating capsules, comprising:
   a filling receptacle defining a first series of vacuum ports, the filling receptacle configured to receive an aerosol-forming substrate;
   a plurality of carriages arranged underneath the filling receptacle, each of the plurality of carriages defining a second series of vacuum ports, each of the plurality of carriages configured to receive and hold capsule casings for filling with the aerosol-forming substrate; and
   at least one vacuum source configured to draw a vacuum through the capsule casings such that the aerosol-forming substrate is drawn through the first series of vacuum ports in the filling receptacle and into the capsule casings underneath.

2. The filling station of claim 1, wherein the filling receptacle and the plurality of carriages are configured to rotate and have a common axis of rotation, and the plurality of carriages are configured to move axially relative to the axis of rotation.

3. The filling station of claim 1, wherein the plurality of carriages are configured to raise the capsule casings to engage with the filling receptacle to facilitate a filling with the aerosol-forming substrate and to lower the capsule casings after the filling.

4. The filling station of claim 1, wherein the first series of vacuum ports in the filling receptacle have a shape that corresponds to a cross-section of the capsule casings.

5. The filling station of claim 1, wherein the first series of vacuum ports are arranged in a circle in the filling receptacle.

6. The filling station of claim 1, wherein the plurality of carriages are configured to raise the capsule casings such that the capsule casings extend into the first series of vacuum ports in the filling receptacle.

7. The filling station of claim 1, wherein each of the first series of vacuum ports in the filling receptacle has a lower edge that is chamfered such that a bottom opening of each of the first series of vacuum ports is larger than a corresponding top opening.

8. The filling station of claim 1, wherein the second series of vacuum ports are configured to align with air-permeable bottom ends of the capsule casings.

9. The filling station of claim 1, wherein each of the plurality of carriages further defines a third series of vacuum ports configured to hold the capsule casings against the plurality of carriages when the vacuum is being drawn by the at least one vacuum source.

10. The filling station of claim 1, wherein the at least one vacuum source is configured to draw the vacuum such that a packing density of the aerosol-forming substrate drawn into the capsule casings is greater than via gravity loading.

11. The filling station of claim 1, further comprising:
at least one motor configured to generate vibrations for enhancing particulate movements of the aerosol-forming substrate in the filling receptacle.

12. The filling station of claim 11, further comprising:
at least one baffle configured to modify a distribution of the aerosol-forming substrate in the filling receptacle.

13. The filling station of claim 12, wherein the at least one baffle is configured to vibrate in response to the at least one motor.

14. The filling station of claim 12, wherein the filling receptacle and the plurality of carriages are configured to rotate, while the at least one baffle is configured to remain fixed relative to rotations of the filling receptacle and the plurality of carriages.

15. The filling station of claim 14, wherein the at least one baffle is configured to deflect the aerosol-forming substrate toward the first series of vacuum ports during rotations of the filling receptacle.

16. The filling station of claim 12, wherein the at least one baffle includes a first baffle, a second baffle, a third baffle, and a fourth baffle.

17. The filling station of claim 16, wherein the first baffle is configured to facilitate an initial filling of the aerosol-forming substrate in the capsule casings, and the third baffle is configured to facilitate a subsequent filling of the aerosol-forming substrate in the capsule casings.

18. The filling station of claim 16, wherein the second baffle is C-shaped or U-shaped and is positioned higher from a surface of the filling receptacle than the first baffle, the third baffle, and the fourth baffle.

19. The filling station of claim 16, wherein the second baffle is configured to temporarily accumulate the aerosol-forming substrate for purposes of determining an appropriate rate for supplying the aerosol-forming substrate to the filling receptacle.

20. The filling station of claim 16, wherein the fourth baffle is configured to wipe excess aerosol-forming substrate from the first series of vacuum ports and to direct the excess aerosol-forming substrate toward an inner portion of the filling receptacle.

21. A method of filling capsule casings with aerosol-forming substrate, comprising:
supplying the aerosol-forming substrate to a filling receptacle defining a first series of vacuum ports;
receiving and holding the capsule casings with a plurality of carriages defining a second series of vacuum ports;
engaging the capsule casings with an underside of the filling receptacle and the first series of vacuum ports, the capsule casings having open top ends and air-permeable bottom ends;
providing vibrations to increase a particulate motion of the aerosol-forming substrate in the filling receptacle; and
applying a vacuum to the air-permeable bottom ends of the capsule casings such that the aerosol-forming substrate in the filling receptacle is drawn through the first series of vacuum ports and into the open top ends of the capsule casings.

* * * * *